US012066314B2

(12) United States Patent
Honig

(10) Patent No.: US 12,066,314 B2
(45) **Date of Patent: *Aug. 20, 2024**

(54) TRUCK SCALE MANAGEMENT SYSTEM AND METHOD

(71) Applicant: TruckPay Inc., Tenafly, NJ (US)

(72) Inventor: Barry Scott Honig, Tenafly, NJ (US)

(73) Assignee: TruckPay Inc., Tenafly, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,493

(22) Filed: Jul. 7, 2023

(65) Prior Publication Data

US 2024/0003734 A1 Jan. 4, 2024

Related U.S. Application Data

(63) Continuation-in-part of application No. 17/888,765, filed on Aug. 16, 2022, which is a continuation of application No. 17/673,057, filed on Feb. 16, 2022, now Pat. No. 11,448,546, which is a continuation-in-part of application No. 16/839,768, filed on Apr. 3, 2020, now Pat. No. 11,287,304, (Continued)

(51) Int. Cl.

| | |
|---|---|
| ***G06Q 10/10*** | (2023.01) |
| ***G01G 19/02*** | (2006.01) |
| ***G06Q 10/06*** | (2023.01) |
| ***G06Q 20/18*** | (2012.01) |
| ***G06Q 30/018*** | (2023.01) |
| ***G06Q 30/02*** | (2023.01) |
| ***G06Q 30/06*** | (2023.01) |
| ***G06Q 50/18*** | (2012.01) |

(52) U.S. Cl.
CPC ............ *G01G 19/02* (2013.01); *G06Q 20/18* (2013.01); *G06Q 30/018* (2013.01); *G06Q 30/0281* (2013.01); *G06Q 50/18* (2013.01)

(58) Field of Classification Search
CPC ...... G01G 19/02; G06Q 20/18; G06Q 30/018; G06Q 30/0281; G06Q 50/18
USPC .................................................. 705/1.1–912
See application file for complete search history.

(56) References Cited

U.S. PATENT DOCUMENTS 7,432,456 B2 * 10/2008 LaFollette ............. G01G 19/02 177/133
9,830,644 B2 * 11/2017 Ruud ..................... G06Q 40/00
(Continued)

*Primary Examiner* — Jonathan P Ouellette
(74) *Attorney, Agent, or Firm* — Meister Seelig & Fein PLLC

(57) ABSTRACT

A truck scale management system is disclosed that is configured to obtain pricing data for a plurality of products, obtain payment information corresponding to an entity, obtain payment information corresponding to a scale-owner, generate a virtual scale that is configured to obtain scale data from a physical scale associated with the scale-owner, generate a virtual kiosk corresponding to the virtual scale that is configured for use during weighments of trucks on the physical scale and is associated with a given product of the plurality of products, receive a weigh ticket from the virtual kiosk corresponding to a weighment of a given truck that is carrying the given product and is associated with the entity, generate an invoice based on the received weigh ticket and the obtained pricing data and execute a payment of the invoice based on the obtained payment information corresponding to the entity and the scale-owner.

20 Claims, 42 Drawing Sheets

Related U.S. Application Data which is a continuation of application No. 16/451,482, filed on Jun. 25, 2019, now Pat. No. 10,634,547.

(60) Provisional application No. 62/862,800, filed on Jun. 18, 2019.

(56) References Cited

U.S. PATENT DOCUMENTS

| | | | | |
|---|---|---|---|---|
| 2018/0120147 | A1* | 5/2018 | Hall | G01G 19/02 |
| 2019/0049291 | A1* | 2/2019 | Rasen | G07G 1/0072 |
| 2020/0041329 | A1* | 2/2020 | Shike | E02F 9/2054 |

* cited by examiner

Fig. 36
Back
Are you ready to weigh your truck?
Please make sure that your truck is
pulled up to the scale.
Connect to Scale

TRUCK SCALE MANAGEMENT SYSTEM AND METHOD

CROSS REFERENCE TO RELATED APPLICATION

This application is a continuation-in-part of U.S. patent application Ser. No. 17/888,765, entitled "TRUCK SCALE MANAGEMENT SYSTEM AND METHOD," filed on Aug. 16, 2022, which is a continuation of U.S. patent application Ser. No. 17/673,057, entitled "TRUCK SCALE MANAGEMENT SYSTEM AND METHOD," filed on Feb. 16, 2022, now issued as U.S. Pat. No. 11,448,546 on Sep. 20, 2022, which is a continuation-in-part of U.S. patent application Ser. No. 16/839,768, entitled "TRUCK SCALE MANAGEMENT SYSTEM AND METHOD," filed on Apr. 3, 2020, now issued as U.S. Pat. No. 11,287,304 on Mar. 29, 2022, which is a continuation of U.S. patent application Ser. No. 16/451,482, entitled "TRUCK SCALE MANAGEMENT SYSTEM AND METHOD," filed on Jun. 25, 2019, now issued as U.S. Pat. No. 10,634,547 on Apr. 28, 2020, which claims the benefit of U.S. Provisional Application No. 62/862,800, entitled "TRUCK SCALE MANAGEMENT SYSTEM AND METHOD," filed on Jun. 18, 2019, the disclosures of each of which are hereby incorporated by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to electronic scales for weighment of heavy-duty trucks, and in particular, to scales with customizable web-based kiosk interfaces.

Description of the Related Art

Heavy duty truck scales are well known in the art. A truck scale can be used to check individual axle weights and gross vehicle weights to determine whether the vehicle is safe to travel on public roads or bridges without being stopped and fined by the authorities for being overloaded. A truck scale can also be used to check axle weights and gross vehicle weights to determine the weight of a load or amount of goods being transported. By weighing the vehicle both empty and when loaded, the load carried by the vehicle can be calculated. Truck scales are used in industries that manufacture or move bulk items, such as in mines or quarries, garbage dumps/recycling centers, bulk liquid and powder movement, household goods, and electrical equipment. Since the weight of the vehicle carrying the goods is known (and can be ascertained quickly if it is not known by weighing the empty vehicle) they are a quick and easy way to measure the flow of bulk goods in and out of different locations.

Kiosk systems may be used with truck scales to manage the flow of trucks in and out of sites, such as a plant or facility. Kiosk devices can either be mounted inside a scale house or outside on a post or pedestal near the truck scale. The kiosk system may facilitate vehicle identification, capturing truck weight, and loading on site. A kiosk may comprise a data collection system that is designed specifically for those sites. As such, these kiosks can integrate with a facility's central office and accounting systems.

However, existing kiosk systems lack ease and versatility for upgrades and features that can be customized without the need of servicing technicians. There is thus a need for a truck scale kiosk system with improved scalability and customization for scale owners and drivers.

SUMMARY OF THE INVENTION

A new truck scale management system is disclosed. In some embodiments, the system comprises a processor coupled to memory, in which the processor is configured to obtain pricing data for a plurality of products, obtain payment information corresponding to an entity, obtain payment information corresponding to a scale-owner and generate a virtual scale based on information obtained from a scale-owner computing device associated with the scale-owner. The virtual scale is configured to obtain scale data from a physical scale associated with the scale-owner.

The processor is further configured to generate a virtual kiosk corresponding to the virtual scale based on information obtained from the scale-owner computing device. The virtual kiosk is configured for use during weighments of trucks on the physical scale and is associated with at least a given product of the plurality of products. The processor is further configured to receive a weigh ticket from the virtual kiosk corresponding to a weighment of a given truck carrying the given product by the physical scale. The weigh ticket comprises weighment data for the given product carried by the given truck associated with the entity. The processor is further configured to generate an invoice based at least in part on the received weigh ticket and the obtained pricing data and execute a payment of the invoice based at least in part on the obtained payment information corresponding to the entity and the obtained payment information corresponding to the scale-owner.

The given truck may be an autonomous or semi-autonomous truck associated with the entity. The weigh ticket may be generated automatically by the virtual kiosk based on the weighment of the autonomous or semi-autonomous truck on the physical scale without further human input. The processor may be configured to generate the invoice and execute payment of the invoice automatically without further human input.

The virtual kiosk may be configured to obtain at least one of a signature, image and document as part of the weighment of the given truck and the weighment ticket may comprise the at least one of the signature, image and document.

The pricing data for the plurality of products may comprise first pricing data for the given product. The first pricing data for the given product may comprise a first effective date. The processor may be further configured to obtain second pricing data for the given product. The second pricing data may comprise a second effective date. The processor may be further configured to determine that the second effective date is closer to a current date than the first effective date and utilize the second pricing data for generating future invoices corresponding to the given product instead of the first pricing data.

The information obtained from the scale-owner computing device may comprise an indication of a selection, by a user of the scale-owner computing device, of the given product for association with the virtual kiosk and generating the virtual kiosk corresponding to the virtual scale based on the information obtained from the scale-owner computing device may comprise associating the virtual kiosk with the given product based on the indication.

The information obtained from the scale-owner computing device may comprise an indication to allow a presentation of the pricing data to driver mobile devices accessing the virtual kiosk and generating the virtual kiosk corresponding to the virtual scale based on the information obtained from the scale-owner computing device may comprise configuring the virtual kiosk to allow the presentation of the pricing data to driver mobile devices accessing the virtual kiosk.

The information obtained from the scale-owner computing device may comprise contact information for at least one of the entity and the scale-owner. The processor may be further configured to associate the contact information with the virtual kiosk and transmit the invoice to the at least one of the entity and the scale-owner based on the contact information.

A method is also disclosed herein executed by a hardware processor that in some embodiments comprises obtaining pricing data for a plurality of products, obtaining payment information corresponding to an entity, obtaining payment information corresponding to a scale-owner and generating a virtual scale based on information obtained from a scale-owner computing device associated with the scale-owner. The virtual scale is configured to obtain scale data from a physical scale associated with the scale-owner. The method further comprises generating a virtual kiosk corresponding to the virtual scale based on information obtained from the scale-owner computing device. The virtual kiosk is configured for use during weighments of trucks on the physical scale. The virtual kiosk is associated with at least a given product of the plurality of products. The method further comprises receiving a weigh ticket from the virtual kiosk corresponding to a weighment of a given truck carrying the given product by the physical scale. The weigh ticket comprises weighment data for the given product carried by the given truck. The given truck is associated with the entity. The method further comprises generating an invoice based at least in part on the received weigh ticket and the obtained pricing data and executing a payment of the invoice based at least in part on the obtained payment information corresponding to the entity and the obtained payment information corresponding to the scale-owner.

The given truck may be an autonomous or semi-autonomous truck associated with the entity. The weigh ticket may be generated automatically by the virtual kiosk based on the weighment of the autonomous or semi-autonomous truck on the physical scale without further human input. The method may further comprise generating the invoice and executing payment of the invoice automatically without further human input.

The virtual kiosk may be configured to obtain at least one of a signature, image and document as part of the weighment of the given truck and the weighment ticket may comprise the at least one of the signature, image and document.

The pricing data for the plurality of products may comprise first pricing data for the given product. The first pricing data for the given product may comprise a first effective date. The method may further comprise obtaining second pricing data for the given product. The second pricing data may comprise a second effective date. The method may further comprise determining that the second effective date is closer to a current date than the first effective date and utilizing the second pricing data for generating future invoices corresponding to the given product instead of the first pricing data.

The information obtained from the scale-owner computing device may comprise an indication of a selection, by a user of the scale-owner computing device, of the given product for association with the virtual kiosk. Generating the virtual kiosk corresponding to the virtual scale based on the information obtained from the scale-owner computing device may comprise associating the virtual kiosk with the given product based on the indication.

The information obtained from the scale-owner computing device may comprise an indication to allow a presentation of the pricing data to driver mobile devices accessing the virtual kiosk and generating the virtual kiosk corresponding to the virtual scale based on the information obtained from the scale-owner computing device may comprise configuring the virtual kiosk to allow the presentation of the pricing data to driver mobile devices accessing the virtual kiosk.

The information obtained from the scale-owner computing device may comprise contact information for at least one of the entity and the scale-owner and the method may further comprise associating the contact information with the virtual kiosk and transmitting the invoice to the at least one of the entity and the scale-owner based on the contact information.

In an embodiment, a non-transitory computer readable medium is disclosed that comprises instructions that, when executed by at least one processor, cause the at least one processor to obtain pricing data for a plurality of products, obtain payment information corresponding to an entity, obtain payment information corresponding to a scale-owner and generate a virtual scale based on information obtained from a scale-owner computing device associated with the scale-owner. The virtual scale is configured to obtain scale data from a physical scale associated with the scale-owner. The instructions further cause the at least one processor to generate a virtual kiosk corresponding to the virtual scale based on information obtained from the scale-owner computing device. The virtual kiosk is configured for use during weighments of trucks on the physical scale. The virtual kiosk is associated with at least a given product of the plurality of products. The instructions further cause the at least one processor to receive a weigh ticket from the virtual kiosk corresponding to a weighment of a given truck carrying the given product by the physical scale. The weigh ticket comprises weighment data for the given product carried by the given truck. The given truck is associated with the entity. The instructions further cause the at least one processor to generate an invoice based at least in part on the received weigh ticket and the obtained pricing data and execute a payment of the invoice based at least in part on the obtained payment information corresponding to the entity and the obtained payment information corresponding to the scale-owner.

The given truck may be an autonomous or semi-autonomous truck associated with the entity, the weigh ticket may be generated automatically by the virtual kiosk based on the weighment of the autonomous or semi-autonomous truck on the physical scale without further human input and the instructions may further cause the processor to generate the invoice and execute payment of the invoice automatically without further human input.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Figure 1:
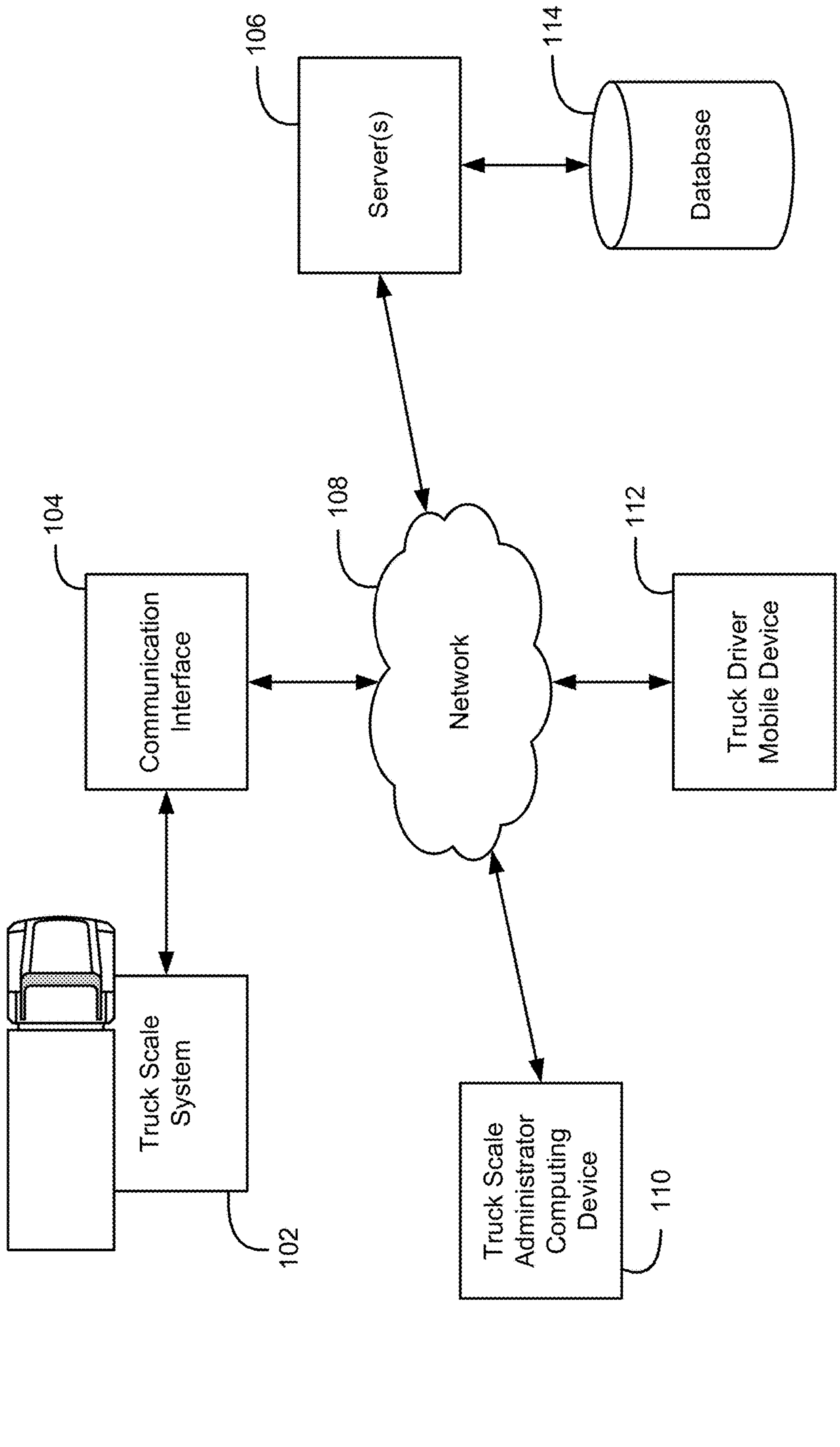
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses a truck scale management system that provides web-accessible kiosk interfaces to truck scales. The truck scale management system may include a platform for creating and editing virtual kiosks that associate functionalities and workflow with truck scales. A virtual kiosk may comprise software associated with a scale for logistics, weighing method (e.g., tare then gross weight ("TG"), gross then tare weight ("GT"), tare weight only ("TO"), or gross weight only ("GO"), re-weighment), payments, and billing that can be customized to meet the need of a specific customer by defining entries in specific tables in a database. The virtual kiosk may also be configured for inbound/outbound weighing such that a driver user can specify whether a truck is inbound or outbound or be determined based on inbound and outbound weights. For example, the virtual kiosk may determine a tare weight and a gross weight from truck weighments. Specifically, the lower of the two weights may be determined as the tare weight and the higher may be the gross weight. The virtual kiosk may also then determine a net weight (e.g., of a cargo load) based on a difference of the inbound and outbound weights.

The platform may allow customers to specify the type of data that they want their software-defined kiosks to collect and how they want to subsequently access that data for further analysis. A given virtual kiosk may be associated with a particular scale or a scale management system. Additionally, multiple virtual kiosks, that perform different functions, may also be connected to the same scale. In another embodiment, multiple scales may be allowed to share the functionality of multiple virtual kiosks. The disclosed system is also applicable to any scale that streams a weight over an electronic indicator, such as a food scale in a food processing factory, etc., and where the information from the scale is recorded electronically along with other related information.

The platform may include a web interface that provide scale owners with administrative capabilities to create and modify virtual scales and associated kiosks. Scale-owners and trucking companies, as well as drivers, may create accounts and view weighment reports. In one embodiment, client devices such as smart phones may be used by drivers to connect to and interact with scales. A security layer may be established where drivers can login to use particular scales.

The disclosed system may increase flexibility with re-provisioning, adding, or expanding kiosk/scale features. The system's device and location independence enables users to access a kiosk and scale using a web application or browser regardless of their location or what device they use (e.g., PC, mobile device). As kiosk and scale interfaces are off-site and accessed via a network, such as the Internet, users can connect to the kiosk and scale from anywhere. As such, the presently disclosed system provides flexibility of being able to change the virtual kiosk in real-time and being able to attach any number of virtual kiosks to a given scale at a time.

FIG. 1 illustrates a computing system according to an embodiment of the present invention. The system presented in FIG. 1 includes truck scale system 102, communication interface 104, server(s) 106, network 108, truck scale administrator computing device 110, and truck driver device 112. Truck scale system 102 may comprise structures and devices that are integrated with a weighing apparatus that can measure a weight of a rail or road vehicle and their contents by truck, axle, or load. Exemplary weighing apparatuses of the disclosed system include weighbridges, onboard truck weighing systems, axles scales, and wheel weighing pads. The truck scale system 102 may include electronic components such as a load cell including a transducer that converts an analog signal into a digital weight readout.

The truck scale system 102 may be configured with or connected to a communication interface 104. A truck scale management system comprising server(s) 106 may connect to communication interface 104 to establish communications over network 108. The communication interface 104 may comprise hardware and software including networking components, control systems, sensors, positioning systems, and wired/wireless connections that allow server(s) 106 to communicate with and control the truck scale system 102 in a variety of autonomous, semi-autonomous, or manual modes.

The truck scale system 102 operating in an autonomous manner may operate automatically based upon information provided by server(s) 106, without the need for human operator input. Further, the truck scale system 102 operating semi-autonomously may include an operator, either within a vicinity of the truck scale system 102 or remotely, who performs some tasks or provides some input while other tasks are performed automatically based upon instructions provided by the server(s) 106. That is, truck scale system 102 may be used for self-driving and remotely controlled trucks. The truck scale system 102 would then not be accessed by a truck driver but rather by an operator of a remote-controlled truck or by others who are responsible or own the self-driving truck, or by the self-driving system on the truck itself.

Server(s) 106, as described herein, may vary widely in configuration or capabilities but are comprised of at least a special-purpose digital computing device including at least one or more central processing units and memory. The server(s) 106 may also include one or more of mass storage devices, power supplies, wired or wireless network interfaces, input/output interfaces, and operating systems, such as Windows Server, Mac OS X, Unix, Linux, FreeBSD, or the like. In an example embodiment, server(s) 106 may include or have access to memory for storing instructions or applications for the performance of various functions and a corresponding processor for executing stored instructions or applications. For example, the memory may store an instance of the server(s) 106 configured to operate in accordance with the disclosed embodiments.

According to another embodiment, server(s) 106 may comprise cloud computing data centers configured to provide client devices with access to an application, service, or platform. For example, Software-as-a Service ("SaaS") provides the capability to use a provider's applications running on a cloud infrastructure. The applications are accessible from various client devices through a thin client interface such as a web browser or an application. Cloud computing includes a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Server(s) 106 may connect to truck scale system 102 through communication interface 104 using a virtual scale and communicate operating instructions to the truck scale system 102 based on software-defined kiosk workflow and information stored in database 114. The truck scale management system may include a platform for creating and editing virtual kiosks that associate functionalities and workflow with truck scale system 102. The platform may include a web interface that can be accessed over network 108 to provide administrative capabilities to truck scale administrator computing device 110 to create and modify scales and their associated kiosks.

The virtual kiosks may be accessed by and rendered on truck driver mobile device 112 through network 108 to utilize truck scale system 102. For example, a scale owner user (110) may sign on to server(s) 106 via a web portal to create and define a virtual scale. Virtual kiosks may be further controlled through an application programming interface ("API") from a self-driving or remotely controlled truck. As such, functionalities provided by truck scale system 102 may be accessed and utilized without any direct human interaction at a physical location associated with truck scale system 102.

A virtual scale may comprise a software representation of a physical truck scale, specifically, the virtual scale definition describes how the truck scale operates and includes a data connection to the physical scale. A virtual scale can have one or more virtual kiosks connected to it. Truck drivers (112) can connect to a scale's different virtual kiosks, depending upon how they need to use the scale and the types of authorization they have been given.

Network 108 may be any suitable type of network allowing transport of data communications across thereof. The network 108 may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from devices may be encrypted using, for example, the Advanced Encryption Standard (AES) with a 128, 192, or 256-bit key size, or any other encryption standard known in the art.

Truck scale administrator computing device 110 may comprise computing devices (e.g., desktop computers, laptops, personal digital assistants (PDA), cellular phones, smartphones, tablet computers, or any computing device having a central processing unit and memory unit capable of connecting to a network). Truck driver mobile device 112 may comprise computing devices and vary in terms of capabilities or features, for example, a cell phone, a tablet computer, a laptop, and in-dash car computer, or the like. The truck driver mobile device 112 may comprise a web-enabled client device, which may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display.

Figure 2:
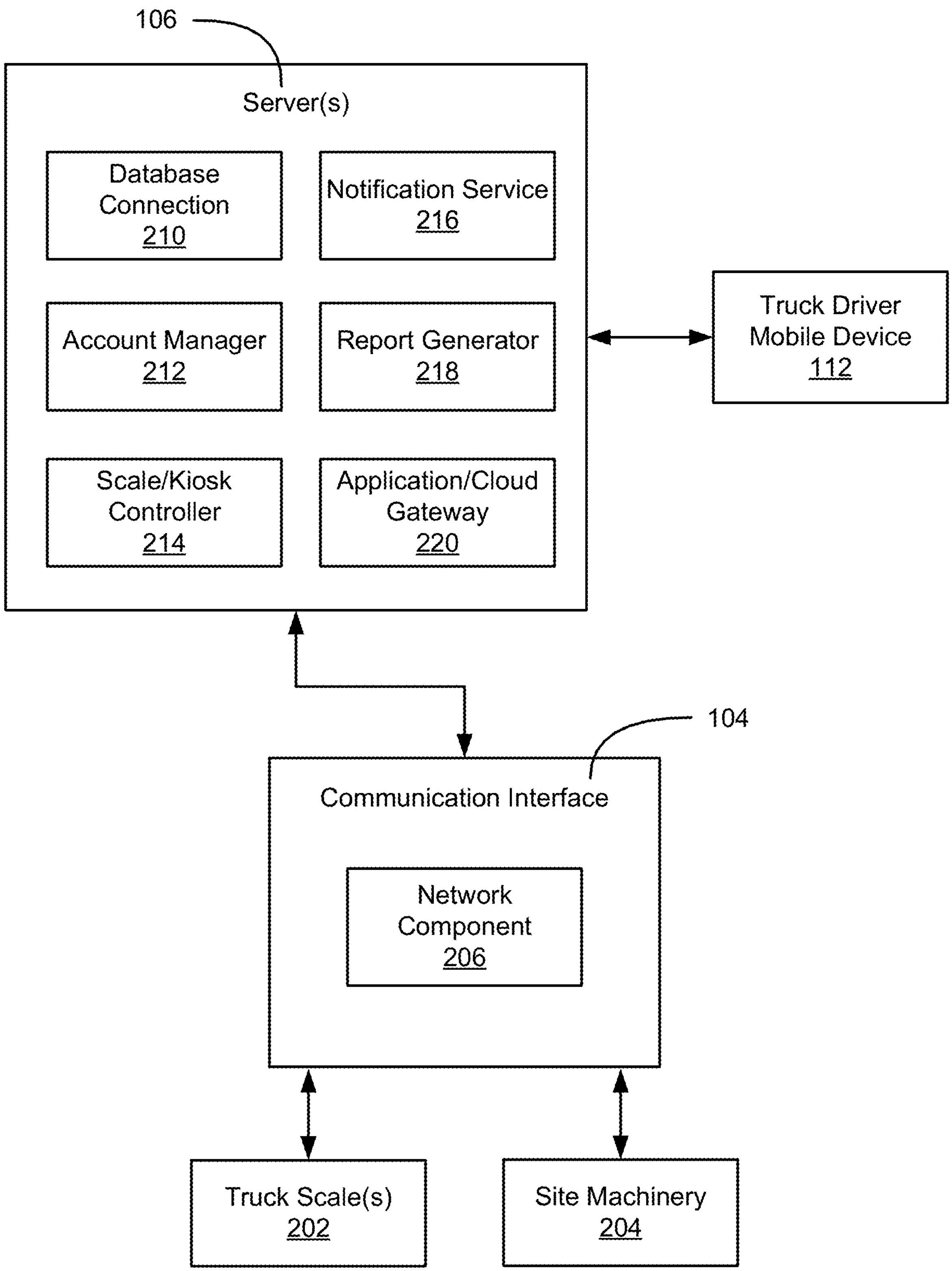
FIG. 2 illustrates a data flow diagram of a truck scale management system according to an embodiment of the present invention.

FIG. 2 presents a data flow diagram of a truck scale management system according to an embodiment of the present invention. A trucking site may include truck scale(s) 202 and site machinery 204. Truck scale(s) 202 may comprise one or more weighing apparatuses for measuring the weight of a truck and/or its load. Site machinery 204 may comprise equipment or hardware that are used in conjunction with truck scale(s) 202 such as automated equipment, sensors, and cameras for loading/unload, scanning, and signaling. Truck scale(s) 202 and/or site machinery 204 that may be Internet protocol (IP)-enabled devices connected to the truck scale(s) 202, such as sensors that indicate if a truck is fully on the truck scale(s) 202 may be operable by via virtual scale and kiosk interfaces that are provided by server(s) 106 to truck driver mobile device 112.

Server(s) 106 includes database connection 210, account manager 212, scale/kiosk controller 214, notification service 216, report generator 218, and application/cloud gateway 220. A virtual scale and kiosk may be retrieved by truck driver mobile device 112 by logging in or accessing an account with account manager 212. Application/cloud gateway 220 may comprise an intermediary that allows communication between server(s) 106 and truck driver mobile device 112. The application/cloud gateway 220 may provide high-level secure network system communication. For example, when truck driver mobile device 112 requests access to resources of server(s) 106 such as files, Web pages and databases, the truck driver mobile device may first connect with a proxy server, which then establishes a connection with the main server. Account manager 212 may save and load virtual scales and kiosks through database connection 210.

Scale/kiosk controller 214 may define and associate user interface controls with physical features of truck scale(s) 202 and site machinery 204. The scale/kiosk controller 214 may communicate with truck scale(s) 202 and/or site machinery 204 through communication interface 104. Communication interface 104 includes network component 206. The network component 206 may comprise network-related devices (e.g., communication devices, routers (e.g., wireline or wireless routers), switches, etc.). In some implementations, one or more network-related devices of the network component 206 can be connected to or interfaced with truck scale(s) 202 and site machinery 204 to facilitate collecting data (e.g., industrial-automation-system-related data) from the truck scale(s) 202 and site machinery 204 or communicating information (e.g., control signals, parameter data, configuration data, etc.) to the truck scale(s) 202 and site machinery 204.

Account manager 212 may also facilitate billing and payment functions associated with the usage of truck scale(s) 202. Report generator 218 may generate reports of activity, billings, payments, maintenance, and errors. Notification service 216 may generate alerts or messages to truck driver mobile device 112 and truck scale administrator computing device to report tickets, invoices, confirmations, reminders, warnings, and other system reports.

Figure 3:
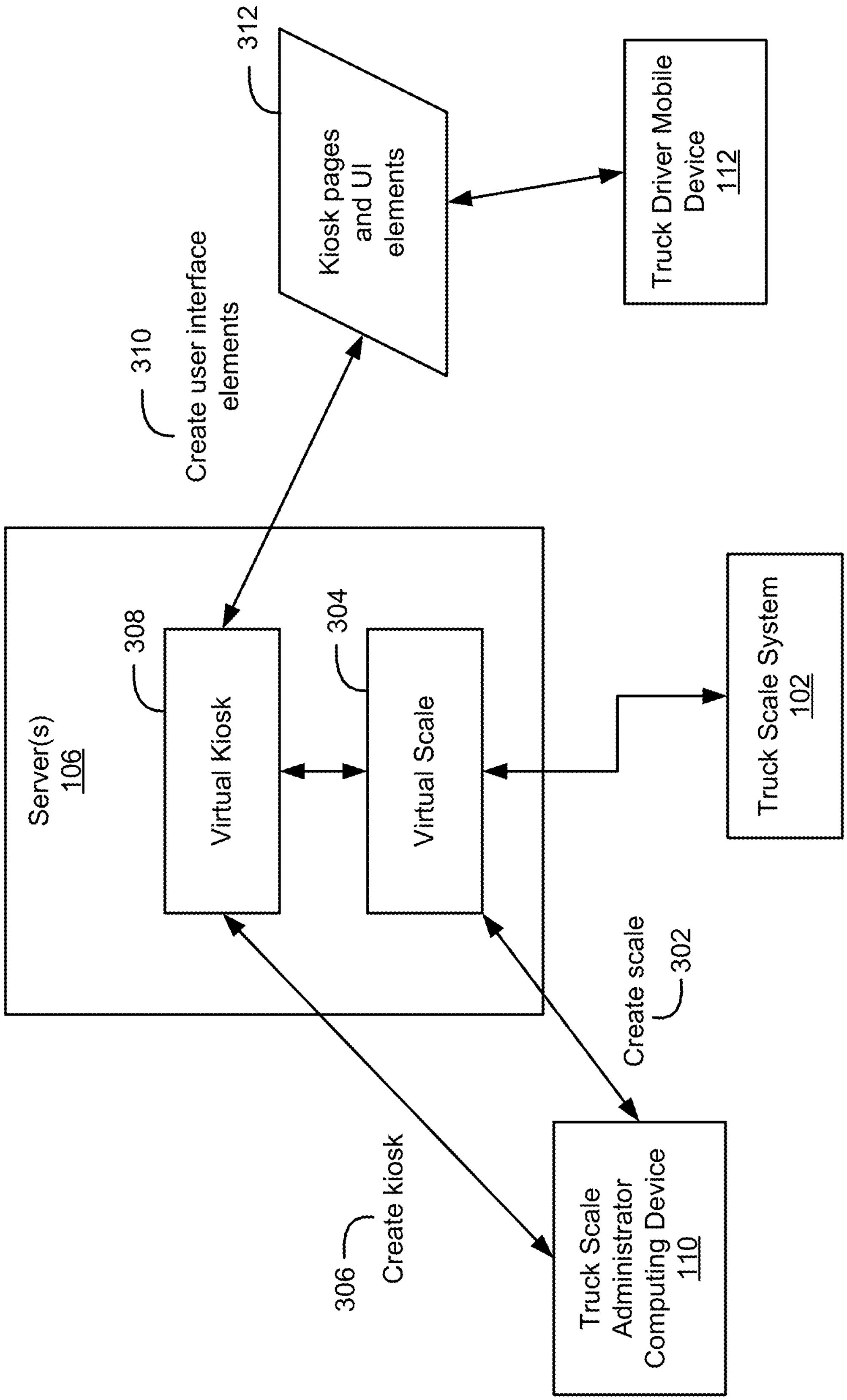
FIG. 3 presents a data flow diagram of a truck scale management system according to an embodiment of the present invention.

FIG. 3 presents a data flow diagram of a truck scale management system according to an embodiment of the present invention. A web interface may be provided by a truck scale management system on server(s) 106 for scale owners to create virtual scales and kiosks associated with the virtual scales. A truck scale administrator computing device 110 may access the truck scale management system to initialize a process (302) for creating a virtual scale 304. Virtual scale 304 may comprise a representation of a physical scale at truck scale system 102 that is defined with certain attributes. Attributes of virtual scale 304 may comprise hardware specifications of the scale including make and model number, scale type, weighing capability, behavior of the scale, a service set identifier (SSID), and a port number. In one embodiment, an administrative user may add scale definitions to a database table of the system where users may be able to select from when creating their own user defined scales. Virtual scale 304 may be created either manually or with the use of a template, or through an API.

Virtual scale 304 may also be associated with a company, for example, by linking the virtual scale to a name and location of the company. The location may include data that contains the latitude and longitude of the scale's location. For example, truck driver mobile device 112 using truck scale management system to weigh a truck may be presented with a scale having a location nearest to a current location of truck driver mobile device 112. According to one embodiment, the location of the company may also be linked to virtual scales for a plurality of locations for a pick-up and drop-off, e.g., the case of a haul-back job, where materials are picked up at one location, dropped at a second location, and then more material is picked up and brought back to either the original or a third location. The virtual scale 304 may also include a special code that an owner of the scale can specify to differentiate scales when multiple scales are present on a site. The special code can also be used to locate a scale, if for example, location services on truck driver mobile device 112 is not available.

According to one embodiment, the location data of the scale may be used to create a geo-fence that specifies a distance that the truck driver mobile device 112 can be away from the scale in order to make a valid connection. A pre-configured or user-specified distance and units of distance may be used to set the geo-fence. The default distance units may be configured for the country where the scale is located. If truck driver mobile device 112 is within the geo-fence of a scale, the truck driver mobile device 112 may attempt to connect to the scale and notify of a successful connection to the scale. Server(s) 106 or truck driver mobile device 112 may also not allow or lockout a mobile device of a driver (e.g., close enough to obviate the geo-fence) who is waiting on line to get on a scale until the scale becomes available.

Virtual scale 304 may include a virtual locking functionality to ensure that only one driver is able to communicate with a physical scale at a given time (e.g., weighing session). Specifically, when a current driver is on a given physical scale and has successfully connected to it, other drivers may be blocked from also connecting to the given physical scale so that other drivers are unable to communicate with the given physical scale or obtain the weight of the truck that is currently on the given physical scale. Other drivers waiting to use the given physical scale may be presented with a message, such as "scale is currently in use, please wait." When the current driver completes weighment, the given physical scale may be virtually unlocked so that a next driver in a queue can connect to it. If a driver currently on a scale doesn't complete their weighment and hence, unlock the scale, truck scale system 102 or virtual scale 304 may automatically time out the connection, after a predetermined amount of time (e.g., one minute) of being connected, to ensure that the scale isn't permanently locked.

In one embodiment, a truck driver may remotely interact with a mobile device that is connected to a virtual scale and kiosk, such as in the case of a driver operating a drone truck and weighing the truck on a scale and having the remote driver operate aspects of the client interface, such as the way a driver would work with the kiosk as if the driver was in the truck. The virtual scale 304 may also be configured with a weighmaster option that indicates that a driver needs to call the weighmaster at the scale-house to perform the weighment or to provide a personal identifier number (PIN) or code for a driver to connect to the virtual scale 304.

The truck scale administrator computing device 110 may further initialize a process (306) to create virtual kiosk 308 using the truck scale management system. Virtual kiosk 308 can also be created through an API. Virtual kiosk 308 may include a workflow for display on a truck driver mobile device 112. The create kiosk 306 process may include defining attributes of the virtual kiosk 308, such as pages, user interface (UI) elements, and billing options. Virtual kiosk 308 may be created manually or selected from pre-created templates.

Virtual kiosk 308 may be configured with "pay-to-weigh" and "company-owned" operating modes. A pay-to-weigh mode may allow scale-owners to charge drivers for each weighment, whereas the company-owned mode may not charge drivers. The company-owned mode allows the disclosed system to be used in cases where no payment is needed, such as in a plant where the aggregate producer owns the scale and doesn't charge for weighing a truck. A starting ticket value may be configured for generating custom ticket numbering sequences. The type of billing may also be configured for pay-to-weigh operation including billing to a customer's account or requesting a PIN associated with an account be specified, or billing to a credit card.

Weight units may also be specified to indicate units to be used for weighment, for example, tons, pounds, kilograms, and metric-tons. The disclosed system may be certified in accordance with the National Type Evaluation Program ("NTEP") where weights that are collected, displayed, and processed by the disclosed system are considered "legal weights" and can be used as part of a financial transaction.

Weighing methods may also be configured for the virtual kiosk 308 including "tare-then-gross weight," "gross-then-tare weight," "gross-weight only," "tare-weight only" (that allows for a truck's tare weight to be stored, independent of other workflows or weighments). In one embodiment, virtual kiosk 307 may comprise a "tare weight kiosk", where a truck's tare weight is acquired and stored in the cloud for future use. The stored tare weight may expire, and a notification may be sent to a truck owner associated with the tare weight before the tare weight expires. According to one embodiment, virtual kiosk 308 may also be created with weighment workflow across an arbitrary number of scales. The weighment workflow may include an ability to have a truck weigh-in on a first scale using a first virtual kiosk and then weigh-out on a second scale using a second virtual kiosk. The server(s) 106 may generate a net weight for the two weighments, such that the first weighment is a gross weight and the second weighment is a tare weight, or vice versa. Workflows may be created through a computer scripting language (e.g., scale control and logistics environment).

According to one embodiment, a scale-owner may configure virtual kiosk 308 to provide discounts for re-weighments, where the cost for re-weighment is less than an initial weighment cost within a maximum amount of time that can elapse between the initial weighment and the re-weighment in order to receive the discounted price. Changes in re-weighment cost and time may also be tracked for future analysis. A special prefix may be assigned to re-weighment tickets. In addition, a scale-owner may configure virtual kiosk 308 to provide unlimited pre-ticketed re-weighments, such that a driver can reweigh their truck as often as they like and then only have the actual weigh ticket generated when the driver indicates completion, e.g., selects a "done" button.

Virtual kiosk 308 may also be created as a "payable kiosk" where a list of prices associated with a list of materials may be provided to a truck driver user along with the weight units for those materials, and have the system generate the price to be paid for receiving these materials, such as in a scrap metal yard. Similarly, virtual kiosk 308 may be created as a "receivable kiosk" where a list of prices may be provided to a truck driver user, along with a list of materials and weight units, for dumping the materials at a site, such as a landfill, and generate the pricing for dumping the material.

Truck driver mobile device 112 may be used by truck drivers to connect to and/or interact with truck scale system 102 through virtual scale 304 and virtual kiosk 308. Truck driver mobile device 112 may connect to truck scale system 102 via virtual scale 304 that may be downloaded to truck driver mobile device 112. Virtual scale 304 may include a S SID (or IP address, or public static IP) and a port number that a Transmission Control Protocol/Internet Protocol (TCP/IP) connection can be made to connect with truck scale system 102.

A location specified by a truck driver user or as determined by truck driver mobile device 112 may be provided to virtual kiosk 308 to verify a correct virtual scale 304 to connect to. Virtual kiosk 308 may comprise an interface with virtual scale 304 that allows inter-process communications of data from a physical scale at truck scale system 102. Server(s) 106 may create (310) kiosk pages and user interface elements 312 for rendering on a screen of truck driver mobile device 112 as defined by virtual kiosk 308. Kiosk pages and user interface elements 312 may include custom text fields, button, drop-down selectors for inputs that have a set of options to choose from.

In addition, the virtual scale 304 can be configured to allow a device to run in a "Tablet Kiosk Mode." The "Tablet Kiosk Mode" may comprise an interface running on a site-provided client device, such as a tablet-kiosk for public use. The "Tablet Kiosk Mode" may allow the interface to execute the disclosed weighment workflows but allow a driver to use a phone number or email address to operate the device, rather than logging in to a customer account. In the event that a client device loses connection to the server, a weighing session or activity may be saved on the client device and synchronize with the server when the connection is re-established.

Figure 4:
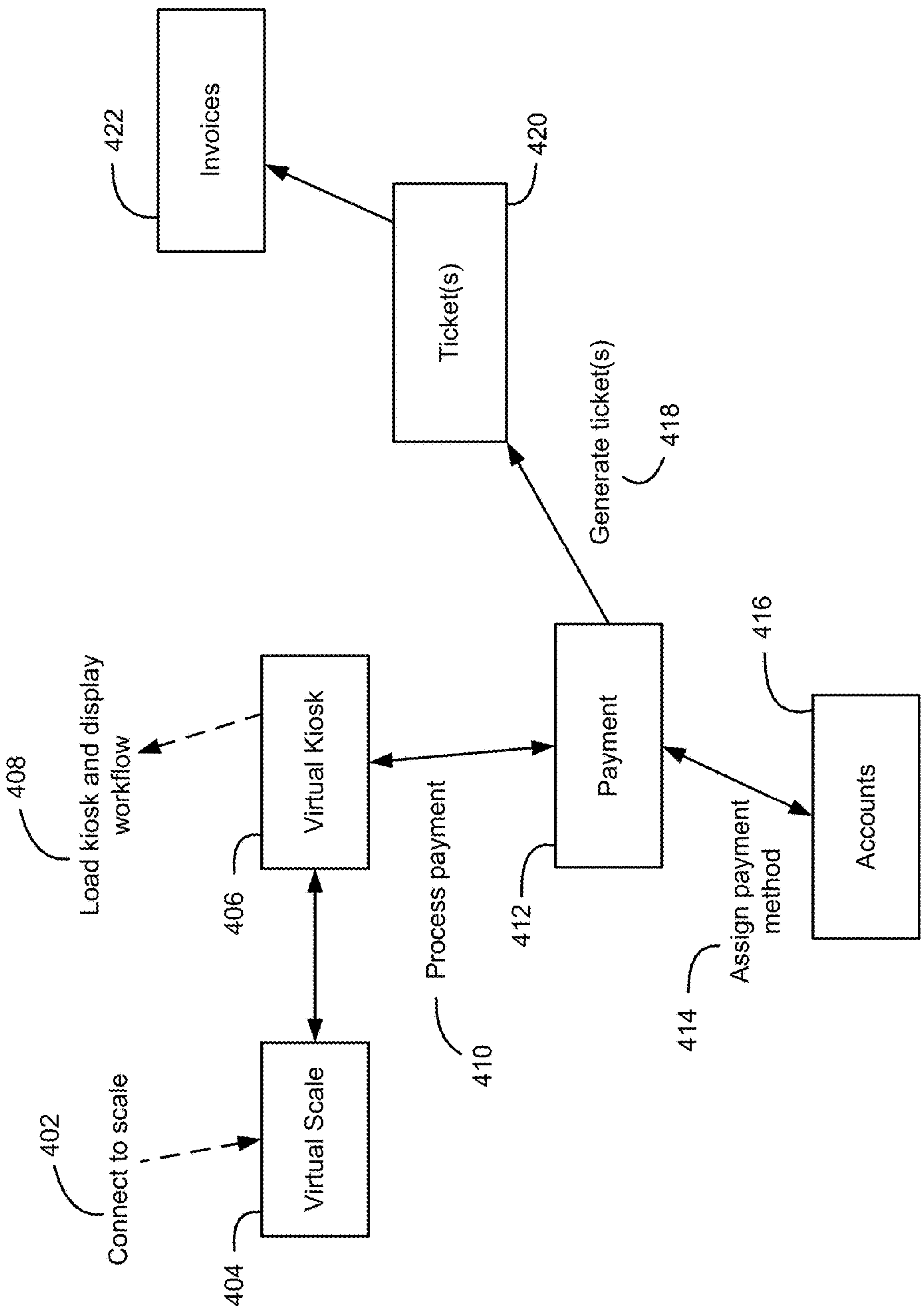
FIG. 4 presents another data flow diagram of a truck scale management system according to an embodiment of the present invention.

FIG. 4 presents a data flow diagram of a truck scale management system according to an embodiment of the present invention. A user from a device (such as truck driver mobile device 112) may connect to virtual scale 404 through via a TCP/IP connection (402). The virtual scale 404 may be automatically selected for a truck driver user on their device-based coordinates or location code. For example, truck driver mobile device 112 may include a location services feature that can detect the location of the device using location data, such as GPS. A virtual kiosk 406 may be connected to or associated with virtual scale 404 and automatically downloaded to the truck driver device to display workflow on the device (408).

Payments may be solicited where they are processed (410) by payment 412. Users may pay by methods such as credit card/debit or company account-based billing and/or account pin. Selected payment methods are assigned (414) to accounts 416. For example, a trucking company can have an account where the driver needs only to enter a PIN, rather than a credit card. Scale owners may create accounts for trucker users or owner operators. Accounts optionally have PINs for increased security and may be restricted to specific kiosks.

After payment is processed, ticket(s) are generated (418) and may be stored in a database. Ticket(s) 420 may comprise a digital ticket that is generated based on data from the scale and any information generated from virtual kiosk 406. Data on ticket(s) 420 may be displayed via the virtual kiosk. Invoices can be generated (422) when ticket(s) 420 are created.

Figure 5:
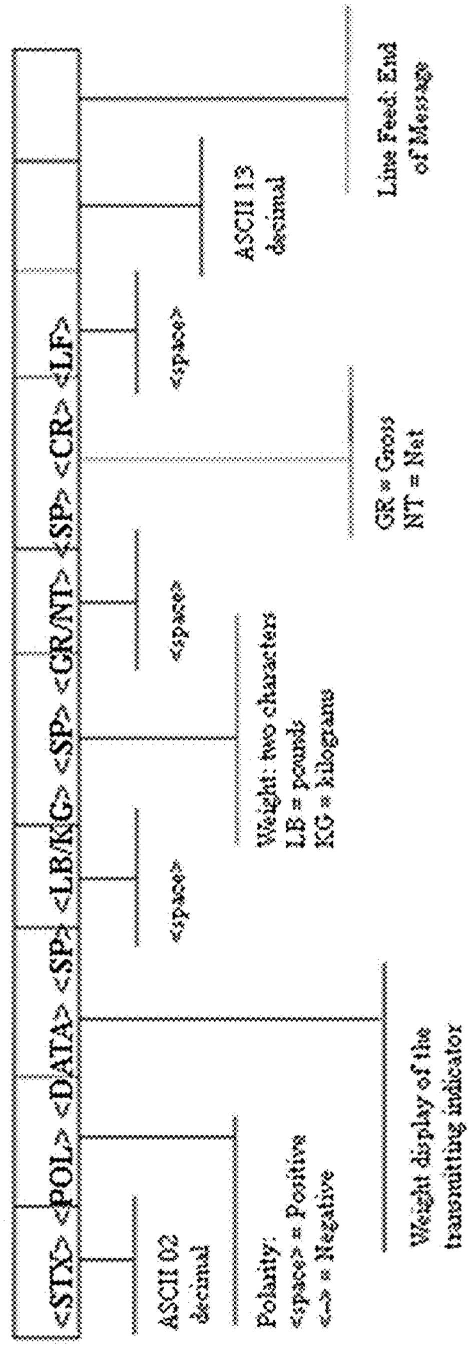
FIG. 5 illustrates an exemplary data string format according to an embodiment of the present invention.

The disclosed system may also include an instrumentation protocol for transmitting axle weights from a physical scale device to a mobile computing device or any other type of computer. Users, through a user interface, may specify multiple types of string formats that provide the axle weights and associated data, to the truck scale management system platform or any other scale management system. String formats may be specified in a serial data format may be used to interface with such computing devices. FIG. 5 presents an exemplary data string format that may be selected for generating output data from a scale. The serial data may be transmitted in an ASCII-compatible format.

Figure 6:
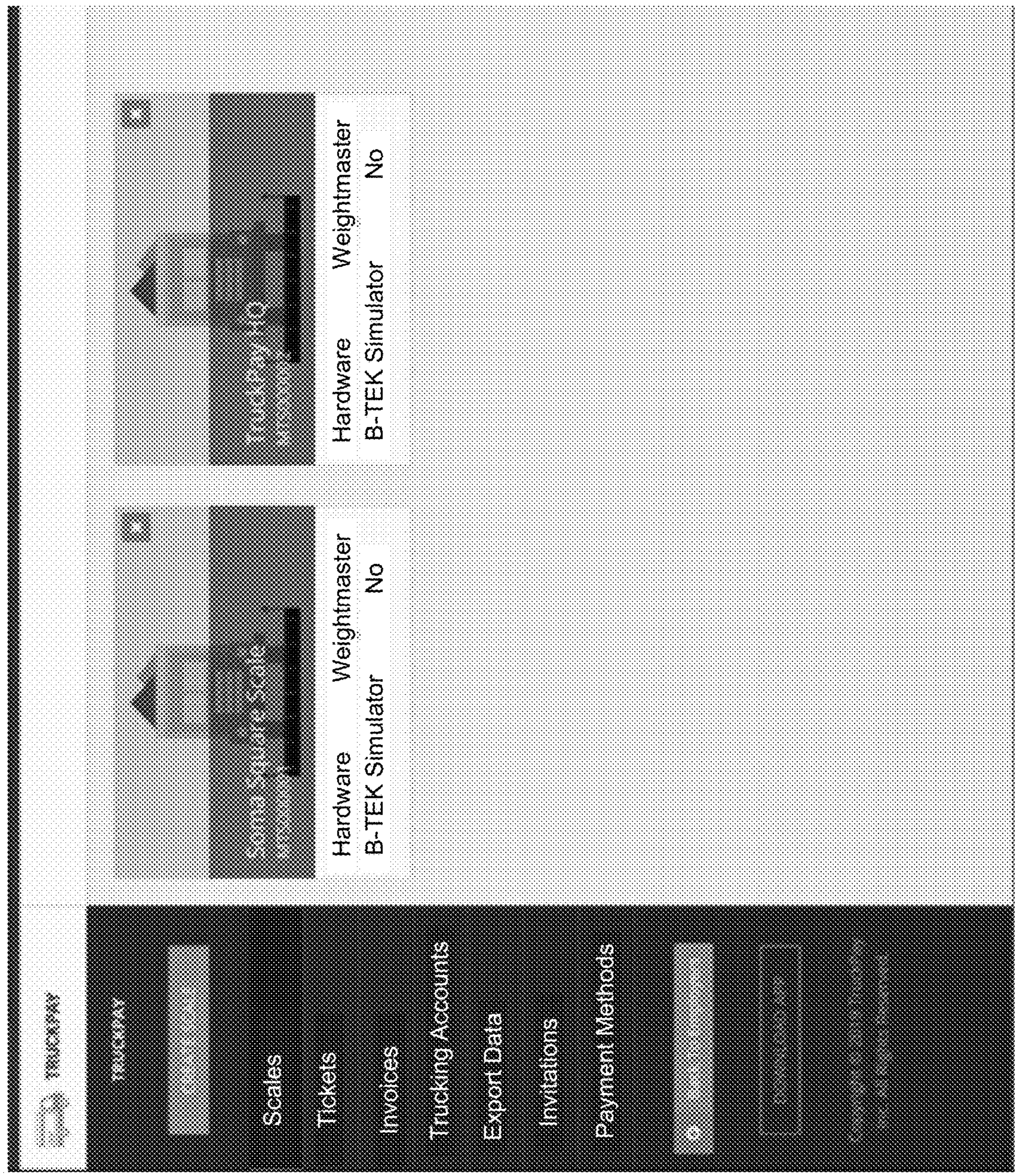
FIG. 6 illustrates an exemplary screen for managing scales according to an embodiment of the present invention.

Users may create and define virtual scales by, for example, signing on to a web portal of a truck scale management system. A virtual scale may comprise a software representation of a physical truck scale, specifically, the virtual scale definition describes how the truck scale operates. FIG. 6 presents an exemplary screen for managing scales that are owned or managed by an administrative user under an account according to one embodiment of the present invention. The user may create, remove, edit, and view virtual scales. Virtual scales may comprise a digital analog corresponding to a physical scale.

Figure 7A:
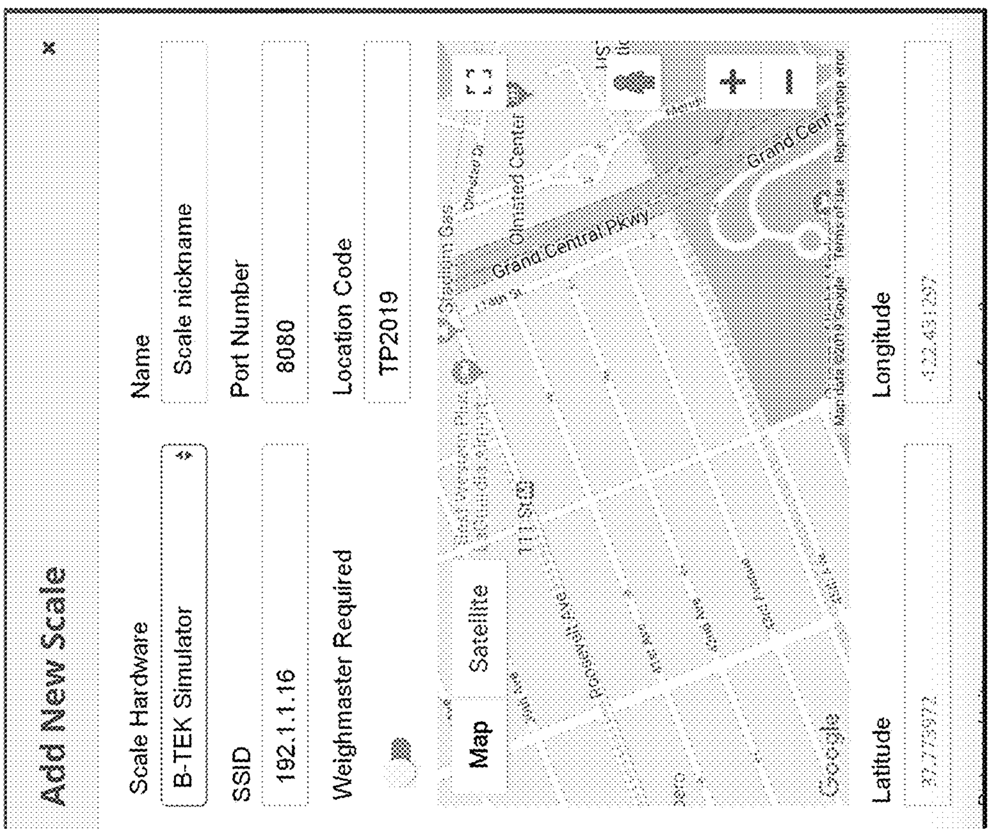
FIGS. 7A and 7B illustrate exemplary interfaces for adding scales according to an embodiment of the present invention.

A pop-up interface may be provided to add a new virtual scale as illustrated in FIG. 7A. The user may input information for creating the scale, such as scale hardware, a scale nickname, SSID, port number, location code and information (including latitude and longitude, and/or scale address), and a weighmaster requirement option.

Figure 7B:
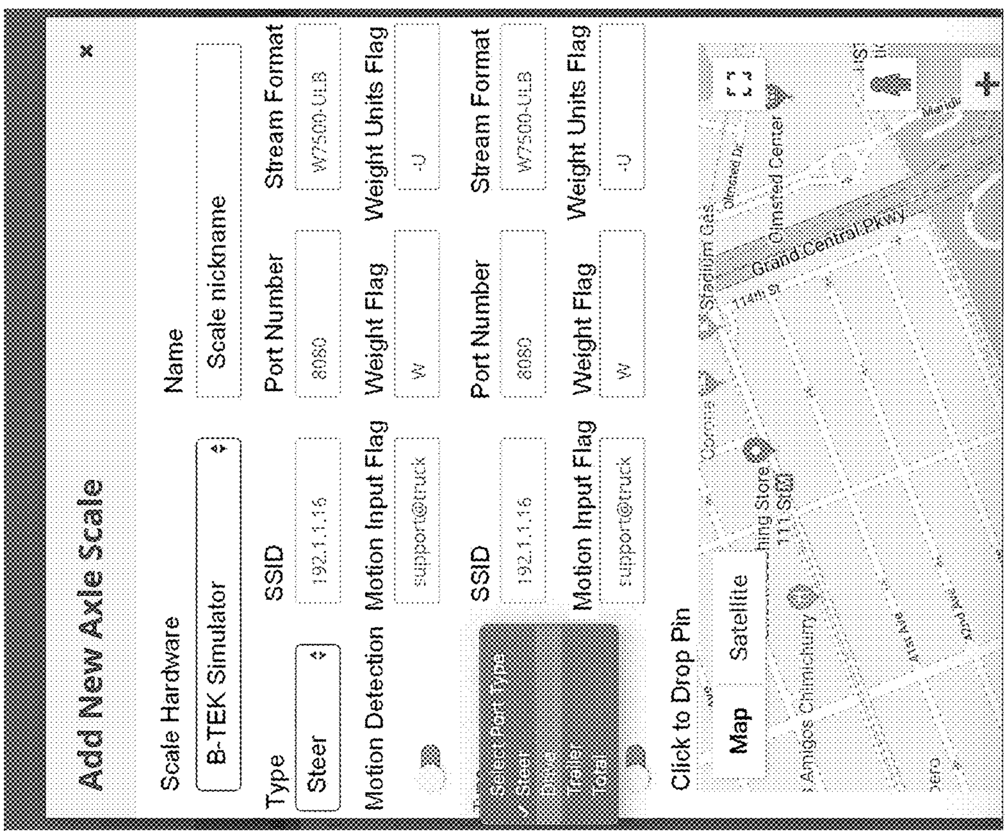

FIG. 7B presents an exemplary interface for providing axle weights to a new virtual scale according to an embodiment of the present invention. If a scale device has axle weighing capability, a multi-port stream representation may be configured as a default data stream transmitted. The virtual scale may override this default and specify exact ports over which different axle strings, containing different axle weights, can be sent. The format of the string/streams that the scale device transmits can be customized by the scale-owner to accommodate their own specific needs. By providing a user interface to graphically describe the format of the string(s) makes it easier for the user to specify how to electronically communicate with an axle weighing scale.

Axle weights may comprise a steer weight, drive weight, and a trailer weight. Alternatively, the scale device may also provide a data stream with the sum of these three weights, also known as the total weight. A weight sum is not required to be specified, as this value may be calculated from the other three weights. Virtual scales may send weighment streams in a given stream format to a kiosk or any server connected to the physical scale for obtaining weighment data for given weighment workflows. A scale-owner may specify any type of stream (format) that a virtual scale sends for a physical scale.

Figure 8:
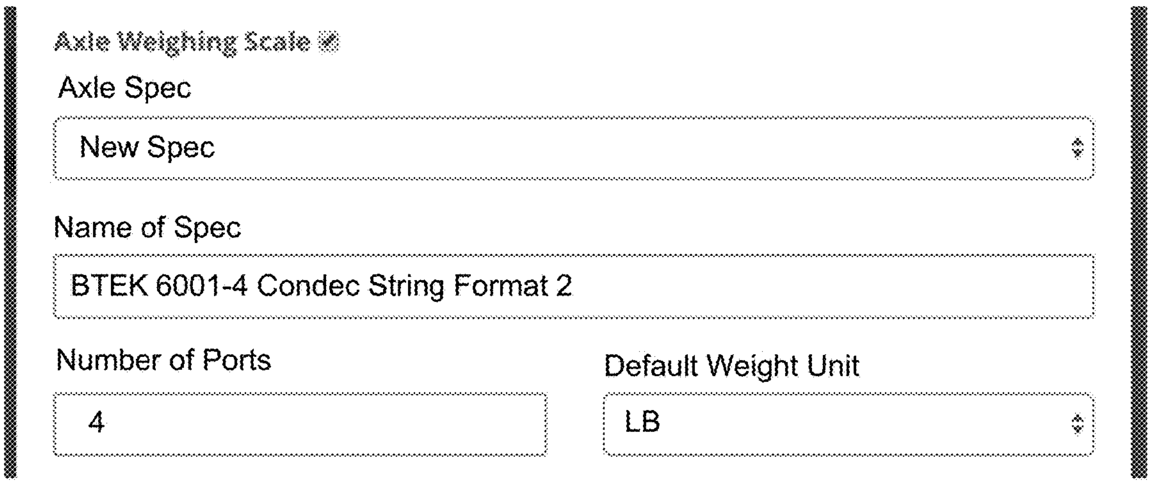
FIGS. 8 through 18 illustrate exemplary interfaces for specifying streams for scales according to an embodiment of the present invention.
Figure 9:

FIG. 8 presents an exemplary interface for axle specification according to an embodiment of the present invention. A scale owner user may select an axle specification for attaching to a scale, such as a previously created (company) axle specification. Existing axle specifications may be edited (FIG. 9). Additionally, a new axle specification may also be created using an interface that may allow a user to specify a name for the new axle specification, a number of ports needed, and a default weight unit, if any. The scale owner user may indicate how many data streams can be sent by a physical scale device and over which ports. Specifically, the user may enter the number of ports, the port numbers, and which of the steer, drive, trailer, and total weight streams are specified on which port(s).

Figure 10:
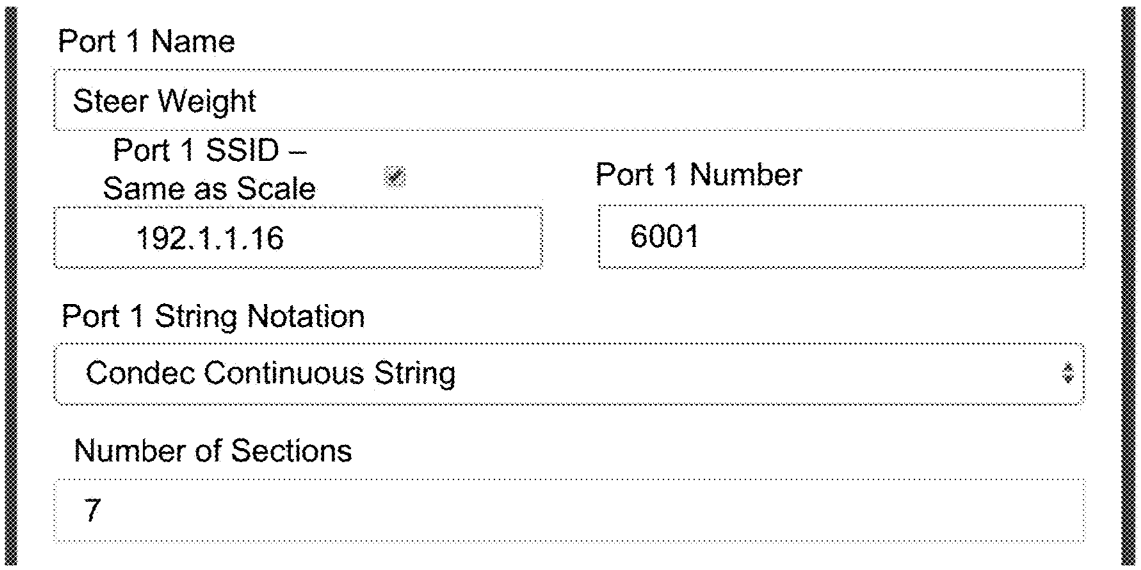
Figure 11:

FIG. 10 presents an interface for configuring port streams according to an embodiment of the present invention. A given port may be assigned a name, an IP address or service set identifier (SSID), a string notation used (e.g., a new string format or a Condec (ISO 9001 certified corporation) string format), and number of sections for the string notation. Selecting a Condec string format may pre-fill forms for string sections based on the selected format. A user may indicate other formats of the string(s) or string notation by typing it in or selecting from a list and graphically indicating where e.g., the steer weight, drive weight, and trailer weight, and total weight are in the string. For multiple ports, the user may configure the format of a particular string sent over the specified port. The user may also configure which weight string, e.g., steer or drive or trailer weight, is sent over which port. The user can also configure if a total weight is sent and over which port. The user may configure which parts of the string corresponds to weight, weight units, and motion flag. The user may also configure where a motion flag, if one exists, and where the weight units are located within each string.

FIGS. 11 through 18 present exemplary port string notation section forms according to embodiments of the present invention. Sections of a string notation may be configured as "String," "Set," "Variable Number," or "Fixed Number" formats according to a given string notation (e.g., Condec Continuous String).

Figure 12:

Headers and trailers may be used to delineate blocks of port stream data. For example, first and last sections of a port string notation may be configured using a "String" format, e.g., "\x02" to denote a start of transmission (FIG. 11) and "\r\n" to denote an end of the transaction (FIG. 12).

Middle sections of a string notation may include information carried by port streams. Information may be indicated in string notation sections using a "Set" format. The "Set" format includes a representation field identifying what a given section represents. The representation field may include parameters that define character(s) to look for and what it would mean.

Figure 13:
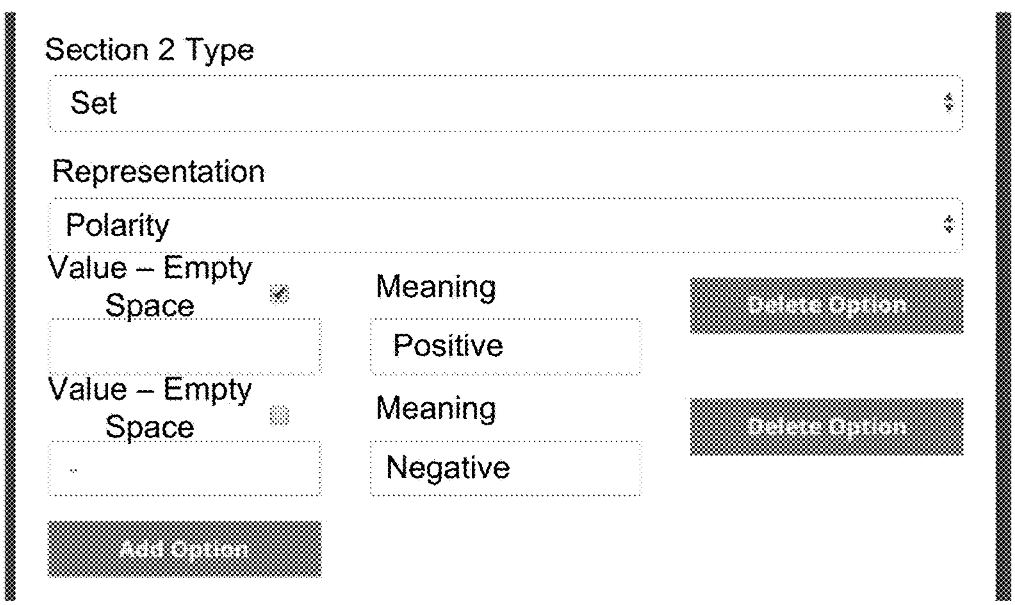

FIG. 13 presents an exemplary interface for configuring a set format section to represent polarity according to an embodiment of the present invention. As illustrated, "Section 2" of a given string notation comprises a "Set" format that is configured to represent polarity. Given values in section 2 are defined with corresponding meanings. An empty space character is defined to indicate positive polarity and a character is defined to indicate negative polarity.

Figure 14:

FIG. 14 presents an exemplary interface for configuring a fixed number format section to represent axel weight type according to an embodiment of the present invention. "Section 3" of a given string notation comprises a "Fixed Number" format that is configured to represent axel weight type. In the illustrated example, steer weight is chosen, however, other axel weight types may be selected, e.g., drive weight, trailer weight, total weight, etc. The fixed number is specified with a given length and padding with empty space.

Figure 15:
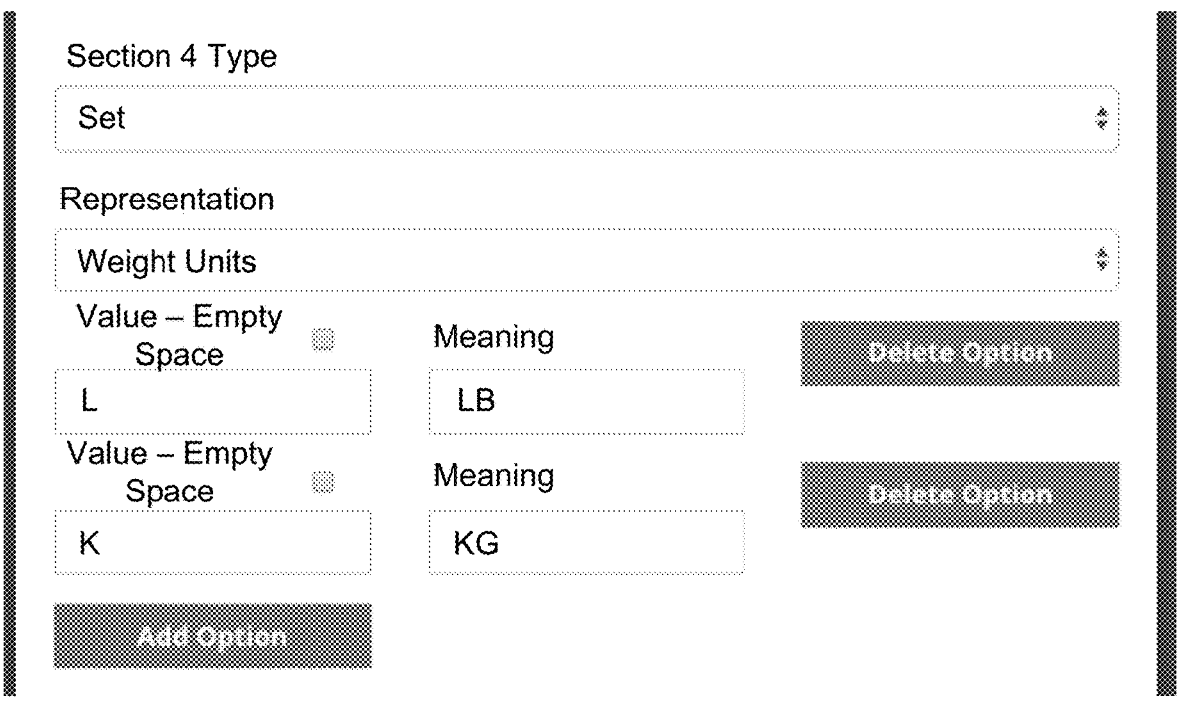

FIG. 15 presents an exemplary interface for configuring a set format section to represent weight units according to an embodiment of the present invention. As illustrated, "Section 4" of a given string notation comprises a "Set" format that is configured to represent weight units. An character is defined as indicating pounds ("LB") and a 'K' character is defined as indicating kilograms ("KG").

Figure 16:
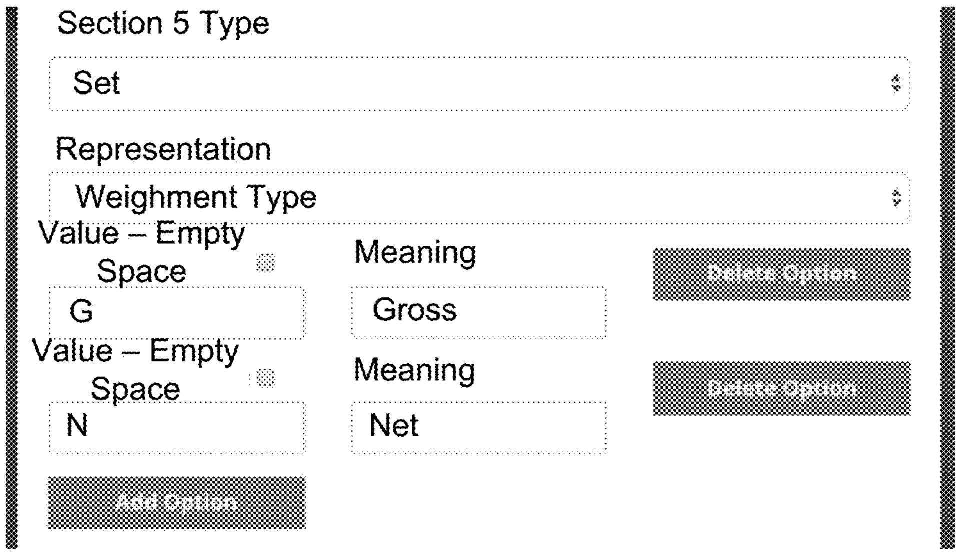

FIG. 16 presents an exemplary interface for configuring a set format section to represent weighment type according to an embodiment of the present invention. As illustrated, "Section 5" of a given string notation comprises a "Set" format that is configured to represent weighment type. A 'G' character is defined as indicating gross weighment and a 'N' character is defined as indicating net weighment.

Figure 17:
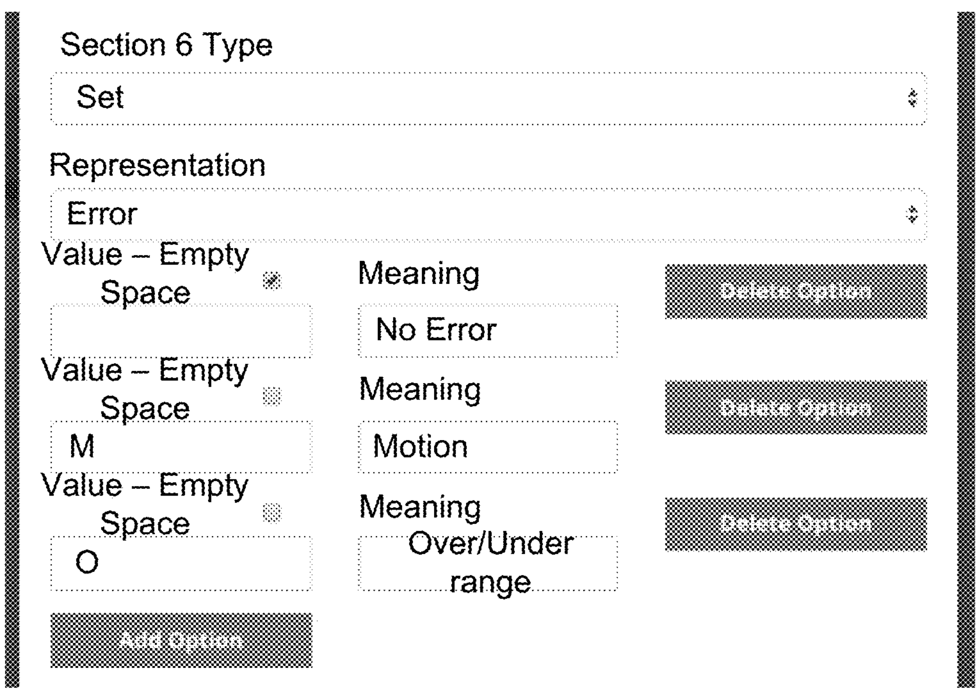

FIG. 17 presents an exemplary interface for configuring a set format section to represent error according to an embodiment of the present invention. As illustrated, "Section 6" of a given string notation comprises a "Set" format that is configured to represent error types. An empty space character is defined as indicating no error, an 'M' character is defined as indicating a motion error, and an '0' character is defined as indicating an over/under range error.

Figure 18:
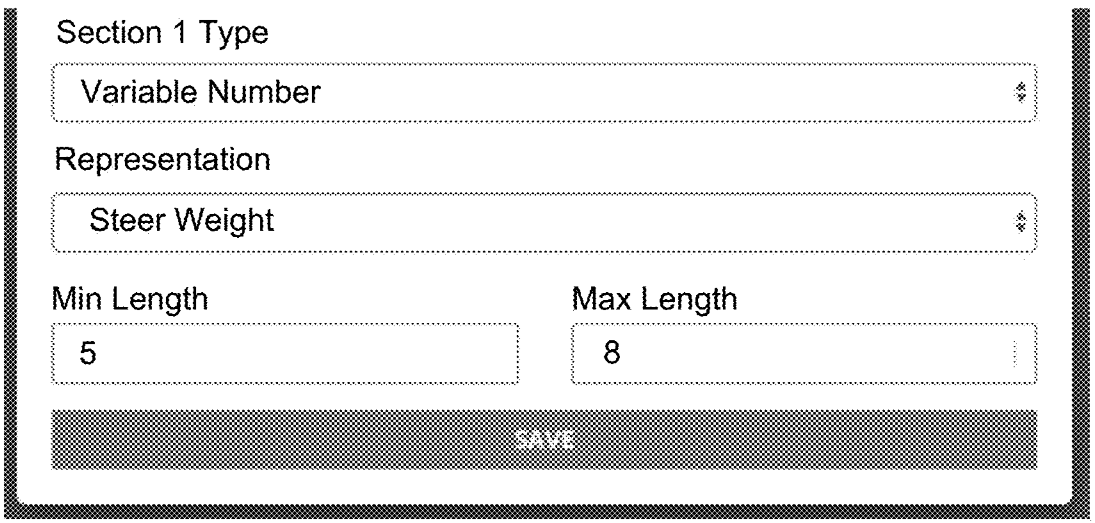

FIG. 18 presents an exemplary string notation using a variable number format according to another embodiment of the present invention. "Section 1" is configured as a variable number format representing axel weight type. In the illustrated example, steer weight is chosen, however, other axel weight types may be selected, e.g., drive weight, trailer weight, total weight, etc. The variable number is also specified as having a minimum and maximum length.

When interfacing between scale and client devices an API may obtain, save, and annotate strings with appropriate delimiters so that they can be matched against a regular expression that describes how the string(s) are to be parsed. The system may parse a scale owner user-indicated format of the string and ask the user to confirm that each value is correct. If the values are not correct, then the user may be shown the problematic part of the string and be given an opportunity to fix it. After fixing the string, the user can have the system try to parse a string again. Once a string representation has been successfully parsed and saved, an API may be able to retrieve it, so that scale owner users or administrators can modify it. A user may take the result of the API and display it, for example, on the web, so that the user can see which parts of the string(s) represents the steer, drive, trailer weight, and the other parts of the string(s) that were originally saved.

Figure 19:
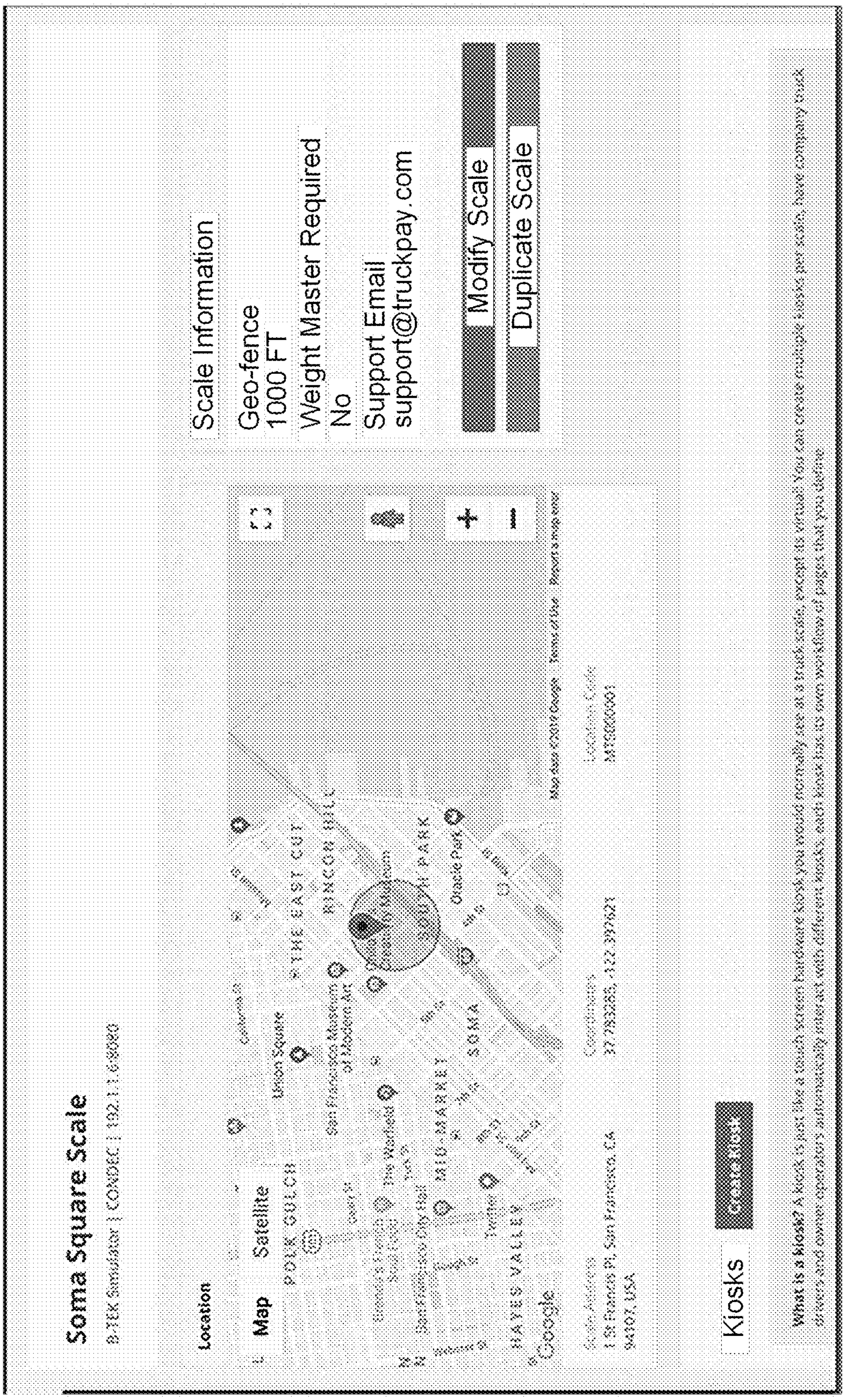
FIGS. 19 through 26 illustrate exemplary screen interfaces for configuring virtual scales and kiosks in a truck scale management system according to an embodiment of the present invention.

Any one of the created virtual scales may be selected for viewing of scale information and details. The exemplary illustration of FIG. 19 presents a scale view of a given one of existing virtual scales in the account. The scale view displays a location of a physical scale (e.g., map view including address, coordinates, and location code) and scale information that was provided in creating the virtual scale. In the illustrated example, the scale information includes geo-fence distance, weigh master requirement, and a support email address. The scale view also allows the user to modify the scale (information) or duplicate the virtual scale to create another virtual scale entry.

Figure 20:
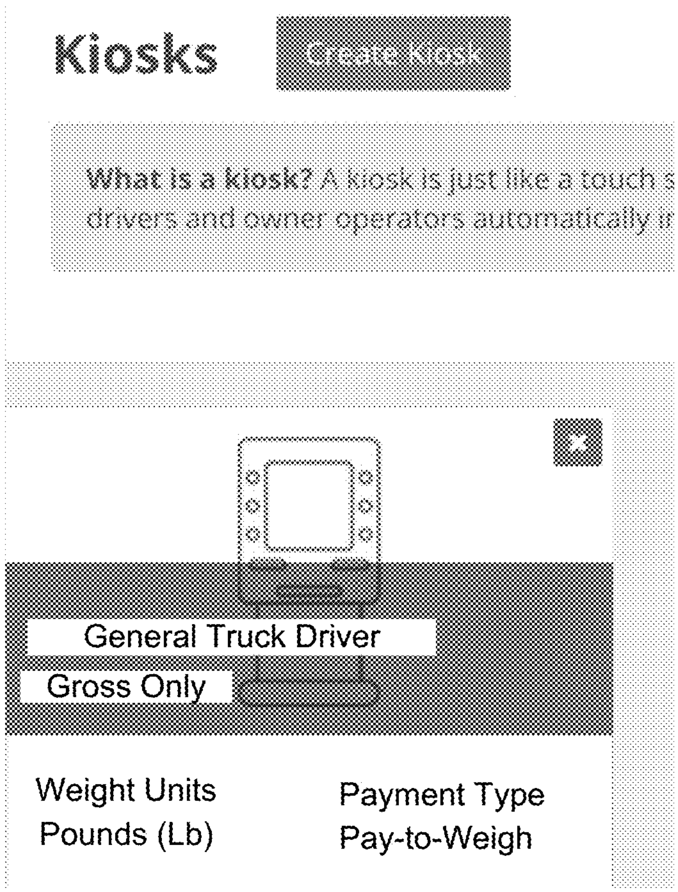

The scale view further includes one or more virtual kiosks connected to the virtual scale. The scale view includes an option to view, create, and remove kiosks for the virtual scale, as provided in the illustration of FIG. 20. A virtual kiosk may be created to electronically document the use of a scale, for example, to accept credit card payments or account billing for pay to weigh scales. A virtual kiosk may also be configured to record items such as truck and trailer IDs as well as the material being weighed. Multiple kiosks may be created for a scale. Truck driver users may connect to a scale's different virtual kiosks, depending upon how they need to use the scale and the types of authorization they have been given.

Figure 21:
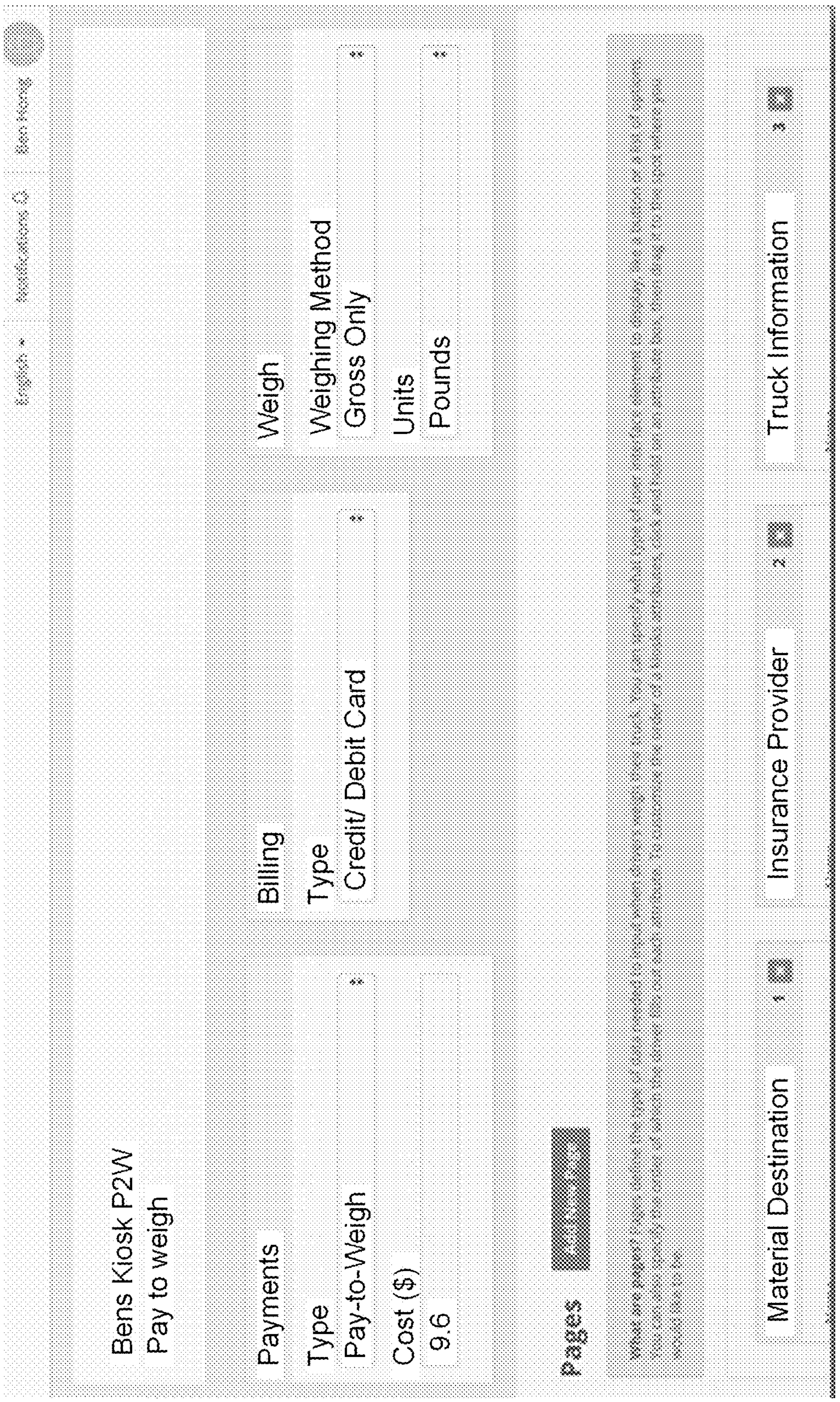
Figure 22:
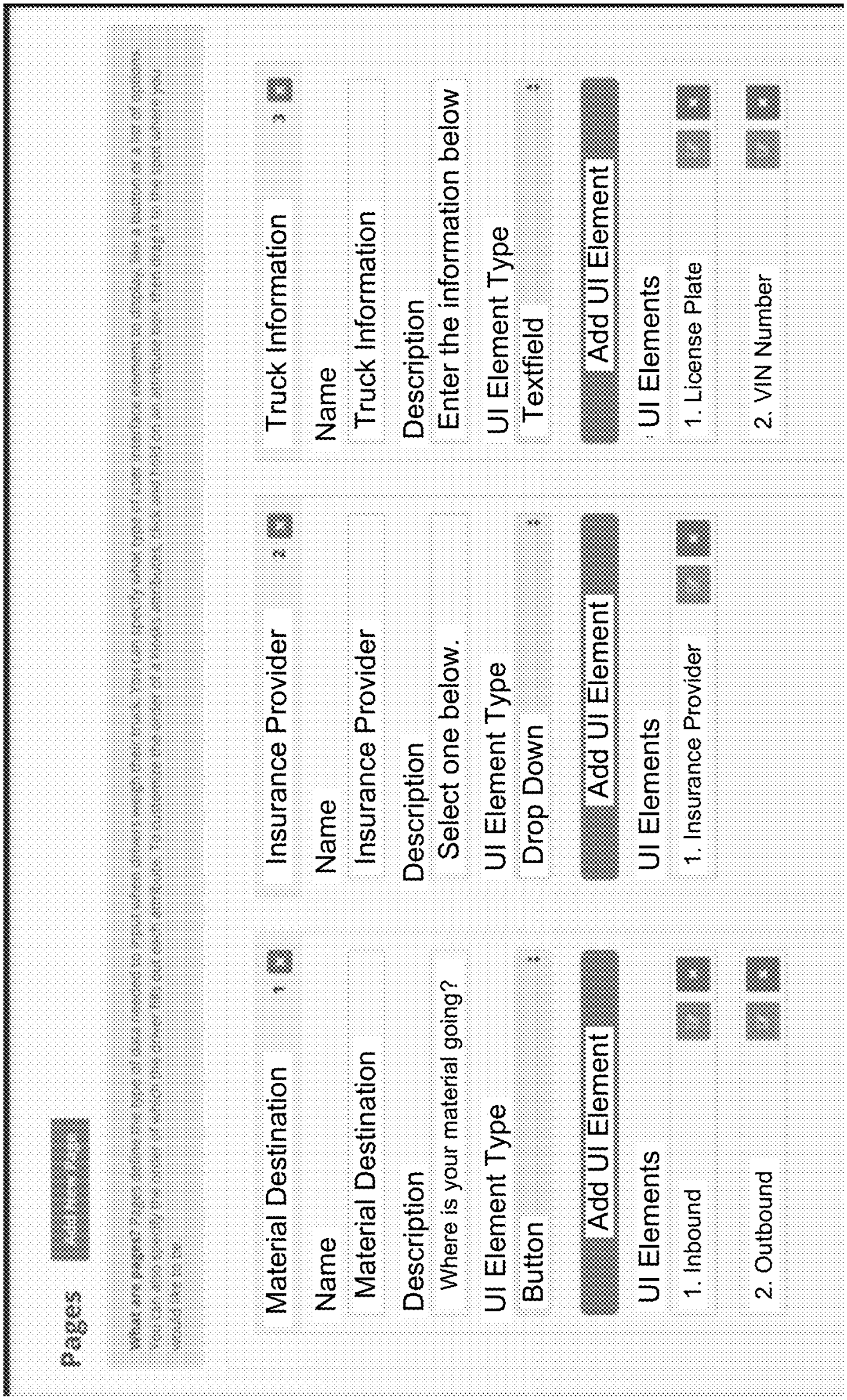
Figure 23:
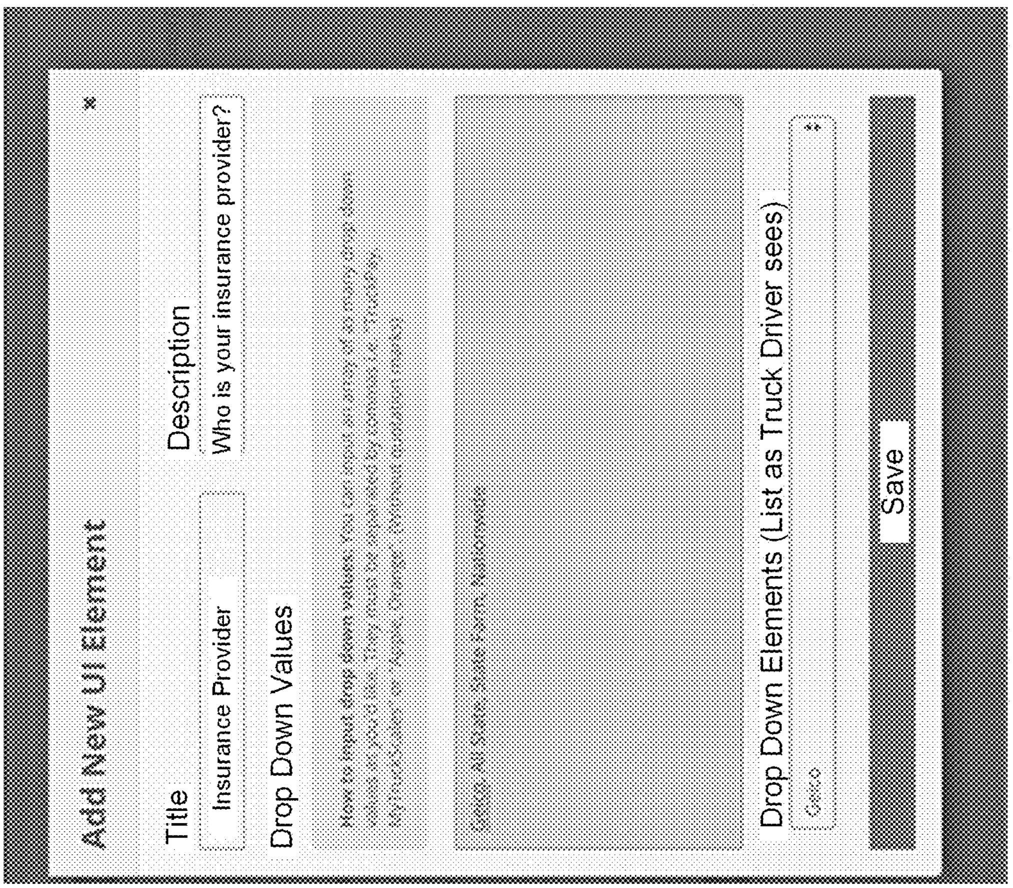

FIG. 21 presents an exemplary kiosk view of a given kiosk created for a virtual scale according to one embodiment of the present invention. The user may view and edit a given virtual kiosk and its pages. Each kiosk may include a workflow of pages that can be added and edited. A user may create pages that define the workflow for the kiosk, as illustrated in FIG. 22. Pages of a kiosk may define types of data that are solicited by the kiosk. An order of which pages presented by the kiosk may also be configured. For example, to customize the order of kiosk pages, an attribute box (e.g., "MATERIAL DESTINATION," INSURANCE PROVIDER," OR TRUCK INFORMATION") may be dragged and rearranged in a desired order. Pages may contain a title, description, a UI element type, and UI element attributes. FIG. 23 presents an exemplary interface for adding a new UI element on a given page according to one embodiment. A UI element may be used to define a predefined list of inputs that may be selected from, e.g., text-fields, buttons, and dropdown selectors.

Figure 24:
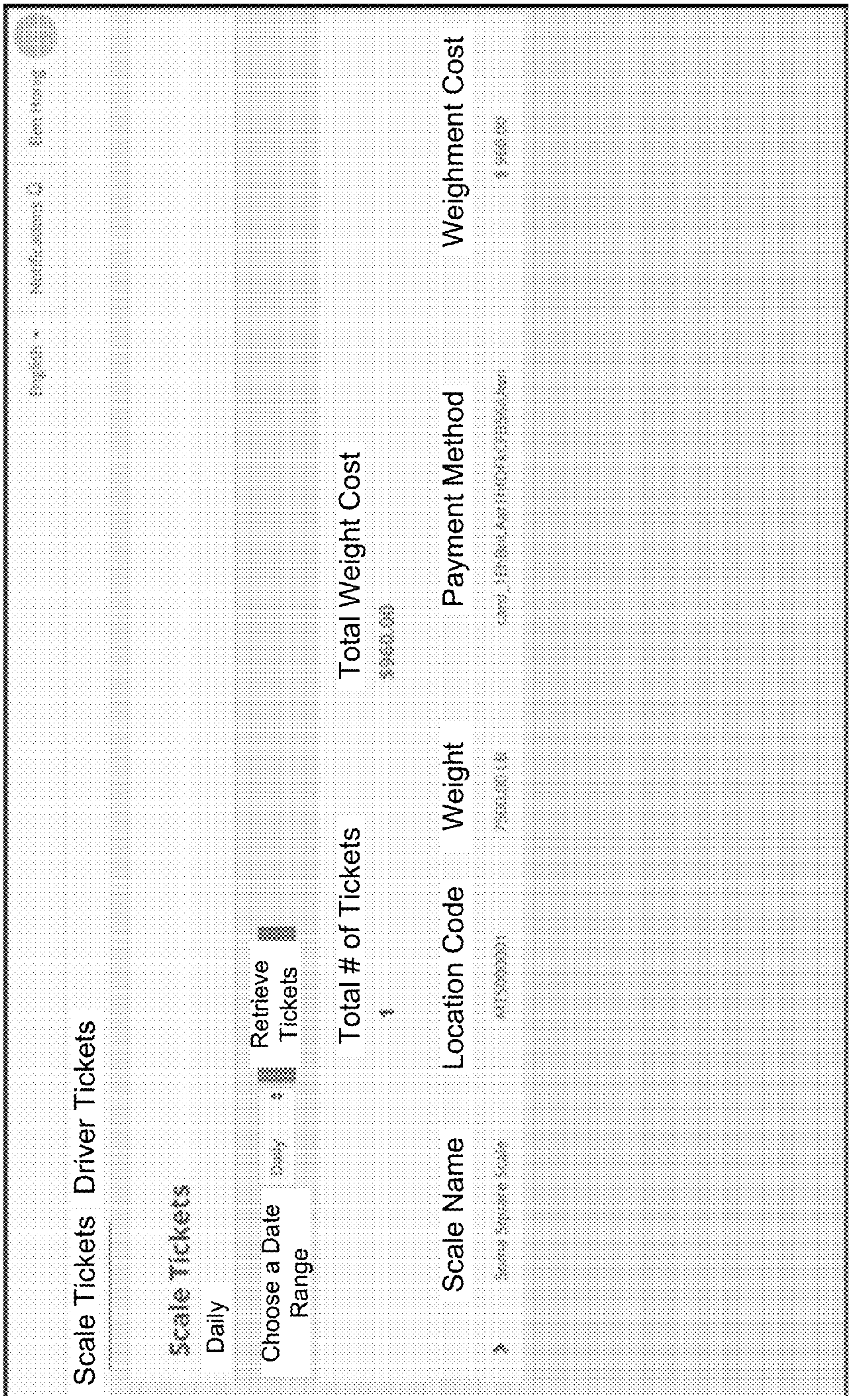

FIG. 24 presents an exemplary tickets interface according to one embodiment of the present invention. The administrative user may be able to view scale tickets and driver tickets produced by the scale management system from the operation of the kiosk and scales. Tickets may be retrieved for any period, e.g., daily, weekly, monthly, annual, etc. A ticket may include information, such as scale name, location code, weight, payment method, and weighment cost.

Figure 25:
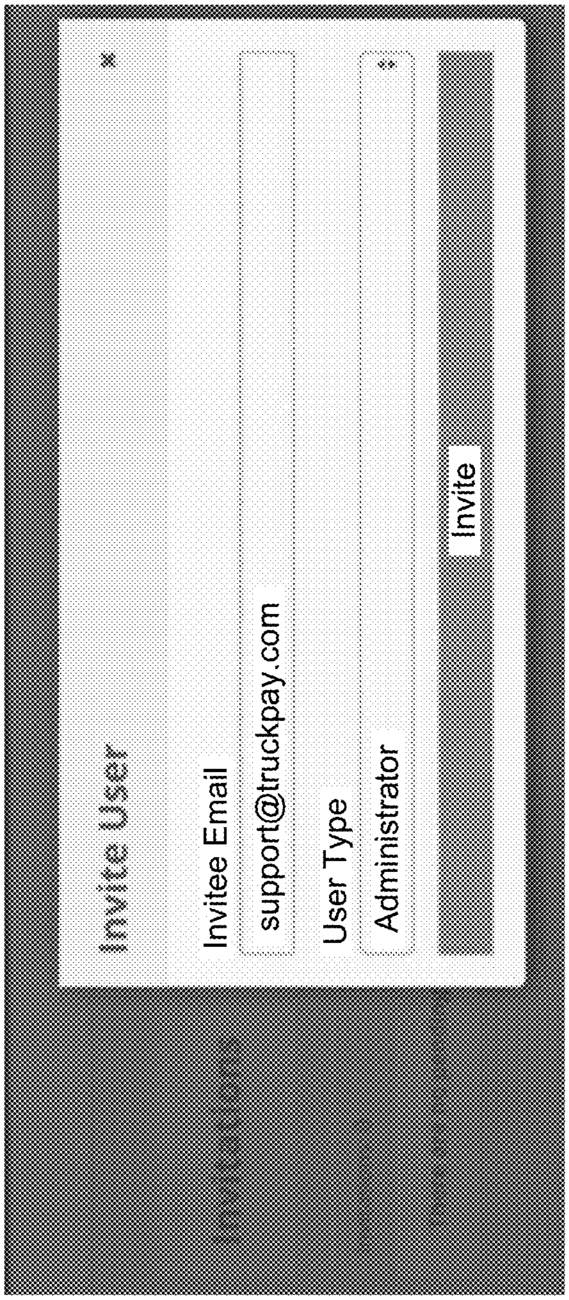

The disclosed truck scale management system may be a highly secured system with role-based application entitlement. The administrator user may be allowed to create user access to truck scale management system, as illustrated in FIG. 25. Users may be invited as either a truck driver user, an administrator, or a scale distributor. The ability to create virtual scales/kiosks and authorize invoice payments may be limited to administrators, whereas truck driver users may be limited to accessing the virtual kiosk/scales to weigh their trucks. A scale distributor may be configured to be associated with the scale owner's company such that the scale distributor can perform scale configurations on behalf of the scale owner.

Figure 26:
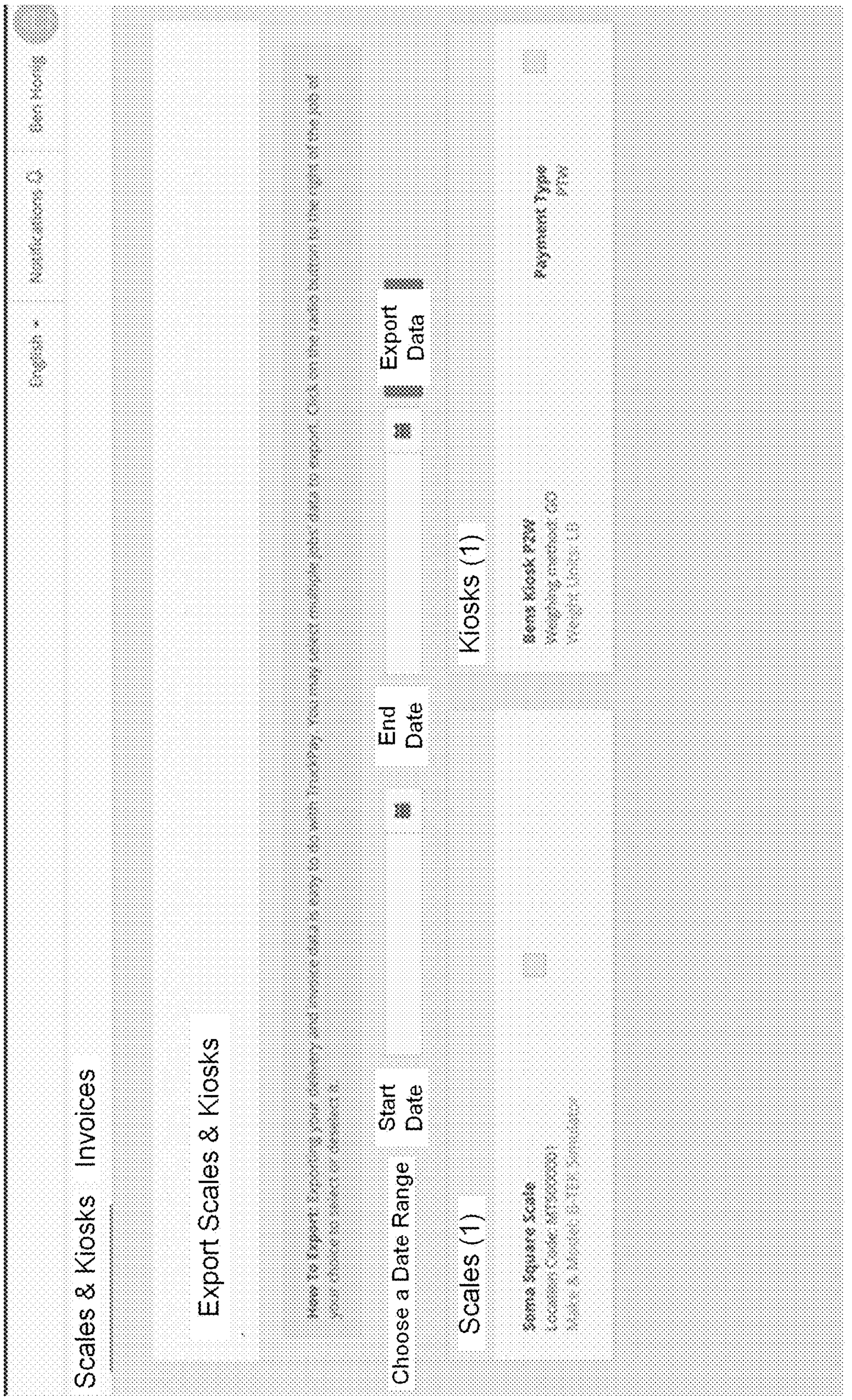

FIG. 26 presents an exemplary interface for exporting weighing and invoice data, e.g., in the form of weigh tickets and invoices from the scales and kiosks according to an embodiment of the present invention. The interface may allow for selection of particular weigh tickets and invoice data to export, such as from particular scales or kiosks. Scale and kiosk data may be exported in file formats, such as Portable Document Format (PDF), spreadsheet (e.g., Excel), and Comma-Separated Values (CSV). Weighments and invoices may also be exported to other upstream or downstream enterprise resource planning (ERP) systems, such as enterprise system software from SAP, Sage or another vendor, via an API.

Figure 27:
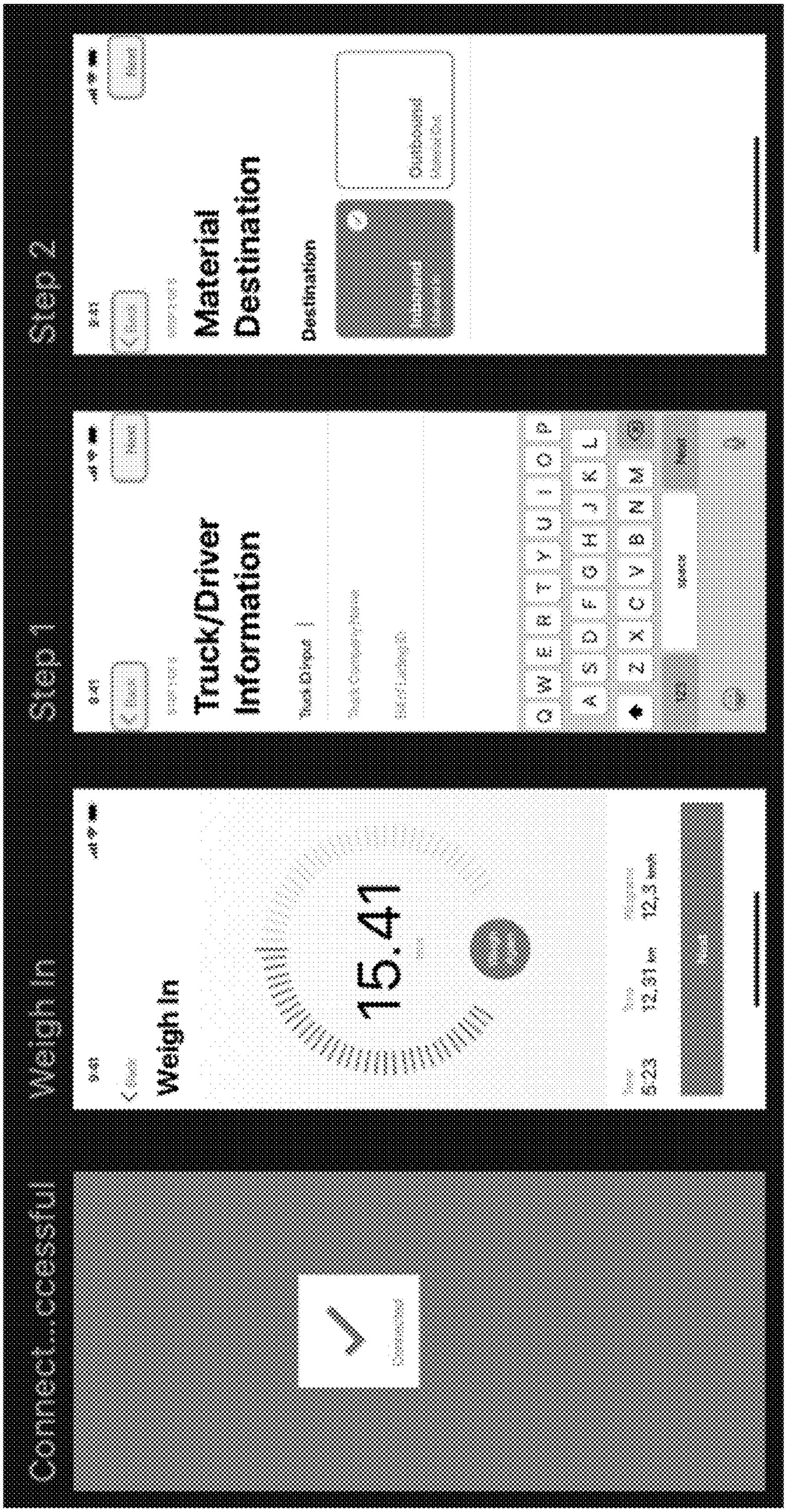
FIGS. 27 through 30 illustrate exemplary screen interfaces for operating a scale with a truck scale management system according to an embodiment of the present invention.
Figure 28:
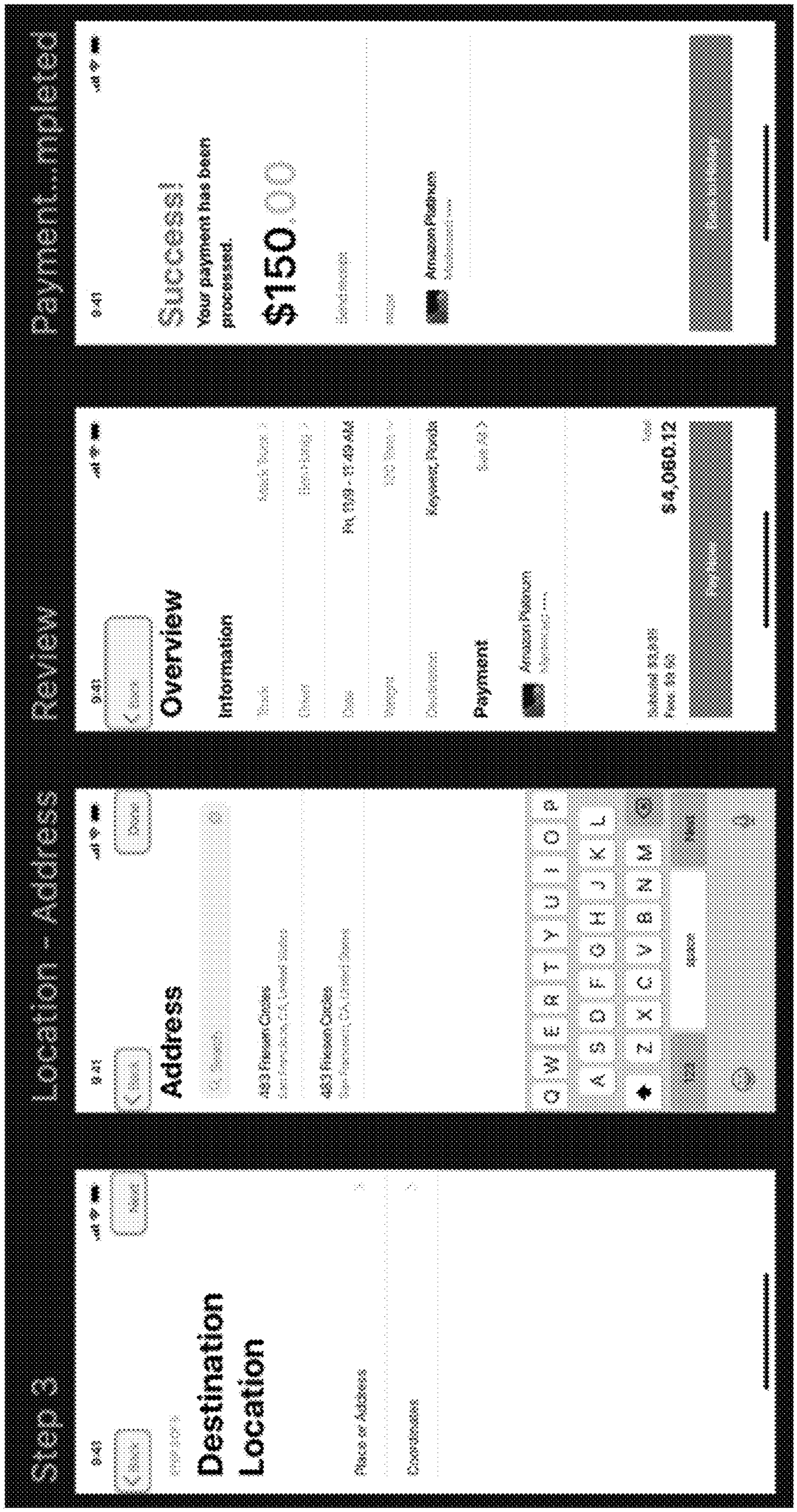

FIGS. 27 and 28 present exemplary interfaces for using, accessing and utilizing a scale configured with a truck scale management system according to an embodiment of the present invention. A truck driver may pull onto a truck scale and tap a "connect to scale" button on an application executing a virtual kiosk on a mobile device to connect to a scale. For example, the truck driver or mobile device of the truck driver may specify a location to locate a nearest scale and initiate a workflow for weighing via a virtual kiosk. Scale location codes may be employed when pick-ups or deliveries are made to help locate a scale, if for example, location services aren't turned on.

The virtual kiosk can be one of many, or a same virtual kiosk used for a plurality of users at a truck scale system or a particular truck scale. The virtual kiosk may connect to the scale via an SSID (or IP address, or static IP address) and port number and parse a string (according to a given string format) containing axle weights of a truck including steer, drive, trailer, and gross weight ("Weigh In"). The weight is displayed on the driver's mobile device. If the driver has not turned on data location services on the mobile device, then a location code displayed at the truck site may be inputted to tell the server the location. This may enable the mobile device to automatically connect to the scale.

Once connected to the scale ("Connect . . . successful"), the application may download an appropriate virtual kiosk for the truck driver. The application may then build and render custom views based on the parameters from the pages defined in the virtual kiosk. The application may then guide the truck driver through the customized workflow of the virtual kiosk ("Weigh In," "Step 1," "Step 2," "Step 3," "Location—Address," Review," and "Payment . . . completed.").

In one example, if weighing gross weight, the driver may be asked if the truck is already on the scale and ready for gross weigh in. Once the driver taps yes, weight may be captured and saved, along with date and time of the weighing. The driver may be prompted to confirm the weight and the fact that a gross weight was captured should be recorded. If a weighmaster is required (as configured in the virtual kiosk), then the driver may be told to call the weighmaster to complete the weighment. Additionally, in the event of weighing by TG and the current weighing is the gross weighing, a re-weighment cost may be given for this ticket. Similarly, if weighing by GT and the current weighing is tare weighing, a re-weighment cost may be given for this ticket.

For pay to weigh virtual kiosks, the truck driver may input credit card or company account information for automatic billing in order to pay for the weighment. A ticket may then be generated in a database. In cases where no payment is required for the use of the scale, then no payment information is requested. The virtual kiosk may allow a scale owner to have his scale used as either a credit card or an account-based pay to weigh scale or as a free scale, depending on who is using it. Different types of information and workflow may be collected and presented, depending on the truck driver who is using the kiosk.

Figure 30:
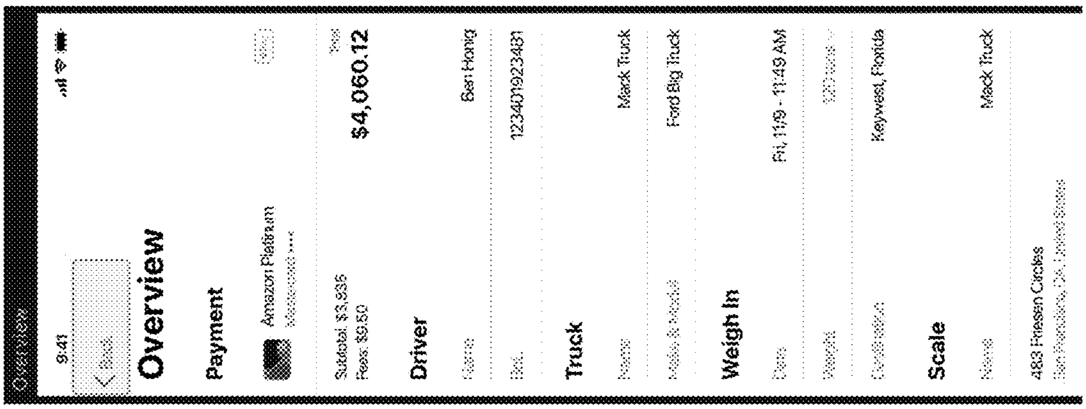
Figure 29:
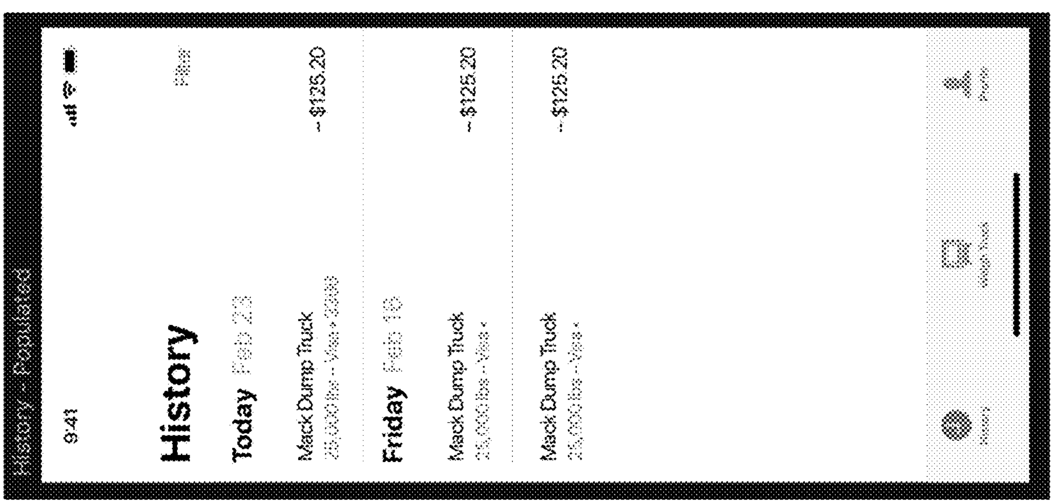

Users can view a history of all tickets generated for a particular virtual kiosk/scale (as shown in FIG. 29) and view any data associated with the virtual kiosk/scale. This includes, but is not limited to, data input on the virtual kiosk, as exemplified in FIG. 30.

Figure 31:
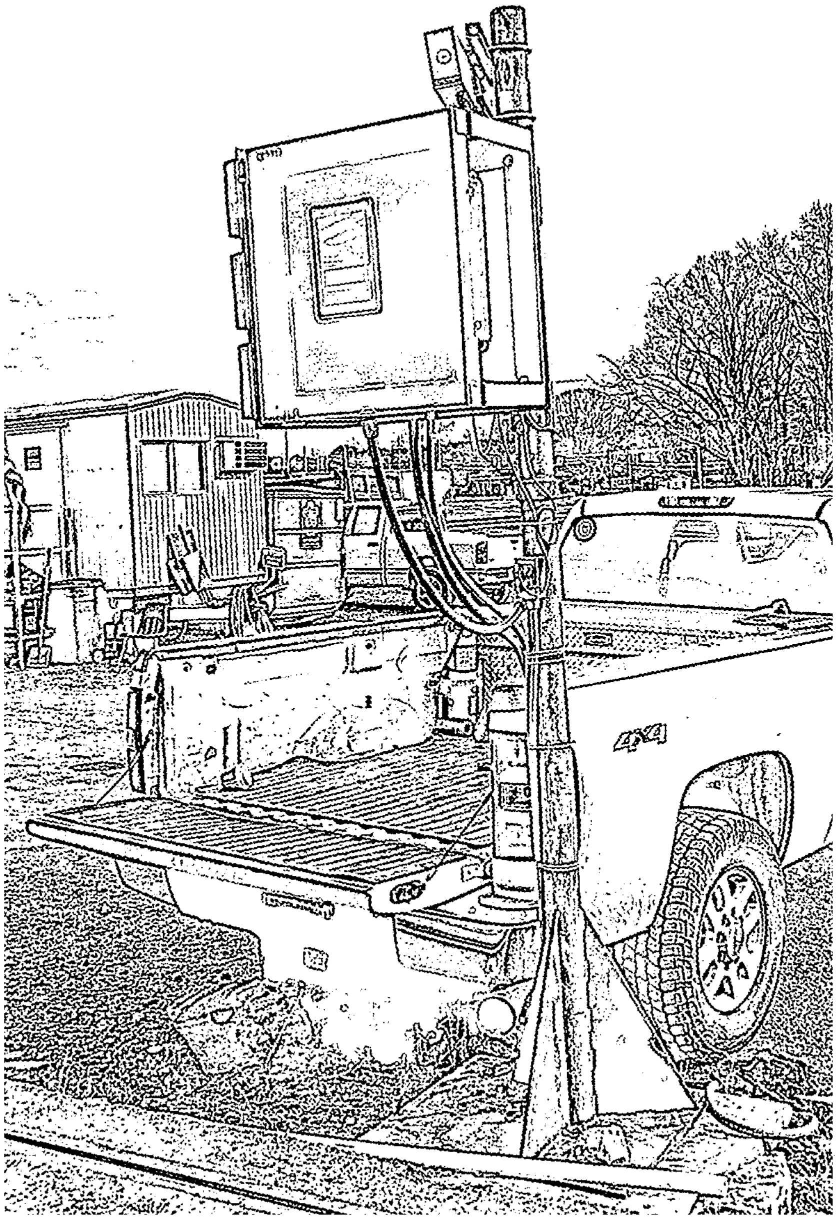
FIGS. 31 and 32 illustrate a tablet kiosk device according to an embodiment of the present invention.
Figure 32:
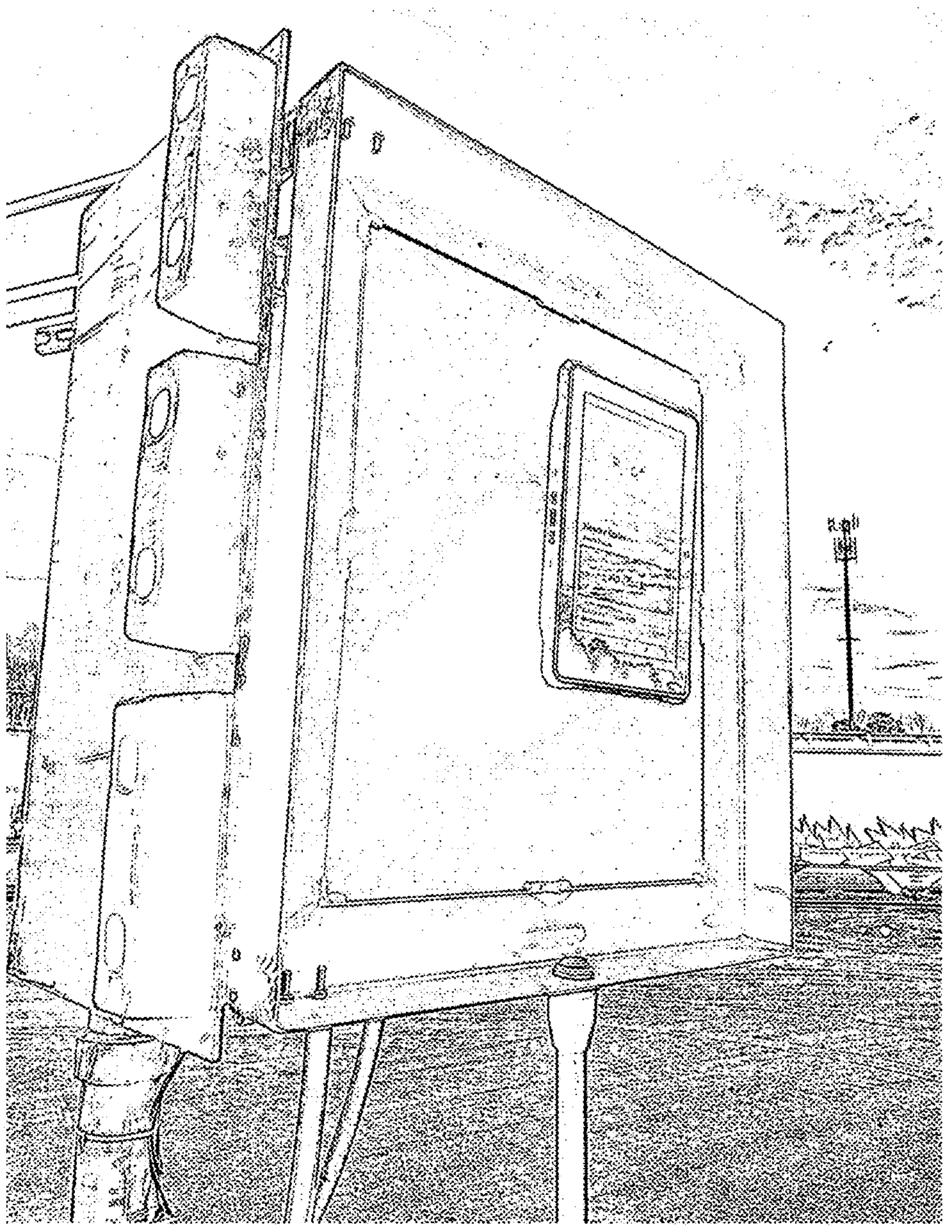

FIGS. 31 and 32 present a tablet kiosk device according to an embodiment of the present invention. A tablet kiosk device may comprise a site-provided client device that allows a driver to use the disclosed weighment workflows. According to one embodiment, a site may comprise a plurality of tablet kiosk devices allowing for a plurality of users to execute weighment workflows simultaneously. Virtual tablet kiosks may execute on the tablet kiosk devices to enable the public use of weighment workflows via a single login mode user using messaging communications, such as email and/or SMS to send weigh tickets to the user.

Figure 33:
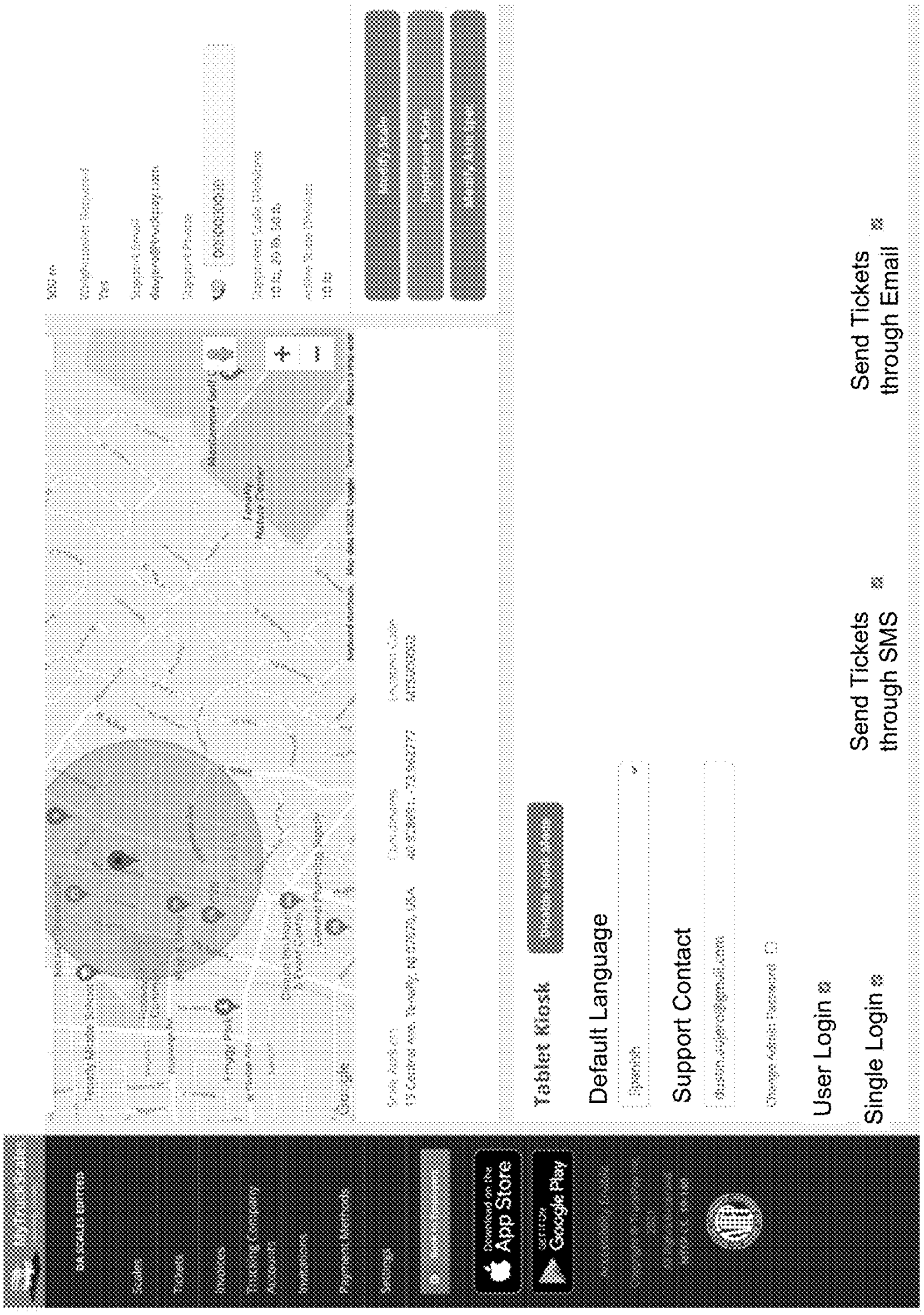
FIG. 33 illustrates a scale view of a virtual scale supporting a virtual tablet kiosk according to an embodiment of the present invention.

FIG. 33 presents a scale view of a virtual scale supporting a virtual tablet kiosk according to an embodiment of the present invention. The scale view displays a location of a physical scale (e.g., map view including address, coordinates, and location code) and scale information that was provided in creating the virtual scale (e.g., geo-fence distance, weigh master requirement, and support information). The scale view also allows the user to modify the scale (information), axel specification, or duplicate the virtual scale to create another virtual scale entry.

The scale view further includes one or more virtual kiosks connected to the virtual scale. As illustrated, the virtual scale can be interfaced with a virtual tablet kiosk. Parameters of the virtual tablet kiosk may be edited. The parameters include a default language, an email address or phone number for support, single login, user login, send tickets through short message service ("SMS"), and send tickets through email address. A virtual tablet kiosk may be executed on a computing device (e.g., a tablet computer) to communicate with the virtual scale. The computing device may connect to the virtual scale via a communication network by specifying a SSID or location identifier to a server.

The virtual tablet kiosk may be configured to operate in a single login mode that allows truck weighing and provides fields for entering a driver's (e.g., virtual tablet kiosk user) phone number or email address. The "single login" mode may comprise a guest login feature that solicits the email address or phone number from driver to execute workflows associated with weighments, ticket generation, and payment (for pay-to-weigh) operations as disclosed above. A server communicating with the virtual tablet kiosk for executing the workflows may use the driver provided email address or phone number to track a weighment ticket and direct weighment flow for the virtual tablet kiosk user, e.g., TG, GT, and TO weighments. The driver's email address or phone number may be used to send the weighment ticket and may be saved as part of the ticket. For pay-to-weigh, the driver may enter credit card or payment details prior to truck weighing.

The virtual tablet kiosk may also be configured to operate in a "user login" mode where the driver may login with a user account as disclosed above.

The scale owner may be able to see a ticket history for a particular virtual tablet kiosk on their scale ticket history report. A scale-owner may also view activities on a plurality of virtual tablet kiosks and indicate on a ticket report that certain tickets originated from a particular virtual tablet kiosk.

Figure 34:
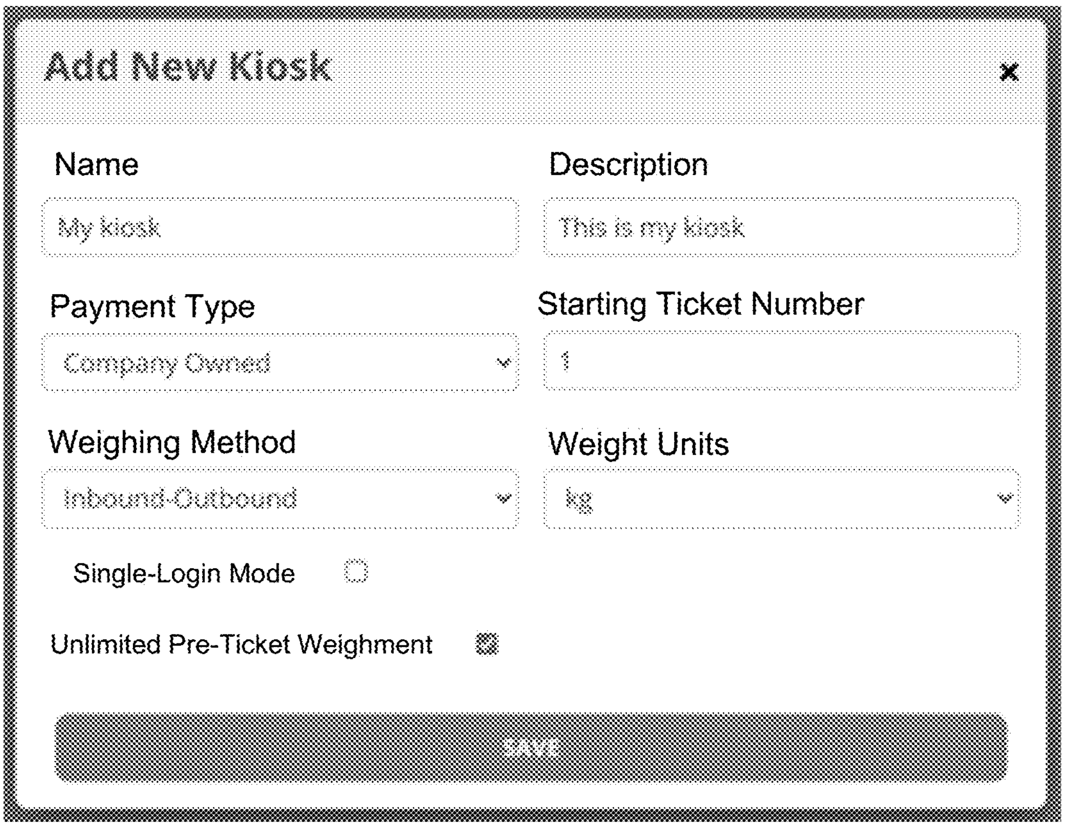
FIG. 34 illustrates an exemplary interface for adding a new virtual kiosk for a virtual scale according to an embodiment of the present invention.

FIG. 34 presents an exemplary interface for adding a new kiosk for a virtual scale according to an embodiment of the present invention. A virtual kiosk may be created with data fields including name, description, payment type, starting ticket number, weighing method, and weight units. The virtual kiosk may be configured to operate in a single login mode (e.g., for a virtual tablet kiosk) and/or include unlimited pre-ticket weighment. Unlimited pre-ticketed re-weighments may comprise configuring a virtual kiosk such that a driver can reweigh their truck as often as they like and have a weigh ticket generated when the driver indicates completion, e.g., selects a done button.

An inbound/outbound weighing method may also be configured for a virtual kiosk such that the driver user can specify whether a truck is inbound or outbound or determined based on inbound and outbound weights. For example, the virtual kiosk may determine a tare weight and a gross weight from truck weighment. Specifically, the lower of the two weights may be determined as the tare weight and the higher may be the gross weight.

In some embodiments, the inbound/outbound weighment method may be configured for the virtual kiosk such that the driver may specify a weighment method for a pay-to-weigh kiosk. In this embodiment, the driver may specify a payment method, e.g., debit or credit card, payment account information or another payment method, to purchase products, e.g., gravel at a quarry, or services, e.g., dumping materials at a landfill. In a case where the driver is receiving payment, e.g., a peddler selling scrap metal to a scrap yard, the virtual kiosk may also be configured to receive an input of an account at which to receive payment, e.g., a debit card or other account information.

Figure 35:
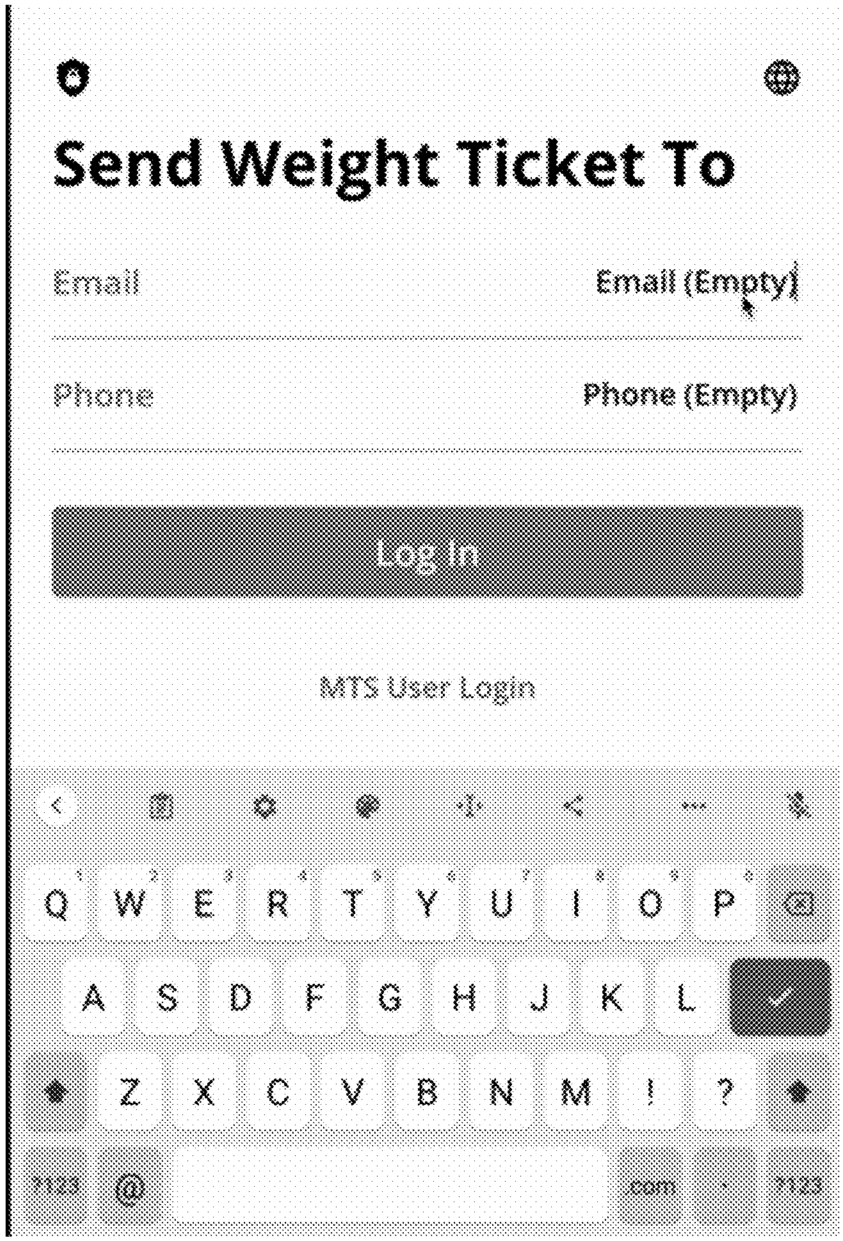
FIGS. 35 through 46 illustrate exemplary screen interfaces for inbound/outbound weighing according to an embodiment of the present invention.

FIGS. 35 through 46 present exemplary screen interfaces for inbound/outbound weighing according to an embodiment of the present invention. A computing device may be provided at a weighing site for accessing a scale device. The computing device may execute an application including e.g., a virtual tablet kiosk configured in a single login mode. As illustrated in FIG. 35, the virtual tablet kiosk presents a guest login interface that solicits an email address and/or phone number from a driver.

Figure 36:
Figure 37:
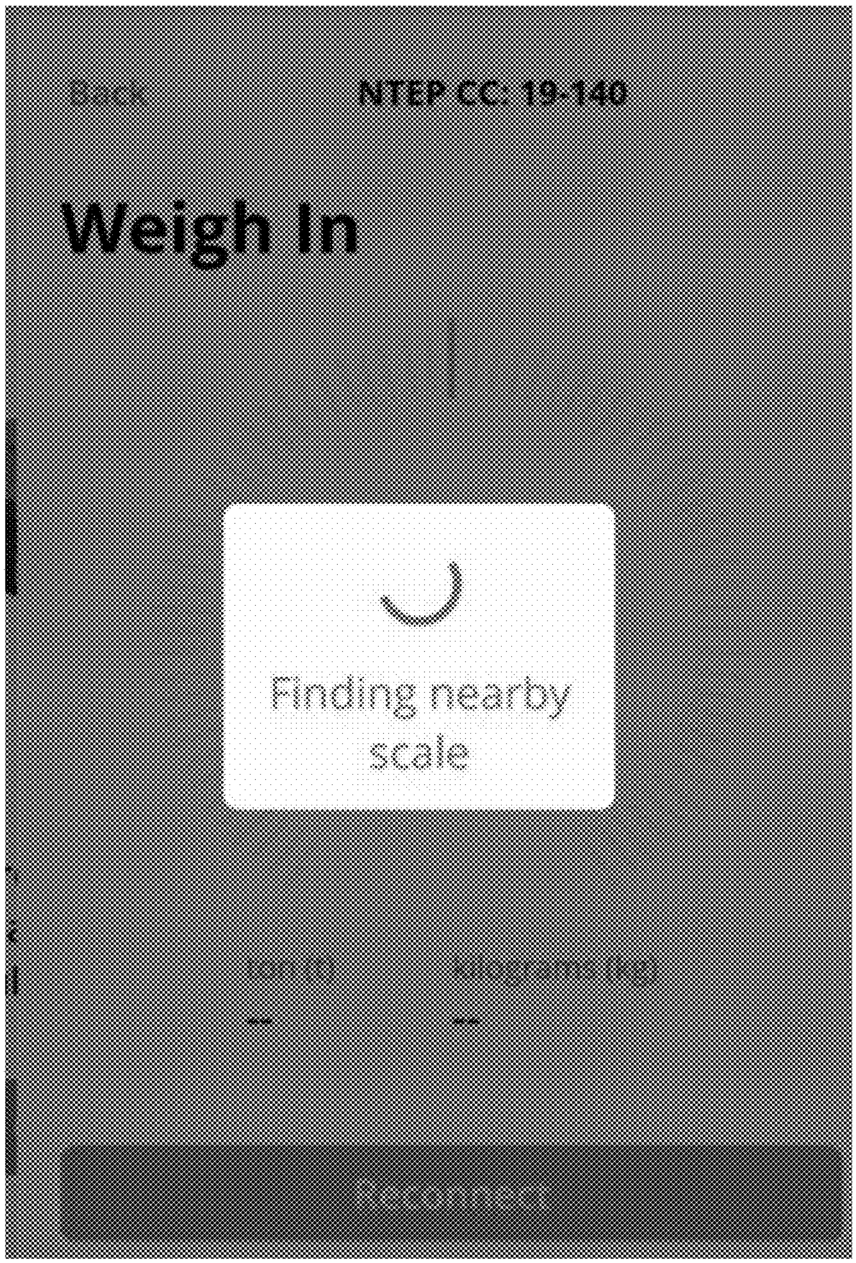
Figure 38:
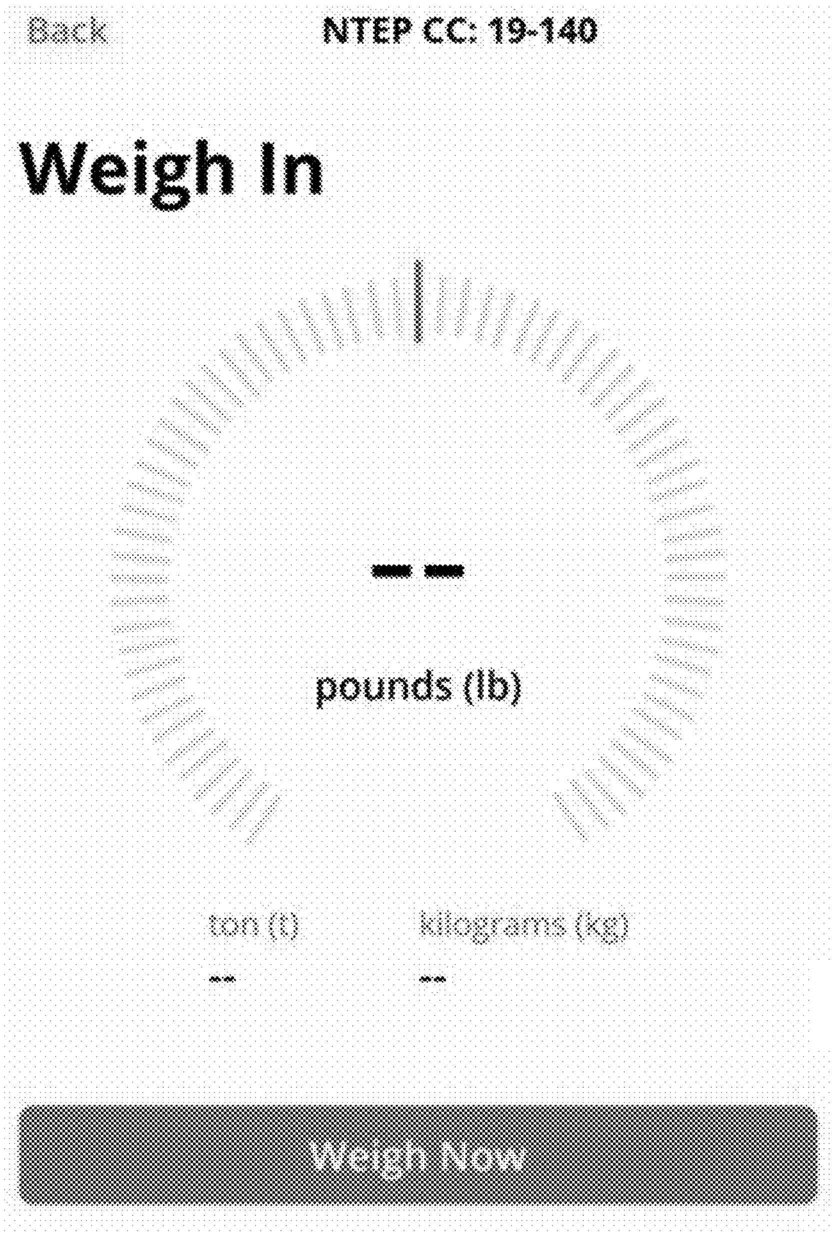
Figure 39:
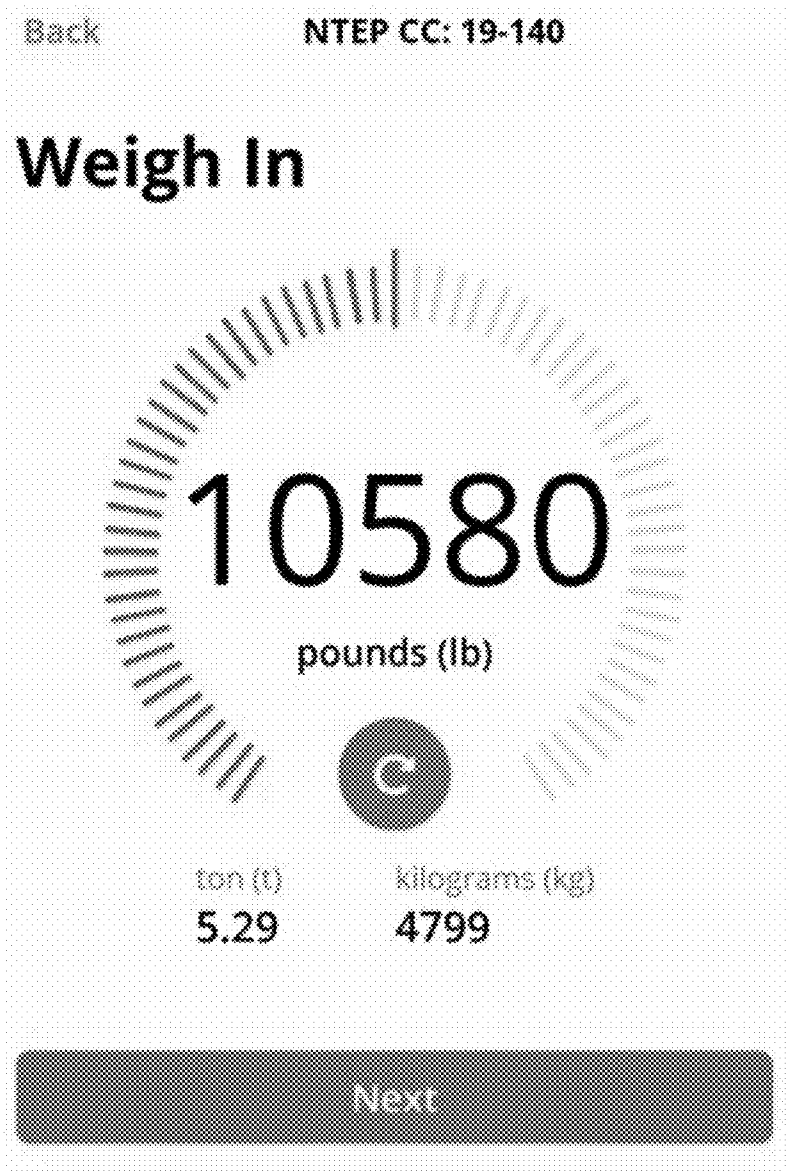

Upon an email address and/or phone number, the virtual tablet kiosk instructs the driver to position their truck on the scale device and provides a button to connect to the scale device to weigh the truck (FIG. 36). The virtual tablet kiosk may identify and connect to a nearby scale device (FIG. 37). Once connected to a scale device, the driver may proceed to initiate weighment, FIGS. 38 and 39.

Figure 40:
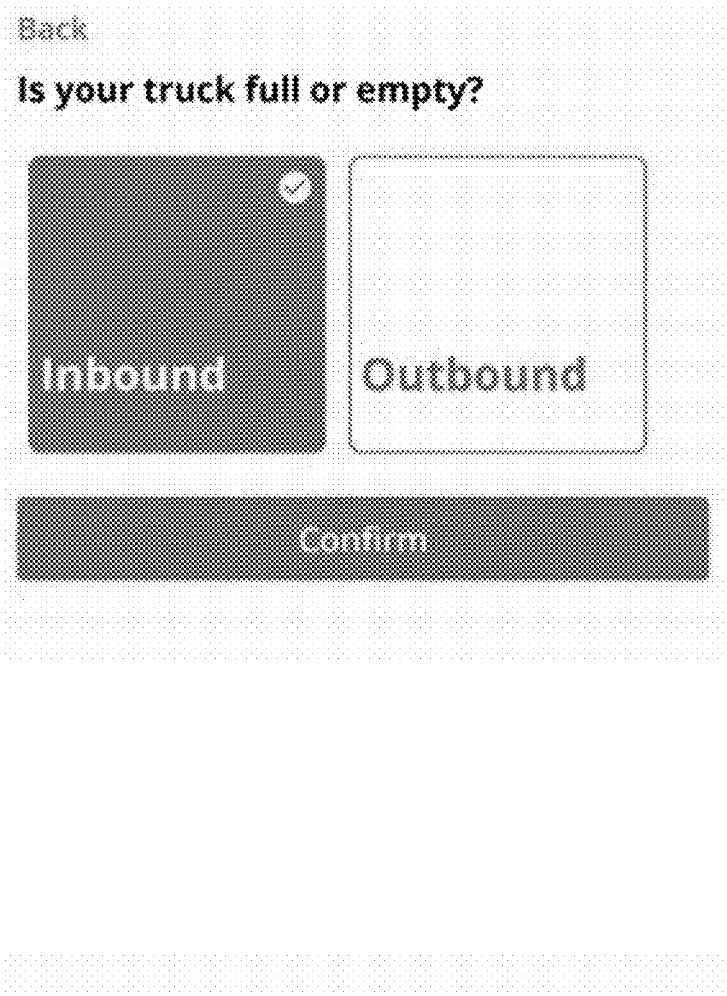
Figure 41:
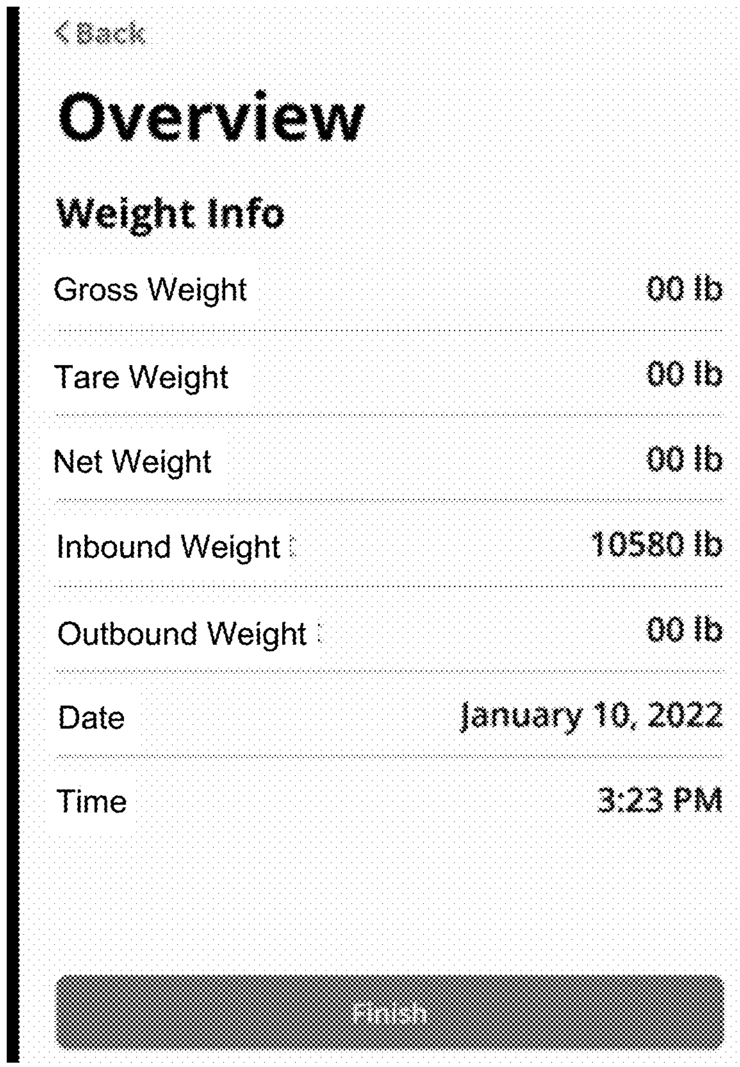
Figure 42:
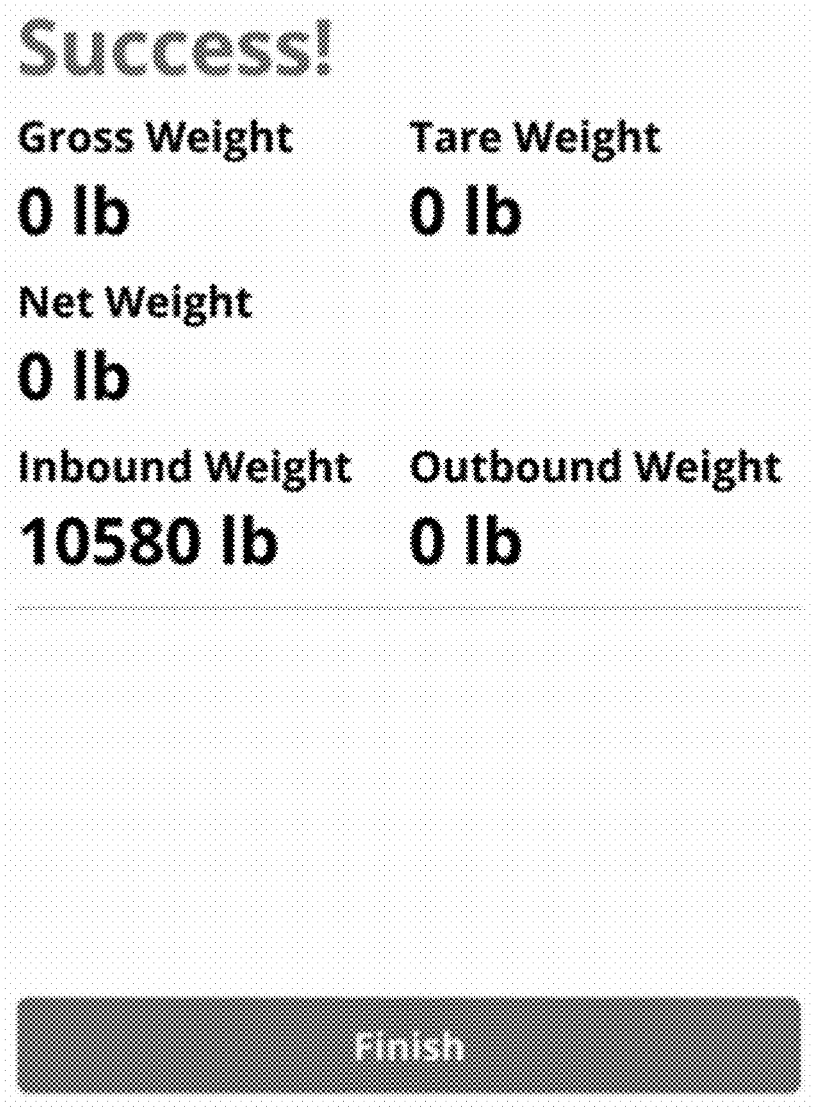

As shown in FIG. 40, the driver may specify that the current weighment session comprises an inbound weighing. The virtual tablet kiosk generates an overview (FIG. 41) of the inbound weighing including weight information (e.g., gross, tare, net, inbound, and outbound), weighment date, and weighment time. The virtual tablet kiosk also confirms success of the inbound weighing and displays a weighing summary (FIG. 42).

Figure 43:
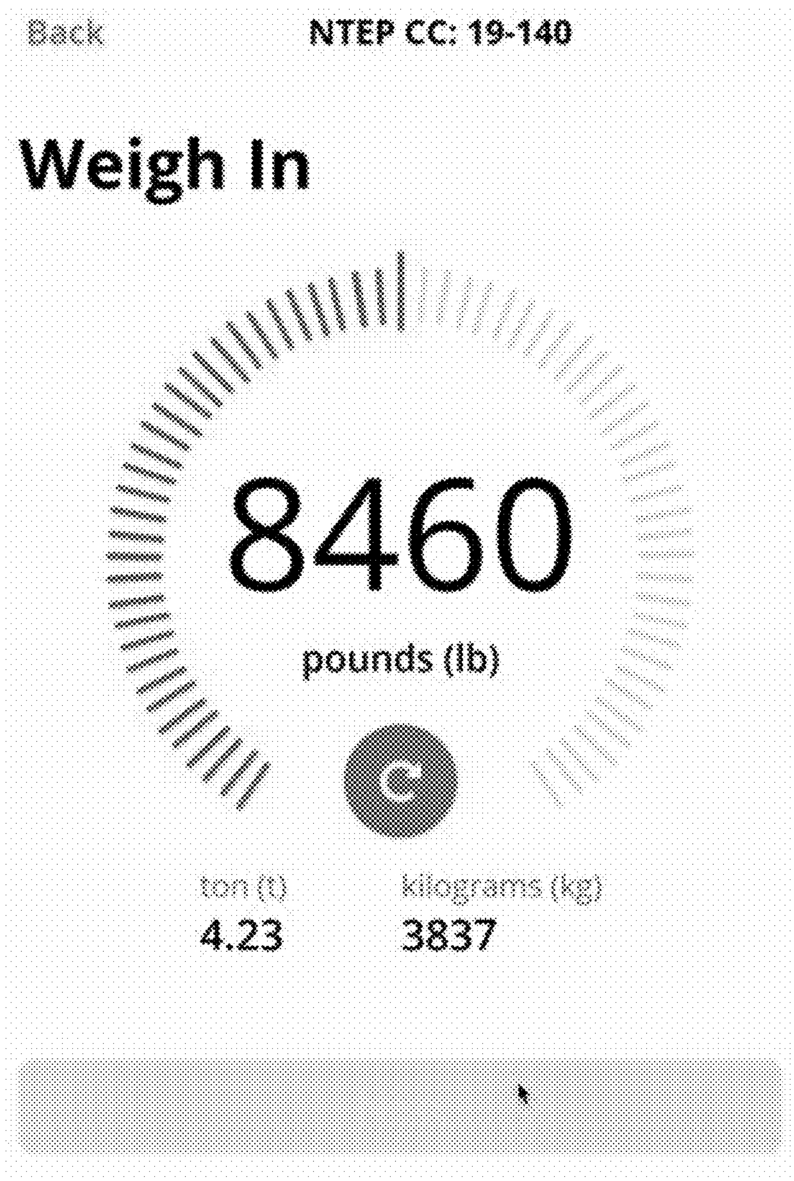
Figure 44:
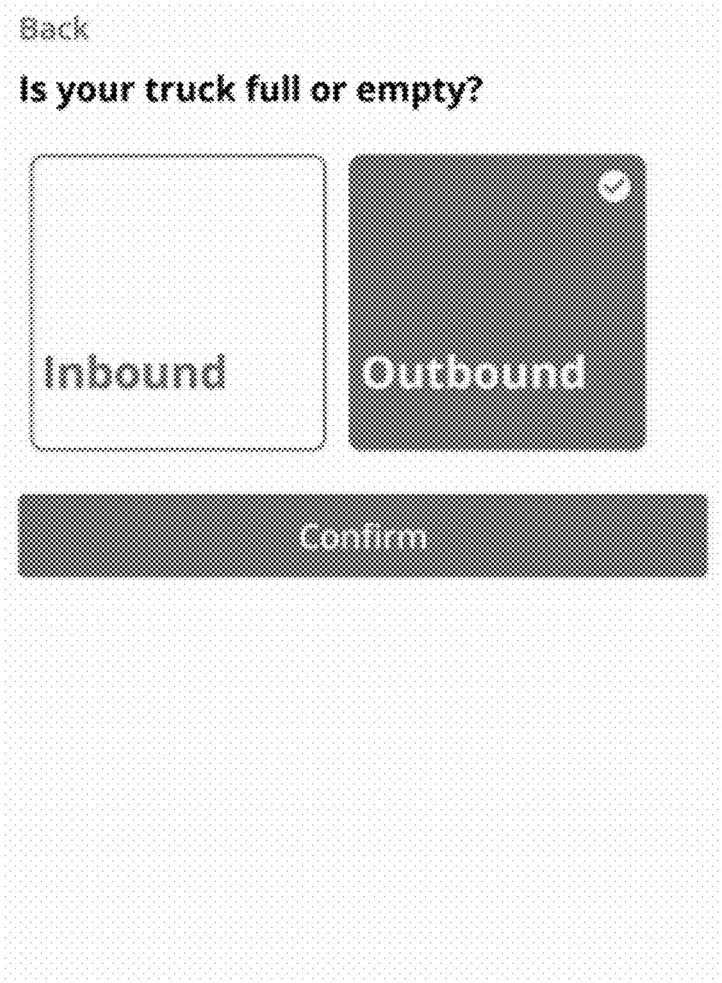
Figure 45:
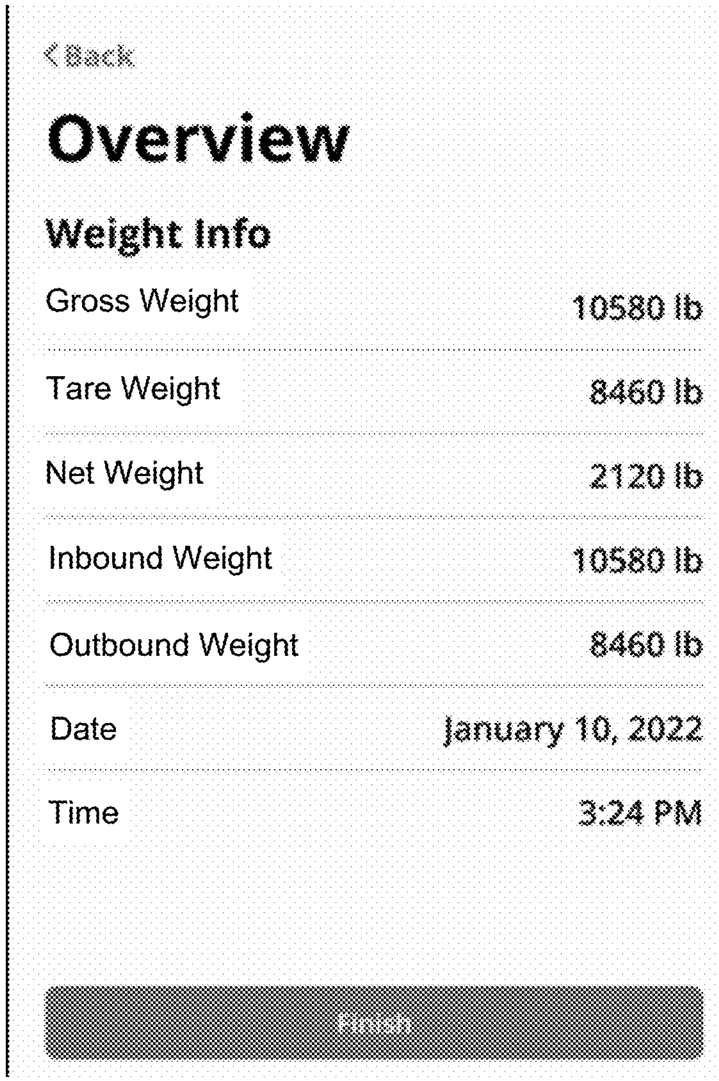
Figure 46:
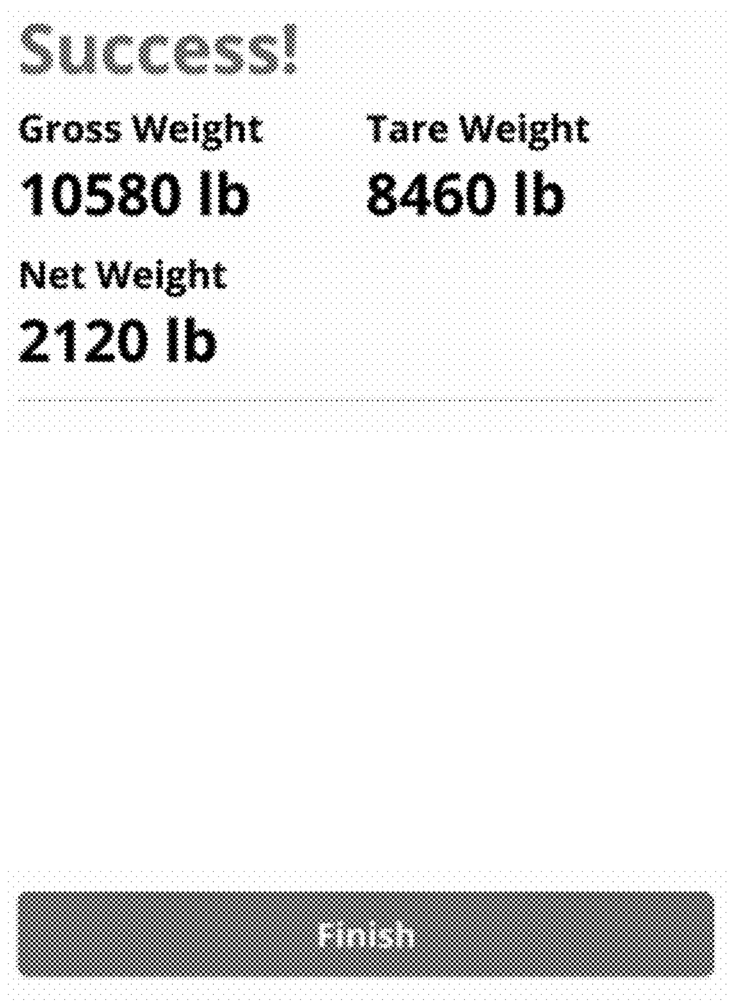

The workflow illustrated in FIGS. 35 through 37 may be repeated for outbound weighing. FIG. 43 presents an interface for initiating the outbound weighment. The driver may then proceed to confirm that the current weighment session comprises an outbound weighing (FIG. 44). The virtual tablet kiosk generates an overview (FIG. 45) of the outbound weighing including weight information (e.g., gross, tare, net, inbound, and outbound), weighment date, and weighment time. The virtual tablet kiosk may determine a gross weight from the heavier of the inbound and outbound weights. Conversely, the virtual tablet kiosk may determine a tare weight from the lighter of the inbound and outbound weights. The virtual tablet kiosk may also then determine a net weight (e.g., of a cargo load) based on a difference of the inbound and outbound weights. The virtual tablet kiosk also confirms success of the outbound weighing and displays a weighing summary (FIG. 46).

While described with reference to a virtual tablet kiosk, the inbound and outbound weighments described with reference to FIGS. 35-46 may also or alternatively be utilized with any other kiosk described herein, for example, by using or setting for_inbound and for_outbound kiosk flags. For example, when the for_inbound flag is set to "T", the mobile device 112 may be configured to present the kiosk page as part of the inbound weighment workflow, e.g., to input information on the gross weighing part of a gross-tare workflow. Conversely, if the for_outbound flag is set to "T", the kiosk page may be shown for the outbound weighment, e.g. the tare part of a gross-tare weighment workflow.

In some embodiments, virtual kiosk 308 may comprise a kiosk parameter called kiosk type that may be used to select a type of the virtual kiosk when creating virtual kiosk 308 or when modifying virtual kiosk 308 via the web interface. As an example, the kiosk type parameter may comprise a "weigh-only" type, a "pricing-payable" type, a "pricing-receivable" type, any combination of weigh, pricing-payable and pricing-receivable, or any other kiosk type. In some embodiments, the "weigh-only" kiosk type may be a default kiosk type. For PTW kiosks, the pricing-receivable kiosk type may be the default.

The weigh-only kiosk type corresponds to a virtual kiosk that may be used for weighments. The pricing-payable kiosk type corresponds to a virtual kiosk that may be used for making payments, e.g., on pickup. The pricing-receivable kiosk type corresponds to a virtual kiosk that may be used for receiving payments, e.g., on drop-off. The web interface is configured to present the kiosk type as a field that may be set or selected by a user of an administrator computing device 110, e.g., during the create kiosk 306 process.

The pricing-payable and pricing-receivable kiosk types of virtual kiosks each comprise a number of parameters including, e.g., a currency type and a price index.

The currency type may be set to any standard currency such as, e.g., US dollars (USD), British Pounds (GBP), Euros (EUR), Canadian dollars (CAD), Australian dollar (AUD), Japanese yen (JPY), or any other currency.

The price index comprises a data structure of pricing data such as, e.g., a comma-separated values (CSV) file, table or any other type of data structure. The price index comprises fields including, e.g., an effective date field, a product identifier field, a product description field, a product type field, a product unit price field, a weigh units field or any other field that may be utilized in establishing a price for a product.

The effective date field comprises an effective date at which the price index is valid. As an example, the effective date may comprise the first date at which the pricing information in the price index is to take effect. In some embodiments, an end date for the price index may also be included to define an end date when the price index is no longer valid. In other embodiments, the price index may also or alternatively be superseded by a new price index having a later effective date.

The product identifier field comprises an identifier that may be utilized to identify a product. As an example, the product identifier field may comprise an alpha-numeric identifier, a string or any other type of identifier that corresponds to a particular product. In some embodiments, each product may have a unique product identifier.

The Product description field comprises a description of a product. As an example, the product description may comprise a name of the product, a brand of the product or any other descriptive information about the product.

The product type field comprises information about a categorization of the product in a standard set of categories, e.g., for reporting purposes. Example, categories that may be utilized for the product type field include, e.g., "scrap metal", "soil" or other similar categories of products. The categories may be defined, for example, by a regulatory agency, company, industry or in any other manner.

The unit price field comprises a value that corresponds to the type of currency selected. As an example, each currency may have a different number of digits to the right of the decimal, e.g., as specified in a currency table. The value of the unit price field may be formatted to correspond to the selected currency and provides a price per unit.

The weigh units field specifies the unit in which the price per unit is given. As an example, the weight units field may comprise pounds (LB), tons (TN), kilograms (KG), metric tons (MT) or any other unit of weight that may be utilized. An example price index is presented in table 1.

TABLE 1

Price Index

| Effective date | Product Identifier | Product Description | Product Type | Product Unit Price | Weigh Units |
|---|---|---|---|---|---|
| Jun. 14, 2022 | a123 | ¼ inch stone | Aggregates | $6.25 | TN |
| Jul. 16, 2022 | b225 | ⅛ inch gravel | Aggregates | $8.20 | TN |
| May 12, 2022 | a145 | Medium sand | Aggregates | $7.75 | TN |
| Jun. 28, 2022 | c112 | Soil | Soil | $10.88 | TN |

In the case of product a123 in table 1, for example, the currency type parameter for the virtual kiosk may be, e.g., USD or CAD.

In some embodiments, the web interface may enable the user of the truck scale administrator computing device 110 to manually input the currency type and one or more of the fields of the price index, e.g., via a corresponding web interface element, instead of or in addition to the user providing a data structure such as a CSV file, e.g., via a selection to upload such a file via the web interface. In the case of manual entry, the web interface may present the user with a table or fields in which to enter the relevant data, select from a predetermined set of options or provide the data in any other manner. As an example, each field may have a heading that describes the type of data to be provided. In some embodiments, an explanation of each field may be provided to or accessible to the user when entering data into that field.

In some embodiments, a URL of an API endpoint may be utilized by the web interface to retrieve data for the fields of the price index, e.g., instead of obtaining data from a data structure such as a CSV.

include an effective date field, product identifier field, product description field and product type field which may be utilized to generate reports on a product-by-product basis or may be utilized in any other manner. The data for the fields of the product index for the weigh-only type of virtual kiosk may also be provided manually or through a data structure such as, e.g., a CSV file in a similar manner to that described above for the price index of the pricing-payable and pricing-receivable types of virtual kiosks. In the case of a weigh-only type of virtual kiosk, price information may not be needed in the product index. An example data structure for the product index for the weigh-only type of virtual kiosk is presented in table 2.

TABLE 2

Product

| Index Effective date | Product Identifier | Product Description | Product type |
|---|---|---|---|
| Jun. 14, 2022 | a123 | ¼ inch stone | Aggregates |
| Jul. 16, 2022 | b225 | ⅛ inch gravel | Aggregates |
| May 12, 2022 | a145 | Medium sand | Aggregates |
| Jun. 28, 2022 | c112 | Soil | Soil |

Server 106 may comprise a currency table and related APIs that are configured to retrieve and update currency information for the pricing-payable and pricing-receivable type kiosks. Server 106 may also store any received data about the currency type and price index in a product pricing data structure. For example, the product pricing data structure may comprise fields including, a kiosk identifier field, a price effective datetime field, a product identifier field, a product description field, a product type field, a unit price field, a weigh units field, an API endpoint field, and a price changed by user field. An example product pricing data structure is presented in table 3.

TABLE 3

Product Pricing Data Structure

| Kiosk Identifier | Product Description | Product Type | Unit Price | Weigh Units | API Endpoint | Price Changed by User |
|---|---|---|---|---|---|---|
| A2 | ¼ inch stone | Aggregates | $5.50 | TN | <link> | User1 |
| B3 | ⅛ inch gravel | Aggregates | $8.20 | TN | <link> | User3 |
| A1 | Medium sand | Aggregates | $7.75 | TN | <link> | User2 |
| C4 | Soil | Soil | $10.88 | TN | <link> | User1 |

Data validation rules may be implemented to ensure that data is entered in the expected format. In a case where the manually entered data, data in the data structure or data retrieved from the API endpoint fail the data validation, e.g., there is an error in the data or the format of the data, the web interface may be configured to provide an indication of the location of the data that failed the validation, e.g., identifying a row and column, identifying a field of the price index or any other indication. In some embodiments, the user may be able to specify an API on the web interface that may be utilized on the virtual kiosk to call to retrieve the product-price list.

In some embodiments, a product index for use in the weigh-only type of virtual kiosk may be configured to The kiosk identifier field comprises an identifier of a particular virtual kiosk, e.g., a primary key corresponding to the particular virtual kiosk in a general kiosk table.

The price effective datetime field comprises a starting datetime value that corresponds to the date and time at which this price or product identifier is in effect. The price or product identifier may be in effect until the next pricing or product change, e.g., receipt of an updated price index for a particular product identifier as an example.

The product identifier field comprises an identifier that may be utilized to identify a product, e.g., as described above for the price index. As an example, the product identifier field may comprise an alpha-numeric identifier, a string or any other type of identifier that corresponds to a particular product. In some embodiments, each product may have a unique product identifier.

The Product description field comprises a description of a product. As an example, the product description may comprise a name of the product, a brand of the product or any other descriptive information about the product.

The product type field comprises information about a categorization of the product in a standard set of categories, e.g., for reporting purposes. Example, categories that may be utilized for the product type field include, e.g., "scrap metal", "soil" or other similar categories of products. The categories may be defined, for example, by a regulatory agency, company, industry or in any other manner. In some embodiments, the product type field may be nullable and have a null value if no product type is specified.

The unit price field comprises a value that corresponds to the type of currency selected. As an example, each currency may have a different number of digits to the right of the decimal, e.g., as specified in a currency table. The value of the unit price field may be formatted to correspond to the selected currency and provides a price per unit. In some embodiments, the unit price field may be nullable and have a null value if no unit price is specified.

The weigh units field specifies the unit in which the price per unit is given. As an example, the weight units field may comprise pounds (LB), tons (TN), kilograms (KG), metric tons (MT) or any other unit of weight that may be utilized. In some embodiments, the weight units field may be nullable and have a null value if weigh units are not needed.

The API endpoint field comprises a URL to an API endpoint from which price index data may be retrieved instead of requiring an upload of a data structure such as, e.g., a CSV file. In some embodiments, the API endpoint field may be nullable and have a null value if an API endpoint is not being utilized.

The price changed by user field comprises an indication of a user identifier corresponding to a user that changed a price in the unit price field, a product identifier or any other field of the pricing table. The price changed by user field may also comprise a date and time of the change.

When the weigh ticket is generated, server 106 adds pricing information to the E-weighment ticket, such that the scale-owner, scale-owner-customer (if there is one), truck driver, and the trucking company for whom the driver works, can see, in real-time, the product identifier, the product description, the unit price for the products(s) being weighed, the weigh units, and any other related weighment information and pricing information. In some embodiments, the amount of pricing information presented on the weigh ticket may be set or selected where, for example, a user may select to have only a subset of the pricing information be presented in some embodiments.

Server 106 is also configured to store a data structure comprising information about each product type. As an example, the product type data structure may comprise a product type identifier field, a product type field, a product type creator field, a product type user identifier field, a product type datetime field, a product type deleted field, a product type deleted user identifier field and a product type deleted datetime field for each product type in the data structure. An example product type data structure is presented in table 4.

TABLE 4

Product Type Data Structure

| Product Type | Product Type Creator | Product Type User Identifier | Product Type DateTime | Product Type Deleted | Product Type Deleting User Identifier | Product Type Deleted DateTime |
|---|---|---|---|---|---|---|
| Aggregates | J. Smith | u129 | Mar. 2, 2023 | T | u155 | Oct. 8, 2022 |
| Soil | F. Tare | u155 | May 4, 2022 | F | Null | Null |
| Scrap Metal | G. Zane | u365 | Aug. 6, 2022 | F | Null | Null |

The product type identifier field comprises the primary key into the data structure, e.g., an alpha-numeric value.

The product type field comprises a string of the product type. In some embodiments, server 106 may provide a list of product types from which a scale creator can select the desired product type.

The product type creator field comprises a company identifier of a company that owns the product type. In some embodiments, the company identifier may correspond to a company included in a standard list of companies.

The product type user identifier field comprises an identifier of a user that added this product type to the data structure.

The product type datetime field comprises a datetime of when this product type was added.

The product type deleted field comprises an indication of whether or not this product type has been deleted by a soft delete or not. As an example, a value "T" may be utilized to indicate that this product type has been soft deleted, and a value "F" may be used to indicate that this product is still active where "F" may be the default value.

The product type deleting user identifier field comprises a user identifier of a user that deleted the product type, if needed, e.g., the user who set the value of the product type deleted field to "T".

The product type deleted datetime field comprises a datetime of when the product type was deleted, if needed.

Server 106 may implement functionality to support the presentation of a UI element type called a "product-price-selector" in the web interface that may be selected by a user to automatically pull the product pricing data from the product pricing data structure, e.g., with a get kiosk product pricing API, so that product price info can be presented in the web interface or virtual kiosk UI, e.g., to the scale-owner, driver or any other person/entity.

As part of the create kiosk 306 process the kiosk creator may select the product-price-selector from the web interface to ensure that the validations are performed, e.g., on the web interface, virtual kiosk UI and server 106 as needed. As an example, when creating a "TG" kiosk, a product-price-selector may be added to the kiosk page for outbound weighments but not for inbound weighments. In another example, when creating a "GT" kiosk, a product-price-selector may be added to the kiosk page for inbound weighments but not for outbound weighments. As another example, when creating an "10" kiosk, a product-price-selector may be added to a kiosk page that is for either an inbound weighment or an outbound weighment, but not both. As another example, when creating a "TO" kiosk, there may be no option to add the product-price-selector. As yet another example, when creating a "GO" kiosk, a product-price-selector may be added to a kiosk page because it is a one-sided workflow. In some embodiments, server 106 is configured to ensure the user generating the virtual kiosk using the create kiosk 306 process may only cause the product-price-selector to be presented on one page of the virtual kiosk.

When a pricing-payable or pricing-receivable virtual kiosk is being previewed by a kiosk creator on administrator computing device 110 or when the driver is presented the virtual kiosk on their mobile device 112, the web interface or virtual kiosk UI determines if the product-price-selector has been selected for presentation on the presented page. If selected, the get kiosk product pricing API may be called and the product-price-selector is automatically loaded with the pricing data for the virtual kiosk from the product pricing data structure. The kiosk creator may review the preview of the virtual kiosk page in the web interface to see what it will look like and during actual use. The driver may select the corresponding product that is being weighed from the virtual kiosk UI.

In some embodiments, the web interface and virtual kiosk UI may implement search functionality for searching the product-price-selector so that the driver or other user may search for a particular product identifier, product description, product type, or any other parameter. In some embodiments, name completion may also be implemented where, for example, a partial typing of the search term may automatically narrow the list of results or result in a selection to make searching easier.

As part of the create kiosk 306 process, the web interface may present the kiosk creator with a list of possible product types in order to categorize each product. The kiosk creator may select or activate a button over the product type field that will present a drop-down list of product types or present available product types in another manner. The kiosk creator may select a desired product type from the list, on a product-by-product basis, or select the product type for all products. In some embodiments, a get product types API may be called that either passes a null value for a company identifier or a company identifier corresponding to the scale-owner as inputs to server 106 to retrieve the combined list of product types. In some embodiments, if the company identifier passed to the get product types API is null, a master list of product-types may be returned and presented for selection.

Server 106 may implement functionality to support the presentation of a UI element type called a "product-selector" to the web interface or virtual kiosk that may be selected by a user to automatically pull the product data from a product type data structure, e.g., with a get kiosk product API, so that product information can be presented in the web interface or on a virtual kiosk UI page, e.g., to the scale-owner, driver or any other person/entity.

The product-selector may function in a similar manner to the product-price-selector. In an embodiment, the product-selector presents product data in an effective date field, a product identifier field, a product description field and a product type field. The product-selector may be used, for example, when a scale-owner wants to be able to categorize products for later reporting. The virtual kiosk is configured to automatically pull the product data, e.g., by calling a get kiosk product API, so that product information can be presented to the scale-owner, the driver, or both. For example, the product-selector may function as a table UI element. The kiosk creator may be able to view a list of possible product-types, in order to categorize each product. The kiosk creator may be able to select or activate the product type field to view a list of product types and select the product-type, on a product-by-product basis, or select the product-type for all products.

As part of the create kiosk 306 process the kiosk creator may select the product-selector from the web interface to ensure that the validations are performed, e.g., on the web interface, virtual kiosk UI and server 106 as needed. As an example, when creating a "TG" kiosk, a product-selector may be added to the kiosk page for outbound weighments, e.g., the gross part of the weighment, but not for inbound weighments. In another example, when creating a "GT" kiosks, a product-selector may be added to the kiosk page for inbound weighments but not for outbound weighments. As another example, when creating an "IO" kiosks, a product-selector may be added to a kiosk page that is for either an inbound weighment or an outbound weighment, but not both. As another example, when creating a "TO" kiosk, there may be no option to add the product-selector. As yet another example, when creating a "GO" kiosk may present a product-selector because it is a one-sided workflow. In some embodiments, server 106 is configured to ensure the user generating the virtual kiosk using the create kiosk 306 process may only cause the product-selector to be presented on one UI page of the virtual kiosk and may present a warning if the user tries to cause the product-selector to be presented on more than one page of the virtual kiosk.

When a pricing-payable or pricing-receivable virtual kiosk is being previewed by a kiosk creator or when the driver is shown the virtual kiosk on their mobile device, the virtual kiosk determines if the product-selector has been selected. If selected, the get kiosk product API may be called and the product-selector is automatically loaded with the product data for the virtual kiosk. The kiosk creator may review the preview of the virtual kiosk to see what it will look like and during actual use, the driver may select the corresponding product that is being weighed.

In some embodiments, the virtual kiosk UI or the web interface may implement search functionality for searching the product-selector so that the corresponding user may search for a particular product identifier, product description, product type, or any other parameter. In some embodiments, name completion may also be implemented where, for example, a partial typing of the search term may automatically narrow the list of results or result in a selection to make searching easier.

Server 106 may implement and maintain a product types data structure that may be seeded with available product types. An example product types data structure is presented in table 5. Other product types may also or alternatively be used.

TABLE 5

| Product Types Data Structure | |
|---|---|
| Aggregates | Electronics |
| Asphalt | Lithium |

TABLE 5-continued

| Product Types Data Structure | |
|---|---|
| Ready-Mix | Wood |
| Crushed Concrete | Wood Pulp |
| Fruit | Solid Waste |
| Grains | Liquid Waste |
| Ferrous | Hogs |
| Non-Ferrous | Cattle |
| Plastics | Soil |
| Tires | Contaminated Soil |

Server 106 may implement and maintain functionality for an update product types API that may be called to update the list of product types in the product types data structure. For example, the update product types API may be called with an input of a list of product types or a link to an updated list of product types and may overwrite the product type data structure with the updated list of product types. In some embodiments, the update product types API may be reserved for administrative use.

In some embodiments, each company, driver, scale owner or other entity may have an associated product types data structure. For example, since each company may handle different types of products, a corresponding product types data structure may be generated and stored in association with each company identifier. In another embodiment, a company identifier may be associated or linked to particular products in a full product types data structure that includes every product type in the system. In some embodiments, a standard product types data structure may also be stored that may be used for any entity.

A get product types API may be called using the company identifier as an input that returns all product types for that company. In some embodiments, the get product types API may also return the product types found in the standard product types data structure in addition to the product types found in the product type data structure corresponding to the company identifier of that company. In a case where the get product types API is called with a null value or an unknown value for the company identifier, the get product types API may return the product types found in the standard product types data structure.

In some embodiments, one or more show price flags may be utilized to control which pricing information is presented in the web interface or the UI of the virtual kiosk to drivers, trucking companies, and scale-owners. In some embodiments, the show price flags may be active for the pricing-payable and pricing receivable type virtual kiosks. The show price flags may include a show driver price information flag, a show customer price information flag and a show on behalf of driver pricing information flag or any other flag that is configured to control the pricing information presented in the web interface or the virtual kiosk UI. In some embodiments, a driver may always be presented with product identifiers and product descriptions.

The show driver price information flag may comprise a Boolean value corresponding to true (T) and false (F). For example, a T value causes the UI to present the driver the pricing information when he selects a product to weigh, e.g., using the product-price-selector, and shows the driver the pricing information on the weigh ticket. An F value causes the UI to not show the pricing information. In some embodiments, a default for the show driver price information flag may be F.

The show customer price information flag may comprise a Boolean value corresponding to true (T) and false (F). For example, a T value causes the web portal to present the scale-owner-customers with the pricing information on their weigh tickets. An F value causes the web portal to not show the pricing information. In some embodiments, a default for the show customer price information flag may be T.

The show on behalf of driver pricing information flag may comprise a Boolean value corresponding to true (T) and false (F). For example, a T value causes the UI to present drivers that work for a trucking company and are weighing on behalf of a scale-owner with the pricing information when they weigh the product and when they view their weighments on the weigh ticket. An F value causes the UI to not show the pricing information. In some embodiments, a default for the show on behalf of driver pricing information flag may be F.

The show price flags are utilized to determine how much pricing information should be presented by the UI on driver mobile devices 112 to drivers and by the web portal on administrator computing devices 110 to trucking companies, scale owners or other entities using the platform either at the time of weighment or along with a weigh ticket. As an example, the UI or web portal may be configured to present the amount for the weighment to be charged to the driver, trucking company or scale-owner or the amount to be paid to the driver, trucking company or scale-owner, based on the above show price flags and whether the virtual kiosk is a pricing-payable type virtual kiosk or pricing-receivable virtual kiosk.

In some embodiments, pricing-payable and pricing-receivable virtual kiosks are configured to present the driver, scale-owner or other entity the most current product or product price information, e.g., utilizing the API calls and data structures described above. As an example, the pricing information having the most recent effective date may be utilized as the most current information. For example, if a current date is Nov. 27, 2022 and there is a product or product-price that has an effective date field of Oct. 20, 2022, a product or product-price that has an effective date field of Sep. 15, 2022 and another product or product-price that has an effective date field value of Dec. 1, 2022, the product or product price having the effective date field value of will be utilized since it is the most recent effective date as compared to the Sep. 15, 2022 effective date and also because the Dec. 1, 2022 effective date has not yet occurred.

Server 106 may also be configured to calculate and convert the weighment cost. As an example, server 106 may be configured to multiply the actual weight times the price per unit of weight to determine a cost for the current load. For example, if sand is $3.5 per ton and the net weight of the truck is 20,000 LBS, server 106 may calculate the cost for this load as 20,000/2,000*$3.5 or $35.00. In this calculation, server 106 automatically converted pounds to tons and then performed the calculation. Server 106 is configured to automatically convert the units of the scale to the weigh units for the weighment pricing as needed in order to obtain an accurate price for the load.

The web interface is also configured to enable the editing of pricing data for some users on a system level, for multiple kiosks or for individual kiosks as needed. As an example, the web portal may present a kiosk price editor to an authorized user. Authorized users may include, for example, authorized scale-owner administrators, company administrators, system administrator or any other authorized user. The authorized user may utilize the kiosk price editor to change the pricing information for products with any changes being tracked, e.g., using an electronic audit trail. The electronic audit trail may comprise data that indicates the date and time at which the change is made as well as the authorized user who made the change. The electronic audit trail may also be implemented for uploads of data structures such as, e.g., CSV files, to replace pricing, product or other information.

Server 106 is configured to generate a view pricing kiosks menu item for the web interface that may be selected by a user such as, e.g., a scale-owner, to view the pricing kiosks associated with the scale owner. The web interface may, for example, call a get pricing kiosks API of server 106 that takes a company identifier as an input and returns a list of all of the pricing kiosks that correspond to the user, if any exist. As an example, the list of pricing kiosks may comprise those created by a particular scale-owner. If the list is empty, then the web interface may indicate to the user that the user does not have any pricing kiosks.

For pricing-payable and pricing-receivable kiosks, if the list isn't empty, the server 106 may present the list of pricing kiosks in the web interface and allow the user to select the virtual kiosk that the user wants to modify. When adding pricing or product information, the web interface may request that the user input a price effective date on which the user wants the price to take effect. Once the virtual kiosk and effective date are selected, the web interface calls the get pricing kiosk data API with a kiosk identifier and a current datetime or some datetime in the future as inputs and server 106 returns the product identifier, product description, product type, price per unit and weigh units of the corresponding entries in the price index. This information may be presented with the effective date as the first column and may be sorted based on the effective date in some embodiments. The user may utilize the web interface to change some or all of the fields including, for example, the price per unit, product description, product type, or any other field. In some embodiments, e.g., if the virtual kiosk has existing product price entries, only the price per unit, product description or product type may be modified. The modification of a field in the web interface by a user may result in the creation of a new product price entry having a datetime supplied to the API as the effective date. In some embodiments, if no product price entries have been created yet for this virtual kiosk, some or all fields of the product price entry can be changed. In some embodiments, all product price entries that occur at or after the provided effective date may be presented for modification. The user may be able to see these new or updated product price entries in the web interface as soon as the virtual kiosk is updated.

Server 106 is configured to generate and maintain an update pricing kiosk data API that takes a scale-owner's company identifier, kiosk identifier, and a pricing kiosk data structure as inputs and updates the pricing kiosk data table with any price changes when called. The web interface is configured to call this API after the user makes any pricing changes.

In some embodiments, the web interface is configured to present a product definition editor that is similar to the price editor described above but only allows entry or changes of values in the effective date, product identifier, product description, and product type fields.

Server 106 is configured to generate and maintain an update kiosk product data API takes a scale-owner's company identifier, kiosk identifier and a product data structure as inputs and updates the product data table with any product changes when called, in a similar manner to the update pricing kiosk data API, except it doesn't include or change pricing info.

Server 106 may be configured to include a generate invoices flag in a scale kiosks table. The generate invoices flag may comprise a Boolean value where a true (T) value triggers the generation of an invoice and a false (F) value does not trigger the generation of the invoice. In some embodiments, the T value is a default value for the generate invoices flag. The get kiosk, create kiosk, and edit kiosk APIs may be configured to set and obtain the generate invoices flag to control whether or not an invoice will be generated as part of the API call. The generate invoices flag may also be utilized for PTW kiosks.

Server 106 may be configured to include a merchant pays payment fees flag that is used to determine whether a merchant pays all electronic payment fees or a customer pays the fees. For example, the merchant pays payment fees flag may comprise a Boolean value where a true (T) value corresponds to the merchant paying all electronic payment fees and a false (F) value corresponds to the customer paying the fees. The web interface may enable this flag to be set, for example, in the case where the virtual kiosk is a pricing-payable, pricing-receivable or PTW kiosk. In a case where the virtual kiosk is a weigh-only type kiosk, there may be no need for a merchant pays payment fees flag since no pricing information is included. In some embodiments, the payments fees and who pays them may be presented on the invoices.

In some embodiments, the merchant pays payment fees flag may be modified, e.g., between T and F, even after a weighment for a product has already been performed on the virtual kiosk. The changed value may take effect instantly, e.g., for that weighment if the change is made before the invoice is generated. In other embodiments, the changed value may not take effect until the next invoice period. For example, if the merchant pays payment fees flag is set from F to T on Nov. 18, 2022, and the invoice period ends on Nov. 30, 2022, the value of F may be utilized until the beginning of the next invoice period, e.g., until Dec. 1, 2022 if the invoice periods occur on a monthly basis.

The web interface may also be configured to allow the scale-owner to indicate whether they want invoices generated, e.g., by the selection of an element in the web interface to change a flag value. In some embodiments, the option to have invoices generated may be presented in pricing or PTW kiosks but not for weigh-only kiosks. The option may be modified at any time by the scale-owner to turn on or off the generation of invoices.

In some embodiments, the platform may be configured to handle customer payments. For example, server 106 may implement and maintain a server handles customer payments flag that may be set to true (T) or false (F) depending on whether the scale-owner wishes to use server 106 to handle payments or wishes to use an alternative 3rd party payment mechanism. As an example, in some embodiments, if the scale-owner sets the server handles customer payments flag to T, e.g., in the web interface, server 106 may determine whether or not the scale-owner has a payable method set up, e.g., a bank account, credit card or other payable method, before being allowed to create a pricing-payable kiosk and a receivable method set up, e.g., a bank account or other receivable method, before being allowed to create a pricing-receivable kiosk. In some embodiments, if no payable or receivable method is set up, the web interface may indicate to the scale-owner that they need to set up an account or payable/receivable method before creating the corresponding kiosk, e.g., present a text or audio message comprising the indication. If the server handles customer payments flag has a value of F, server 106 may allow the scale-owner to create pricing-payable and pricing-receivable kiosks without payable or receivable methods being set up first.

Server 106 is configured to modify a get relevant kiosks API to accept or check the server handles customer payments flag. If the server handles customer payments flag has a value of T, server 106 may be configured to not return pricing-payable kiosks for drivers or trucking companies that don't have receivable methods set up and to not return pricing-receivable kiosks, if they don't have a payable method set up. Note, if a driver or a trucking company is weighing on behalf of a scale-owner-customer who does have the appropriate payment method setup, the corresponding virtual kiosk may be presented to the driver or trucking company at the weighment. For example, payable and receivable payment methods may be set from the scale-owner's point of view, which is why the requirement is reversed for drivers here. If the server handles customer payments flag has a value of F, the corresponding virtual kiosk can be used to just present product pricing to the scale-owner and driver or trucking company for the product being weighed.

For pricing kiosks that have the generate invoices flag turned on, server 106 may also create invoices to reflect the amount of money the driver, trucking company or scale-owner owes, i.e., for a pricing-receivable kiosk, or is owed, i.e., for a pricing-payable kiosk. In some embodiments, payable and receivable may be defined from the perspective of the scale-owner, e.g., money that the scale-owner owes or is owed. In other embodiments, payable and receivable may be defined from the perspective of drivers, trucking companies or any other entity.

Server 106 may be configured to utilize the same types of flags and fields for PTW scales and PTW virtual kiosks.

Server 106 may implement and maintain a current kiosk data structure that provides a listing of pricing-payable kiosks and may comprise a kiosk identifier field and other fields comprising information about the current kiosks for a scale-owner. In some embodiments, the current kiosk table may also include a billing frequency field and a payment terms field. An example of the current kiosk data structure is presented in table 5.

TABLE 5

Current Kiosk Data Structure

| Kiosk Identifier | Billing Frequency | Payment Terms |
|---|---|---|
| a123 | Daily | 15 d |
| a142 | Instant | 10 d |
| b320 | Monthly | 30 d |
| c654 | Quarterly | 45 d |
| g824 | Biweekly | 5 d |
| z223 | Weekly | 25 d |
| d452 | Annually | 90 d |
| a521 | Semi-Annually | 45 d |

The billing frequency field may comprise values such as, e.g., instant, daily, weekly, biweekly, monthly, quarterly, semi-annually, annually or any other value.

The payment terms field comprises an indication of the number of days after the invoice is generated that the customer must either pay or be paid by the scale-owner. For example, the payment terms field may have a value of 10 days, 15 days or any other number of days.

In some embodiments, the current kiosk data structure may comprise separate billing frequency fields, payment term fields or both for payable and receivable pricing kiosks where the payable and receivable billing frequency fields may be utilized by server 106 to determine how to process invoices on behalf of scale-owners, e.g., either collecting or sending money to scale customers such as drivers, trucking companies or other entities based on the type of billing frequency field or the type of kiosk.

In an example scenario, the scale-owner in a scrap yard may create a pricing-payable kiosk using the web interface so that they can pay drivers or trucking companies for the scrap that is being brought in. In another example scenario, a landfill operator may create a pricing-receivable kiosk using the web interface to charge drivers, trucking companies or other entities for dumping materials into the landfill. The billing frequency and payment terms are how often invoices are sent by these entities and the number of days after the invoice are sent that the corresponding driver, the trucking company, scale-owner or other entity, has to pay the invoice.

As shown in table 5, for example, kiosk g824 may have a biweekly billing frequency with a payment term of 5 days after the invoice.

Server 106 is configured to generate invoices for the kiosks, e.g., based on the information found in the current kiosk data structure for each scale-owner, driver, trucking company or other entity. Server 106 may be configured to generate invoices periodically, e.g., nightly or on any other schedule. As an example, server 106 may be configured to generate invoices once each day, e.g., at the end of the day, overnight, or at any other time, where the particular invoices generated on any day are generated according to the corresponding billing frequency for each kiosk, e.g., one or more of the kiosks may not have invoices generated if the corresponding billing frequency does not land on that day. In some embodiments, if the billing frequency value equals instant, server 106 may be configured to generate the corresponding invoice as soon as the transaction is completed separately from the normal daily invoice generation.

The web interface and the UI of the pricing kiosks are configured to display the pricing info part of a weigh-ticket in a manner that depends on the type of user that is viewing the virtual kiosk, e.g., the setting of the show driver price info flag, show customer price info flag, or the show on behalf of driver price info flag. These show price info flags control when additional pricing information is presented to a particular type of user, such as the product identifier, product description, product type, unit price, weigh units, cost of the product based on the weight or any other pricing information, along with all of the other usual weigh-ticket information.

Similarly, for "weigh-only" kiosks, where a product-selector was used, the product identifier, product description, and product type values may be presented to the user.

The web interface comprises a view that presents pricing kiosk invoices, e.g., from the perspective of the scale-owner, the scale-owner customer, the trucking company, the independent owner operator (TOO) or any other perspective. Both receivable and payable invoices may be viewed from the correct perspective depending on who is accessing the virtual kiosk. For example, an TOO or trucking company may access a pricing-payable virtual kiosk owned by a scale-owner using the web interface and see from their perspective how much money they are to receive from the scale-owner, i.e., because the pricing-payable kiosk is payable from the perspective of the scale-owner and therefore receivable from the perspective of the TOO, trucking company or other scale-owner customer. Similarly, an TOO or trucking company may access a pricing-receivable virtual kiosk owned by a scale-owner using the web interface and see from their perspective how much money they owe to the scale-owner, i.e., because the pricing-receivable kiosk is receivable from the perspective of the scale-owner and therefore payable from the perspective of the TOO, trucking company or other scale-owner customer. PTW invoices also may be configured to operate in a similar fashion.

The web interface may comprise a "Pay Now" button on the presented invoice that is selectable by a user, e.g., by the scale-owner when paying the scale-owner customer or by the scale-owner customer when paying the scale-owner. As an example, if a scale-owner customer is selling scrap to a scale-owner of a scrap yard, the scale-owner may be presented with the "Pay Now" button on the invoice. Similarly, if a scale-owner customer is dropping off materials to a landfill or aggregates quarry of the scale-owner, the scale-owner customer may be presented with the "Pay Now" button. In a case where the server handles customer payments flag is set to F, the "Pay Now" button may be disabled, hidden or otherwise not included on the invoice presented by the web interface view. In a case where the user viewing the invoice is to receive payment, the "Pay Now" button may also be disabled, hidden or otherwise not included on the invoice presented by the web interface view to that user.

Server 106 is configured to implement a pay pricing kiosk now API that is configured to take an invoice identifier of an invoice as an input when the "Pay Now" button is tapped/clicked in the web interface and to handle any needed payment processing to service the invoice.

Server 106 is configured to maintain an accounts data structure that comprises an account identifier field, a default company email field, an invoice email list field. An example accounts table is presented in table 6.

TABLE 6

| Accounts Data Structure | | |
|---|---|---|
| Account Identifier | Default Company Email | Invoice Email List |
| c18 | invoices@company1.com | List of emails |
| c225 | invoices@company2.com | List of emails |

The account identifier field comprises an alphanumeric string corresponding to a company. In some embodiments, the account identifier may be unique to each company. In some embodiments, the account identifier may correspond to a company name.

The default company field comprises an email that is specified by the company for receipt of all invoices.

The invoice email list field comprises a listing of emails to which company invoices should also be sent, e.g., individuals, other entities or any other emails. In some embodiments, the listing of emails comprises a JSON list. Server 106 is configured to implement create and update account APIs that take the account identifier and one or more of the default email and a JSON list of emails as inputs for that account. In some embodiments, the invoices will be sent according to the product payment frequency set on the account, e.g., as specified in TABLE 5.

Server 106 is also configured to maintain an account kiosk email list data structure that enables scale-owners to more finely control where invoices are sent for specific kiosks. The account kiosk email list data structure comprises an account kiosk email list identifier field, a kiosk identifier field, an email field, an adding email user identifier field, an adding email datetime field, an is deleted field, a deleting email user identifier field, and a deleting email datetime field. An example account kiosk email list data structure is presented in table 7.

TABLE 7

| Account Kiosk Email List Data Structure | | | | | | | |
|---|---|---|---|---|---|---|---|
| Account Kiosk Email List Identifier | Kiosk Identifier | Email | Adding Email User Identifier | Adding Email Datetime | Is Deleted | Deleting Email User Identifier | Deleting Email Datetime |
| e122 | k25 | Email1@website.com | u234 | Jun. 6, 2022 | T | u255 | Sep. 8, 2022 |
| e156 | k234 | Email2@organization.com | u765 | Feb. 8, 2022 | F | Null | Null |
| e225 | k116 | Email3@company.org | u115 | Apr. 25, 2022 | F | null | Null |

The account kiosk email list identifier field comprises the primary key of the data structure.

The kiosk identifier field comprises the identifier of the kiosk to which an email will apply.

The email field comprises the email for the kiosk to which the invoice is always sent.

The adding email user identifier field comprises a user identifier (UID) of the user that added this email in the email field to the list.

The adding email datetime field comprises the date and time at which the email was added by the user.

The is deleted field comprises a value indicating whether or not the email has been deleted. A value of T indicates that the email was soft deleted.

The deleting email user identifier field comprises the UID of the user that deleted the email from the list.

The deleting email datetime field comprises the date and time at which the email was deleted from the list.

The account creation and edit views of the web interface comprise fields or other elements that may allow emails to be added for users to receive all invoices for the account and kiosk. The web interface may implement and present a button, "Add Invoice Emails," that may be selected by a user to specify a list of emails to send all invoices to for a particular account, e.g., the account associated with this kiosk. In some embodiments, the web interface may implement email validation to ensure that the email that is entered is valid. The web interface is configured to call the create account email list API with the account identifier and a list of emails as inputs to provide this information to server 106. The list may be in a JSON format in some embodiments.

The web interface also comprises an "Add Kiosk Emails" button or other element, e.g., on an accounts view, that may be selected by a user to cause the web interface to present a list of pricing kiosks for the scale-owner. Once a pricing kiosk has been selected, the user may be presented with a field or other element in which to enter in a list of emails to send invoices to for this kiosk. In some embodiments, the web interface may implement email validation to ensure that the email that is entered is valid. The web interface is configured to call the create account kiosk email list API with the kiosk identifier and list of emails that are being added as inputs.

The web interface may be configured to enable a user to edit both the account and the kiosk email lists such that they can add and delete emails from the lists. The web interface is configured to call the create account email list API to add new emails. In some embodiments, server 106 may delete an old list of emails and add the new list provided by the API to the account data structure. Add account kiosk email list and delete account kiosk email list APIs are also implemented by server 106 and are configured for use by a user, e.g., via the web interface, to edit the kiosk email list. In this case, the editing may not replace the original list since, for example, the kiosk invoice email list is stored relationally as a group of individual emails as opposed to as a list such as a JSON.

In both cases for adding emails to an account, the web interface may enable a user to specify a file of emails, e.g., a CSV file or other file format, instead of manually typing in each email separately. For example, an element in the web interface may be selected to specify a file of emails to be uploaded and utilized. In some embodiments, duplicate email entries may be ignored during validation instead of being reported as errors.

In some embodiments, the server 106 and the web interface may implement copy functionality such as, e.g., a copy scale API, a copy kiosk API or other copy functionality, and corresponding web interface elements that enable a user to copy an existing virtual kiosk or virtual scale for use as-is or for further modification. This enables the user to quickly create new virtual kiosks or scales having the same parameters and functionality, e.g., pricing flags, emails, or other settings, and then edit them if needed for site specific modifications such as particular product types.

Server 106 may be configured to support an output of pricing kiosk tickets in a variety of output formats including, e.g., Excel, CSV, PDF, Word or any other output format.

In some embodiments, server 106 and the web interface are configured to implement and support void ticket functionality. As an example, a scale-owner may need to completely void an entire ticket workflow or some portion of a ticket workflow. In some embodiments, the void ticket functionality may function independently of functionality for canceling a weighment workflow where, for example, only a scale-owner may be allowed to void a ticket and the voiding of a ticket may cause an entire flow to be voided. As an example, if a tare-gross flow is voided, then both the tare and the gross tickets are voided. In some embodiments, voiding a ticket may be executed irrespective of the kiosk on which the ticket was created. For example, the voiding may be executed on a pricing or weigh-only kiosk.

To implement the void ticket functionality, server 106 may comprise a ticket voided flag in a tickets data structure. The ticket voided flag may comprise a Boolean value that corresponds to a true (T) and false (F) setting. A value of T indicates that the corresponding ticket is voided while a value of F indicates that the corresponding ticket is not voided.

Server 106 may also implement a voided ticket user field and a voided ticket datetime field in the tickets data structure, which correspond to the name of the user that voided the ticket and the date and time when the user voided the ticket. In some embodiments, voiding or canceling a ticket may trigger a notification to a corresponding driver or weigher, e.g., via mobile device 112, that indicates that the weighment has been voided or canceled. The notification may comprise, for example, a push notification, text message, email, telephone call with recorded message or any other type of notification that may be provided to the driver or weigher via mobile device 112 or in any other manner.

Server 106 may also implement a void ticket API that takes a system ticket identifier and indication to void the ticket as inputs and records the user and date time when the ticket was voided in the tickets data structure. The web interface is configured to present a button or other element, e.g., in front of each ticket in the ticket viewing screen, that is selectable by the user to void the ticket, e.g., by calling the void ticket API. If a ticket is voided, the web interface may be configured to clearly indicate that the ticket is or has been voided to the user. For example, server 106 is configured to implement a get tickets API that returns a ticket corresponding to a ticket identifier and an indication of whether or not the ticket has been voided, e.g., based on the value of the voided ticket flag. The web interface may then indicate whether or not the ticket has been voided.

Server 106 may also be configured to ensure that voided tickets are not included in product pricing kiosk invoices and in reports that aggregate the weights or products from those tickets. In some embodiments, PTW kiosks may still count voided tickets as part of invoices since the weighments were actually performed and the driver should therefore be charged for the weighments.

Server 106 and the web interface are configured to support the presentation of a variety of reports in order to allow the scale-owners and their customers to analyze the weighment activities performed on the scale-owner's scales.

Server 106 may be configured to generate a report showing the amount of money transacted for specific goods and services on a particular virtual scale. As an example, server 106 may be configured to implement the get tickets API with filters that may be utilized to tailor the resulting report, e.g., an optional scale identifier filter, kiosk identifier filter, customer company identifier filter or any other filter. Server 106 may be configured to utilize the filter to return all of the tickets on that scale and kiosk that were done with the customer, over the specified datetime range. If the start datetime and end datetime are not specified, then all of the tickets that meet the other filter criteria for the entire date range may be returned by server 106 in response to a get tickets API call. If the customer company identifier is not specified, all tickets that meet all the other filter criteria for all customers on that scale/kiosk may be returned by server 106.

Server 106 may also be configured to implement functionality in the get tickets API to return the total amount of product weighed, e.g., for each product in the units of the kiosk, the total amount spent, e.g., in the currency of the kiosk on each product, the grand total of products weighed, e.g., in the units of the kiosk, the total amount of money spent, e.g., in the currency of the kiosk, or any other similar information. As an example, the get tickets API may be called with an option string or modifier that indicates that such reports should be generated and returned in addition to any required inputs. In a case where if the kiosk is a product, but not a pricing kiosk, the get tickets API may ignore any request about pricing related reports but may still provide reports on information such as, e.g., the weight total by product or other similar information. Server 106 may be configured to validate the inputs to the get tickets API in order to determine whether a kiosk is a pricing kiosk or a weigh-only kiosk so that it knows to return pricing info or not.

Server 106 may also be configured to implement functionality in a get scales with pricing kiosks API that takes a company identifier and returns a list of scale identifiers of scales that have pricing kiosks.

Server 106 may implement a get kiosk tickets by customer API that takes the kiosk identifier, customer company identifier and an optional start datetime-end datetime range and return a list of tickets for that customer on that kiosk over that datetime range. In some embodiments, if the start datetime-end datetime range isn't provided, all of the tickets that satisfy any other filter criteria may be returned. Similar to the get product price scale kiosk API, the get kiosk tickets by customer API may implement filter options for returning the total amount of products weighed for the specified customer over the datetime range. In some embodiments, no pricing information may be included and the get kiosk tickets by customer API may be utilized for reporting on non-pricing kiosks.

Server 106 may implement a get kiosk customers API that takes the kiosk identifier as an input and returns a list of customer company identifiers that have generated weigh tickets on that kiosk.

The web interface may comprise a menu item, view customer ticket reports, that is configured to present a list of different ticket reports for selection by the user including, for example, a ticket report by scale, a ticket report by account, a ticket report by kiosk, a ticket report by customer or a ticket report based on any other ticket report criteria.

As an example, if the ticket report by scale option is selected, the web interface may present a list of all of the scales that the scale-owner has that have pricing kiosks or if the user is a scale-owner customer, the web interface may present them all of the scales that they do business on that have pricing kiosks. After the user selects the scale of interest, the web interface presents a list of pricing kiosks on that scale that they are authorized to view. For example, each user may only be presented with kiosks that they are authorized to use and only tickets that are related to that user or that user's associated drivers, if any.

After the user has selected a particular pricing kiosk from the web interface, the web interface may enable the user to select a start datetime-end datetime range, for example, using an element such as a calendar. The web interface may then present the user with a list of the user's customers that did weighments on the selected kiosk for the selected start datetime-end datetime range, e.g., by the web interface calling the get kiosk customer API. As an example, the get kiosk customer API may be called with the kiosk identifier, start datetime-end datetime range, user identifier or any other criteria as an input and return the corresponding list of customers. The user may select a particular customer from the list in the web interface. The virtual kiosk may call the get tickets API to obtain all of the tickets for that kiosk, for that customer, along with any report totals that may be returned by the get tickets API depending on the input criteria. As an example, the get tickets API may be called by the web interface with the kiosk identifier, customer company identifier, start datetime, end datetime, and ticket summary="T" as inputs.

In another example, if the ticket report by account option is selected, the web interface may present the user with a list of all of their accounts. For example, the web interface may call the get accounts API with the scale owner company identifier corresponding to the user as an input and present the resulting list of accounts in the web interface. The user may then select an account from the web interface and the web interface may present the user with a list of all of the scales on which the account has performed weighments. The user may then select a particular scale to see more information about the weighments for that scale.

Server 106 may be configured to support autonomous or semi-autonomous truck functionality. For example, in some embodiments, a truck may be autonomous or semi-autonomous where a driver may not be present during the weighment process. For example, an autonomous or semi-autonomous truck, e.g., driven by AI or remotely controlled by a drone operator, may be configured to transport goods from scale to scale for weighments, delivery, or other purposes. In such an embodiment, the autonomous or semi-autonomous truck may be configured to enter the scale and perform a weighment without any other human input.

In addition, the autonomous or semi-autonomous truck may be configured to automatically interface with a corresponding virtual kiosk of the scale-owner for the scale at which the truck is being weighed, e.g., based on the company performing the hauling, scale-owner settings, product information or any other information. The autonomous or semi-autonomous truck may be configured to automatically select or identify the goods being carried via the virtual kiosk, e.g., based on the price-product-selector, product-selector, the product type data structures described above, and perform the weighment. In some embodiments, no user interface may be needed for the autonomous or semi-autonomous truck and instead, the autonomous or semi-autonomous truck may interface with the virtual kiosk directly in a data driven manner, e.g., by communicating instructions or actions corresponding to the relevant UI elements without requiring the selection of the relevant UI elements as a human driver would. As an example, instead of being presented with a UI element, the autonomous or semi-autonomous truck may receive the data from the corresponding data structure directly, make any relevant selections based on the data and return the relevant selection to the virtual kiosk.

In some embodiments, the autonomous or semi-autonomous truck may also be configured to trigger the generation of an invoice corresponding to the weighment, e.g., on behalf of the company operating the autonomous or semi-autonomous truck. As an example, the autonomous or semi-autonomous truck may be configured to perform the financial transaction without further human interaction, e.g., to purchase or be paid for any type of product, as part of a weighment workflow. For example, once the autonomous or semi-autonomous truck is positioned on the scale, the autonomous or semi-autonomous truck may automatically select the material that it is interested in purchasing or dumping, or being paid for, e.g., in the case of a scrap yard, and may utilize payment methods that have already been configured into the system for the autonomous or semi-autonomous truck. As an example, credit cards that have been associated with the autonomous or semi-autonomous truck may be automatically charged, debit cards may be automatically credited, or money may be transferred to or from a designated bank account, at a designated time in the future for the transaction. In some embodiments, the payment methods may be authorized for use by the autonomous or semi-autonomous truck by a company operating the autonomous or semi-autonomous truck. In some embodiments, the autonomous or semi-autonomous truck may be directed by a human or by human intervention for some actions such as, e.g., selecting a destination such as a particular scale, selecting which product is being picked up or dropped off, or for any other action being performed by the autonomous or semi-autonomous truck.

Reports such as those described above may also be generated for any autonomous or semi-autonomous trucking transactions and weighments including, e.g., weigh tickets, invoices or any other report, and may be provided to the owner or operator of the autonomous or semi-autonomous truck. In some embodiments, the invoice or weigh ticket may comprise an indication that this weighment was performed autonomously by the autonomous or semi-autonomous truck in conjunction with the corresponding virtual kiosk.

Server 106, the web interface and the UI may also implement code scanning functionality that is configured to scan and process scannable codes such as, e.g., barcodes, quick response (QR) codes and other forms of scannable visual data representation. For example, server 106 may implement functionality in a get UI types API to include a scannable code UI type such as, e.g., a barcode UI type, a QR code UI type, or any other scannable code UI type.

The web interface implements functionality in the create and edit kiosk views to allow a user to create a kiosk including the scannable code UI types and corresponding code scanning functionality.

The driver mobile device 112 UI may comprise functionality that is configured to recognize the scannable code UI type and is configured to activate or take control of a camera of a mobile device or other scanner device to scan a scannable code if such a scannable code UI type is activated. The UI may comprise a code scanning library that enables the UI to decode the scanned code. In some embodiments, the code scanning library may be capable of decoding barcodes, QR codes or any other form of scannable code. A code scanning UI element, generated by the web interface for the kiosk based on the scannable code UI type, may be selectable from the UI by a driver. As an example, a driver may open the UI, select a scan a scannable code element, and then scan the corresponding scannable code associated with a scale at which the driver is performing a weighment. In some embodiments, the view of the camera of the mobile device may be presented within the UI so that the driver or other individual does not need to exit the UI to scan the scannable code.

The UI may employ the scanning library to convert the code into corresponding data or information for entry into relevant fields, link to the corresponding virtual scale or for use in any other manner. As an example, the scannable code may be converted into a string or any other data format. The UI is configured to insert the converted value into a corresponding field of the virtual kiosk in order to make it part of the weigh ticket.

Server 106, the web interface and the UI may implement functionality for receiving and processing user information, data or documents such as, e.g., capturing signatures, images and documents, as part of a weigh ticket. As part of this functionality, the web interface implements UI element types including, e.g., a signature element, an image element, and a document element. Server 106 implements and maintains a UI elements type list including these three UI elements from which the web interface may draw elements for presentation. Server 106 may implement functionality within create kiosk, edit kiosk, and get kiosk APIs to return these three UI element types.

As part of the create kiosk 306 process, the web interface may allow the kiosk creator to add the signature, image and document UI elements onto a kiosk page and to preview the added UI elements. The web interface may also allow the kiosk creator to label the UI elements, e.g., "Sign Here," "Scan Manifest," "Analysis Doc" or any other label.

Truck driver mobile device 112 is configured to render the UI elements as part of the UI presented by the virtual kiosk page and to receive an upload of the UI elements such as, e.g., receiving a signature, taking an image, or uploading a document.

Server 106 may be configured to implement corresponding functionality for receiving and processing user information, data or documents in the create ticket and get tickets APIs to allow signatures, images, and documents to be received or uploaded.

Users of the web interface or the virtual kiosk UI may be enabled to view any received or uploaded signatures, images, and documents in the same manner that they can view any other kiosk ticket information.

Server 106 is also configured to ensure that any tickets including corresponding received or uploaded signatures, images or documents will be exported in conjunction with those received or uploaded signatures, images or documents. For example, in some embodiments, received or uploaded signatures, images or documents may be stored separately from the tickets in database 114 and the corresponding ticket may include a URL pointer to the corresponding stored signatures, images or documents. As part of the export process for the ticket, server 106 may be configured to include any corresponding URLs for stored signatures, images or documents. Weighment tickets may be exported in file formats, such as Portable Document Format (PDF), spreadsheet (e.g., Excel), and Comma-Separated Values (CSV). Weighment tickets may also be exported to other upstream or downstream ERP systems, such as enterprise system software from SAP, Sage or another vendor, via an API.

Server 106, the web interface and the virtual kiosk UI may implement functionality for receiving, storing, and incorporating company letterhead and terms and conditions in outputs from a virtual kiosk.

Server 106 may implement a company letter head field and a terms and conditions field in the company profile data structure and implement corresponding functionality in the create company profile, edit company profile, and get company profile APIs to accept an upload or input of a company letterhead image and terms and conditions information, e.g., a string or another data type. In some embodiments, the company letter head field and terms and conditions fields may be nullable fields, e.g., in a case where a company or other entity does not have or wish to upload a letterhead or terms and conditions.

Server 106 may also implement additional functionality in the export function to include the integration of the company letterhead and terms and conditions in the exported document, e.g., invoices and tickets. In some embodiments, for example, the terms and conditions may be integrated into a front side of an invoice or ticket, a reverse side of the invoice or ticket, or both.

The web interface may present the user with selectable options, buttons or other elements to "Use company Letterhead" and "Use Terms and Conditions" when creating or editing a kiosk. Depending on which of these elements is selected, the web interface may present the company letterhead or terms and conditions that were provided in the corresponding company profile, if any company letterhead or terms and conditions have been received. If this information was not provided as part of the company profile, the web interface may provide the option to enter the corresponding information, e.g., in one or more fields of the web interface, or select an element to upload a file containing the company letterhead, terms and conditions, or both. If a company letterhead, terms and conditions, or both are already stored on the system for that company profile, the web interface may offer the option to accept the presented information or edit the presented information. If a virtual kiosk has received a company letterhead or terms and conditions from server 106, the virtual kiosk will utilize this information when creating an invoice, report or other output for that kiosk. Either or both of the company letterhead and terms and conditions may be provided or associated with a particular virtual kiosk.

If the kiosk creator does not select the "use Company Letterhead" or "use Terms and Conditions" elements when creating a virtual kiosk, later users may be inhibited from entering the information for that virtual kiosk, e.g., during a weighment workflow, ticketing workflow, invoice workflow or the full weighment, ticketing and invoicing workflow.

As part of the create kiosk 306 process, the web interface is configured to provide the company letterhead image and terms and conditions to server 106 for storage in database 114 in association with the company profile once confirmed by the kiosk creator to ensure that server 106 has the correct values for the created virtual kiosk. In some embodiments, server 106 may be configured to utilize the company letterhead or terms and conditions corresponding to a company profile only when the kiosk creator explicitly indicates that the company letterhead or terms and conditions should be utilized, e.g., by selecting the "use Company Letterhead" or "use Terms and Conditions" elements in the web interface during create kiosk 306 process. In some embodiments, the copy kiosk function may also copy any settings regarding the use of the company letterhead and terms and conditions from the company profile.

Server 106 may implement functionality for allowing a hauling company or TOO to weigh materials on behalf of another customer entity such as a contractor. As an example, a trucking company may pick up aggregates or other materials for a contractor, deliver materials for a supply company, transport debris to a landfill or work on behalf of another entity in any other manner.

Server 106 may implement and maintain a weighs on behalf of companies data structure that comprises an originating company identifier field, a driver company identifier field, an authorizing UID field, a created at field, a deauthorizing UID field, and a deleted at field. An example of the weighs on behalf of companies data structure is presented in table 8.

TABLE 8

Weighs On Behalf of Companies Data Structure

| Originating Company Identifier | Driver Company Identifier | Authorizing UID | Created at | Deauthorizing UID | Deleted at |
|---|---|---|---|---|---|
| c334 | c675 | u524 | 11:00 AM Mar. 3, 2023 | u165 | 10:53 AM Apr. 3, 2023 |

The originating company identifier field comprises a company identifier of the company on whose behalf the trucking company or TOO is moving the material.

The driver company identifier comprises a company identifier of the hauling company or TOO.

The authorizing UID field comprises a UID of the user at the originating company that allowed the hauling company or TOO to weigh on their behalf.

The created at field comprises a datetime when the hauling company or TOO was authorized by the user.

The deauthorizing UID field comprises the UID of the originating user that deauthorized the hauling company or TOO to weigh on company's behalf.

The deleted at field comprises the datetime when the hauling company was deauthorized.

Server 106 may also implement and maintain a number of APIs to manage interactions with the weighs on behalf of companies data structure.

A get my weighers on behalf API may be implemented by server 106 that takes the originating company identifier as an input and returns a list of hauling or TOO companies that have been authorized to weigh on behalf of the originating company.

A create weigher on behalf API may be implemented by server 106 that takes the originating company identifier and an email of a hauling company or TOO as inputs and authorizes the hauling company or TOO in the weighs on behalf of companies data structure for that originating company. Note, for IOOs, the company's email may be passed. The create weigher on behalf API will also take the UID of the originating company user that authorized the trucking company as an input and may obtain a current datetime at which the authorization was performed and provide this information to the corresponding fields of the weighs on behalf of companies data structure. Note, the hauling company UID is being used here to identify the hauling company, so that the hauling company itself can be authorized. In some embodiments, the API may ignore any duplicate authorizations or may resolve any duplicate authorizations, e.g., by reconciling any duplicate authorizations into a single authorization if possible. As an example, the later authorization may be maintained while the earlier authorization may receive a deauthorizing UID corresponding to server 106 and a current datetime for the deauthorization by server 106.

A remove weigher on behalf API may be implemented by server 106 that takes the originating company identifier and the identifier of a weigher on behalf object as inputs and executes a deauthorization of the corresponding weigher. In some embodiments, the remove weigher on behalf API may ignore duplicate deauthorizing requests.

A get my weigh on behalf of originating companies API may be implemented by server 106 that takes the hauling company identifier as an input and returns a list of companies for whom that hauling company is authorized to perform weighments. The get my weigh on behalf of originating companies API may be configured to return a Null list or an error message if the hauling company has no authorizations.

The web interface presented on the truck scale administrator computing device 110 to a user by server 106 may include a menu item, button or element, "Manage Weighs On Behalf of Companies", which may be selected to present the user with a listing of all of their existing hauling companies or IOOs that can weigh on their behalf and allow them the ability to add the emails of hauling companies or IOO users or the domains of those hauling companies to authorize to weigh on behalf of them. In some embodiments, if a domain is specified for the hauling company or IOO, all users, e.g., driver or other associated users, that are connected to that hauling company or IOO can weigh on behalf of the originating company. In some embodiments, the email corresponding to the hauling company or IOO, e.g., an email of an individual user, is just used to identify that hauling company or IOO, but any driver that is a part of that hauling company or IOO, will be enabled to weigh on behalf of the originating company. The web interface may also comprise a "deauthorize" button or element that may be selected to deauthorize a particular hauling company or IOO in a similar manner.

When a company or TOO is either authorized or deauthorized to weigh on behalf of another company, server 106 may send an email and text to the corresponding user that was identified at the company or TOO that they or their company has been authorized or deauthorized to weigh on behalf of the originating company. As an example, the email message may state that "Your company has been authorized by <authorizing-user-name> at <originating-company-name> to weigh on their behalf" or "Your company has been Deauthorized by <deauthorizing-user-name> at <originating-company-name> and can no longer weigh on their behalf." Any other message may alternatively be utilized to indicate authorization or deauthorization.

Since registered company or TOO email addresses are utilized as part of an "on behalf of" authorization or deauthorization, in some embodiments, server 106 may be configured to ensure that the email is authenticated and validated. The email validation may be performed for scale-owners, hauling companies and material customer companies. In some embodiments, authentication and validation may not be needed for IOOs.

In some embodiments, any other information may be utilized to identify a company or TOO for "on behalf of" authorization and deauthorization including, for example, a company identifier, a username, or any other information corresponding to a company or TOO.

Server 106 may also implement functionality to include a scale-owner-customer company type as an option in the company type field of the company account data structure with the APIs that manage the company profiles comprising corresponding functionality for handling scale-owner-customer company types. The web interface may present a user such as the kiosk creator with the ability to select or enter scale-owner-customer company types for their virtual kiosk or virtual scale. For example, the web interface may allow the kiosk creator to indicate the company type as a scale-owner-customer company type and the indicated company type may be presented in their company profile.

Server 106 is configured to implement functionality in the create company accounts and get company accounts APIs to allow the scale-owner to indicate the type of account it is creating, e.g., "Material Producer," "Aggregates," "Asphalt," "Ready-Mix," "Excess Soil," "Scrap Metal," "Waste-Hauler," "Demolition," "Agriculture," "Meat Processor," "Poultry Processor," "Freight Shipper," or any other account type. The web interface is configured to allow the user to select several descriptions for the type of account, e.g., because some accounts may perform more than one function, such as being both aggregates and asphalt producers. Server 106 is configured to implement a get company account types API that returns the list of company account types on the web interface. Using this functionality, for example, the scale-owner may set up a correspondence between one of their accounts and one or more of these company account types, e.g., for future reporting purposes. In some embodiments, the selected company account types do not restrict the functionality of the scale-owner's company on the platform.

Server 106 is further configured to implement the create account and get account APIs with functionality for setting and obtaining an account type description. For example, server 106 may implement and maintain an account types data structure that comprises an account type identifier field and an account type field and may be utilized by the create account and get account APIs. An example account types data structure is presented in table 9.

TABLE 9

Account Types Data Structure

| Account Type Identifier | Account Type |
|---|---|
| T1 | Material Producer |
| T2 | Aggregates |
| T3 | Asphalt |
| T4 | Ready-Mix |
| T5 | Excess Soil |
| T6 | Scrap Metal |
| T7 | Waste-Hauler |
| T8 | Demolition |
| T9 | Agriculture |
| T10 | Meat Processor |
| T11 | Poultry Processor |
| T12 | Freight Shipper |

The account type identifier field comprises the primary key into the account types data structure, e.g., T1, T2 . . . T12, or any other type of alphanumeric identifier.

The account type field comprises a string or other data format that describes the type of account. As an example, the account type field may comprise a string such as, e.g., "Material Producer," "Aggregates," "Asphalt," "Ready-Mix," "Excess Soil," "Scrap Metal," "Waste-Hauler," "Demolition," "Agriculture," "Meat Processor," "Poultry Processor," "Freight Shipper," or any other account type.

Server 106 may also be configured to implement and maintain a company account types data structure that comprises an account identifier field and an account type identifier field and may be utilized by the create account and get account APIs. An example company account types data structure is presented in table 10.

TABLE 10

| Company Account Types Data Structure | |
|---|---|
| Account Identifier | Account Type Identifier |
| c394 | T4, T6, T8 |
| c164 | T1, T2, T7 |
| c265 | T2, T4, T12 |

The account identifier field comprises an identifier corresponding to the company account that is being described, e.g., c394, c164, or any other company identifier. As an example, each company may be assigned a unique alphanumeric identifier at the time that the company is added to the platform, e.g., c394, c124 or any other identifier.

The account type identifier field comprises the primary key into the account types table, e.g., T1, T2 . . . T12. In some embodiments, the account type identifier field may comprise multiple account type identifier values.

The web interface is configured to present one or more account types to a user in a "Manage Accounts" view that may be specified, viewed and changed.

Server 106 is also configured to implement an originating company identifier field comprising a company identifier of the originating company that requested the weighment for the hauling company. The driver company identifier field is the company identifier of the hauling company that actually performed the weighment. Note, if the originating company is the same as the hauling company, the originating company identifier and hauler company identifier may comprise the same value.

Server 106 is also configured to implement functionality in the create tickets and get tickets APIs to return the values of the originating company identifier and driver company identifier fields.

Server 106 is also configured to implement functionality in the get accounts as customer company API to add a merchant company identifiers filter and take the originating company identifier as an input to the filter so that hauling company drivers can be presented with the account list. If there are no accounts set up with the originating company, a null value may be returned to the driver. In some embodiments, the driver may also be presented with a message indicating that there are no accounts set up.

The web interface may comprise a "Companies for Whom I weigh" view, which may be presented to a user of an administrator computing device 110 to show the user all of the companies that have authorized the user or their company to weigh on their behalf. In this case, for example, the user may be a user or employee of a hauling company or even an IOO. The web portal may call a get my weigh-on-behalf originating companies API which takes the hauler company identifier of the user's company as an input and returns a list of originating companies from server 106. If the list of originating companies is null for this hauler company identifier, the API may return a null value and the web interface may indicate to the user that no originating companies are listed. For example, the web interface may present the user with a message that "There are no companies for whom your company is authorized to weigh on behalf of."

The virtual kiosk UI presented on mobile device 112 is configured to allow a driver of a hauling company to select the originating company that the hauling company is hauling on behalf of, if they are in fact hauling on behalf of another originating company. In some embodiments, the virtual kiosk UI may present the driver with an inquiry regarding whether or not the driver is hauling on-behalf of another originating company, e.g., at the beginning of a weighment or other workflow. For example, the virtual kiosk UI may present the driver with a question such as, e.g., "Are you hauling on-behalf of anyone?", along with selectable options corresponding to an affirmative or negative response.

If the driver answers in the affirmative, or if server 106 is already aware that the driver is hauling on behalf of another company, the virtual kiosk UI may call the get my weigh-on-behalf originating companies API with the hauling company identifier as an input and present a list of originating companies that the hauling company is authorized to weigh on behalf of. The driver may then select the appropriate originating company for this weighment. Mobile device 112 may store the originating company identifier corresponding to the selected originating company for later use, e.g., during ticket creation. If the list is Null, then virtual kiosk UI may perform the normal workflow as if this driver is weighing on their own companies behalf. In some embodiments, in response to receipt of a null list, the virtual kiosk UI may also present the driver with an indication that the driver does not have any associated companies for which the driver can weigh on behalf of. For example, the indication may comprise a message such as "you do not have any companies that you can weigh on-behalf of."

If an originating company identifier has been selected by the driver, the virtual kiosk UI may call a get accounts as customer API with the originating company identifier, hauler identifier and a scale-owner identifier as inputs and receive in return a list of the originating company's accounts that have been set up by the scale-owner. The virtual kiosk UI may present the list of the originating company's accounts to the driver and request that the driver select one of the listed originating company's accounts. In some embodiments, the list of the originating company's accounts that have been set up by the scale-owner may only be presented at the beginning of the workflow for selection by the driver and the driver may be inhibited from switching the account selection in the middle of the workflow. In some embodiments, if only one account of the originating company has been set up by the scale-owner, the account may be selected automatically without prompting the driver. Mobile device 112 may be configured to store or remember an account identifier that corresponds to the selected originating company's account, e.g., for later use in generating a ticket.

If the hauling company is weighing on behalf of another company, the originating company identifier, hauling company identifier, scale-owner identifier and account identifier for the originating company's account that was selected by the driver may be passed to the create ticket API as inputs for generation of the appropriate weighment ticket. Server 106 may also be configured to record the weighment ticket for all of the parties corresponding to the passed identifiers. In some embodiments, in a case where the driver is not weighing on behalf of another company, the passed account identifier may comprise a null value which indicates to server 106 that the driver is not weighing on behalf of another company.

Server 106 is configured to implement functionality in the get relevant kiosks API to take the originating company identifier as an input and returns a list of corresponding kiosks for that originating company. As an example, the UI on the driver mobile device 112 may call the get relevant kiosks API with the originating company identifier as an input and present a list of virtual kiosks to the driver that correspond to the originating company on which the driver is hauling on behalf of, e.g., as provided by a scale-owner.

Server 106 may also be configured to implement functionality in the get kiosk products API and the get kiosk JWS data API to take the originating company identifier as an input. These APIs may typically only be allowed to be used by companies to which they are relevant, e.g., companies that handle particular products. By passing the originating company identifier to these APIs, a driver hauling on behalf of an originating company may utilize the corresponding virtual kiosks that are appropriate to the product that the driver is hauling on behalf of the originating company.

If the hauling company is weighing on-behalf of another company, then the UI on mobile device 112 may call the get accounts as customer API, passing the originating company identifier, hauler company identifier, and scale owner identifier as inputs and returning a list of the originating company accounts that have been set up by the scale-owner. If there is only one element in this list, then the UI may remember the account identifier and continue the workflow as usual. If there is more than one account in the list, then the UI may present the list of accounts and request that the driver select one account. Once the account has been selected, then UI may remember the account identifier for the selected account so that it may be passed to the create ticket API.

If the hauling company is weighing on behalf of another company, then the UI on mobile device 112 may pass the originating company identifier, hauling company identifier, scale-owner company identifier and account identifier to the create ticket API, so that server 106 can record this information correctly for all parties.

The web portal may be configured to present the originating company name to a user of an administrator computing device 110 in the "View Ticket" view if the ticket was generated on behalf of another originating company and if the user viewing the ticket works for either the scale-owner or the hauling company. Similarly, if a scale-owner-customer, e.g., the originating company, is viewing the ticket, the web portal may be configured to present the name of the hauling company that did the weighment for them.

Server 106 may implement functionality in the invoice generator to reflect when weighments are being performed on behalf of an originating company. As an example, if an originating company, A's Contracting, has a hauling company, B's Hauling, pickup materials and weigh them on a scale-owner's scale, e.g., C's Materials' scale, then A's Contracting will be billed for the weighment and the materials, not B's Hauling. As indicated above, the weigh ticket will reflect the fact that B's Hauling did the weighment, but A's Contracting receives the invoice.

Server 106 is configured to implement functionality in the get invoices API to handle weighments on behalf of another company and the web portal may ensure that the correct invoices are shown to the correct parties.

Server 106 is configured to implement functionality in the get ticket reports API to add support for an input in the as company type field to be "originating," an input in the group by field to allow "originating company," and for filters to allow originating company identifiers to be used as filters for the results.

In some embodiments, the functionality for allowing a hauling company or TOO to weigh materials on behalf of another customer entity may be configured to enable autonomous or semi-autonomous trucks to weigh on behalf of another customer or entity aside from the owner or operator of the autonomous or semi-autonomous truck.

As an example, a company that owns or operates autonomous or semi-autonomous trucks may be set up to haul on behalf of another customer entity in a similar manner to that described above where, for example, some or all of the autonomous or semi-autonomous trucks may be able to utilize the particular virtual kiosks set up by the scale-owner for the customer entity.

In some embodiments, individual autonomous or semi-autonomous trucks may also or alternatively be set up to weigh on behalf of particular customers or other entities without enabling authorization to weigh on behalf for the whole company that owns or operates the autonomous or semi-autonomous trucks. As an example, instead of inputting a company identifier for the company that owns or operates the autonomous or semi-autonomous truck in the create weigher on behalf API, a truck identifier may alternatively be input that identifies the particular autonomous or semi-autonomous truck that is authorized to weigh on behalf of the customer or other entity. In this manner, the use of individual autonomous or semi-autonomous trucks may be provided to another customer or entity for hauling on its behalf as needed and the corresponding authorizations may be executed to allow that autonomous or semi-autonomous trucks to perform weighments on behalf of that customer entity and generate invoices or payment without enabling the entire company that owns or operates the autonomous or semi-autonomous truck to perform the weighments. In some embodiments, for example, the owner or operator of the autonomous or semi-autonomous truck may provide the customer entity with access to or control of the use, route, etc., of the autonomous or semi-autonomous truck for the purposes of their weighments.

Figure 47:
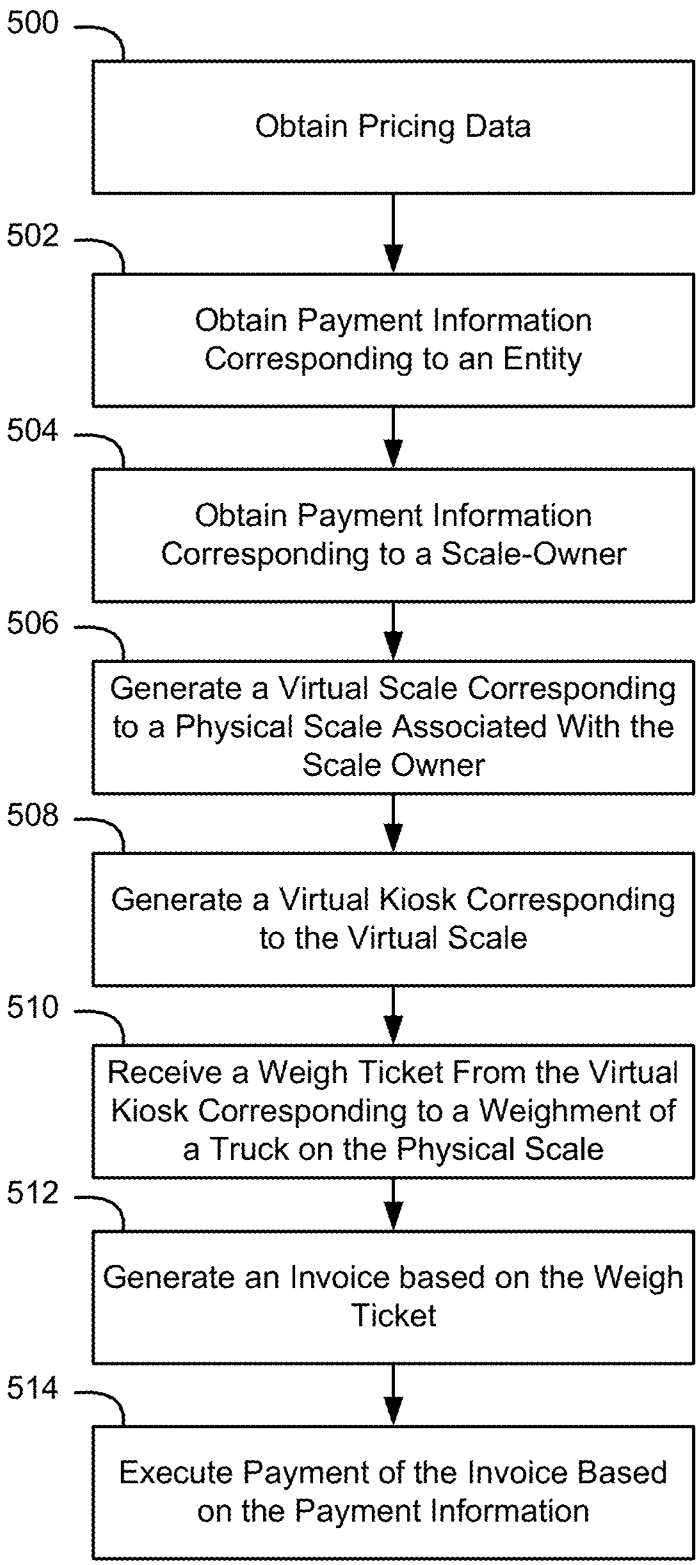
FIG. 47 presents a process according to an embodiment of the present invention.

With reference to FIG. 47, a process of using the platform will now be described. The process of FIG. 47 comprises steps 500 through 514.

At step 500, server 106 obtains pricing data for a plurality of products.

At step 502, server 106 obtains payment information corresponding to an entity, e.g., from an administrator computing device 110 associated with the entity.

At step 504, server 106 obtains payment information corresponding to a scale-owner, e.g., from an administrator computing device 110 associated with the entity.

At step 506, server 106 generates a virtual scale based on information obtained from a scale-owner computing device associated with the scale-owner, e.g., during the create kiosk 306 process described above.

At step 508, server 106 generates a virtual kiosk corresponding to the virtual scale based on information obtained from the scale-owner computing device, e.g., during the create kiosk 306 process described above.

At step 510, server 106 receives a weigh ticket from the virtual kiosk corresponding to a weighment of a given truck carrying the given product by the physical scale.

At step 512, server 106 generates an invoice based at least in part on the received weigh ticket and the obtained pricing data.

At step 514, server 106 executes a payment of the invoice based at least in part on the obtained payment information corresponding to the entity and the obtained payment information corresponding to the scale-owner.

The particular processing operations and other system functionality described in conjunction with the flow diagram of FIG. 47 are presented by way of illustrative example only and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement the disclosed embodiments.

Functionality such as that described in conjunction with the process of FIG. 47 may be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

FIGS. 1 through 47 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A truck scale payment system comprising a processor coupled to memory, the processor being configured to:

obtain pricing data for a plurality of products;

obtain payment information corresponding to an entity;

obtain payment information corresponding to a scale-owner;

generate a virtual scale based on information obtained from a scale-owner computing device associated with the scale-owner, the virtual scale being configured to obtain scale data from a physical scale associated with the scale-owner and comprising a software representation of the physical scale, wherein hardware specifications of the physical scale are defined via the virtual scale;

generate a virtual kiosk corresponding to the virtual scale based on information obtained from the scale-owner computing device, the virtual kiosk being configured for use during weighments of trucks on the physical scale and for associating one or more functionalities and customizable workflows with the truck scale payment system, the virtual kiosk being associated with at least a given product of the plurality of products;

receive a weigh ticket from the virtual kiosk corresponding to a weighment of a given truck carrying the given product by the physical scale, the weigh ticket comprising weighment data for the given product carried by the given truck, the given truck being associated with the entity;

generate an invoice based at least in part on the received weigh ticket and the obtained pricing data; and execute a payment of the invoice based at least in part on the obtained payment information corresponding to the entity and the obtained payment information corresponding to the scale-owner.

2. The truck scale payment system of claim 1, wherein the given truck is an autonomous or semi-autonomous truck associated with the entity.

3. The truck scale payment system of claim 2, wherein the weigh ticket is generated automatically by the virtual kiosk based on the weighment of the autonomous or semi-autonomous truck on the physical scale without further human input.

4. The truck scale payment system of claim 3, wherein the processor is configured to generate the invoice and execute payment of the invoice automatically without further human input.

5. The truck scale payment system of claim 1, wherein:

the virtual kiosk is configured to obtain at least one of a signature, image and document as part of the weighment of the given truck; and the weighment ticket comprises the at least one of the signature, image and document.

6. The truck scale payment system of claim 1, wherein: the pricing data for the plurality of products comprises first pricing data for the given product, the first pricing data for the given product comprising a first effective date;

the processor is further configured to:

obtain second pricing data for the given product, the second pricing data comprising a second effective date;

determine that the second effective date is closer to a current date than the first effective date; and utilize the second pricing data for generating future invoices corresponding to the given product instead of the first pricing data.

7. The truck scale payment system of claim 1, wherein: the information obtained from the scale-owner computing device comprises an indication of a selection, by a user of the scale-owner computing device, of the given product for association with the virtual kiosk; and generating the virtual kiosk corresponding to the virtual scale based on the information obtained from the scale-owner computing device comprises associating the virtual kiosk with the given product based on the indication.

8. The truck scale payment system of claim 1, wherein: the information obtained from the scale-owner computing device comprises an indication to allow a presentation of the pricing data to driver mobile devices accessing the virtual kiosk; and generating the virtual kiosk corresponding to the virtual scale based on the information obtained from the scale-owner computing device comprises configuring the virtual kiosk to allow the presentation of the pricing data to driver mobile devices accessing the virtual kiosk.

9. The truck scale payment system of claim 1, wherein: the information obtained from the scale-owner computing device comprises contact information for at least one of the entity and the scale-owner; and the processor is further configured to:

associate the contact information with the virtual kiosk; and transmit the invoice to the at least one of the entity and the scale-owner based on the contact information.

10. Method executed by a hardware processor, the method comprising:

obtaining pricing data for a plurality of products;

obtaining payment information corresponding to an entity;

obtaining payment information corresponding to a scale-owner;

generating a virtual scale based on information obtained from a scale-owner computing device associated with the scale-owner, the virtual scale being configured to obtain scale data from a physical scale associated with the scale-owner and comprising a software representation of the physical scale, wherein hardware specifications and operation of the physical scale are defined via the virtual scale;

generating a virtual kiosk corresponding to the virtual scale based on information obtained from the scale-owner computing device, the virtual kiosk being configured for use during weighments of trucks on the physical scale and for associating one or more functionalities and customizable workflows with the truck scale payment system, the virtual kiosk being associated with at least a given product of the plurality of products;

receiving a weigh ticket from the virtual kiosk corresponding to a weighment of a given truck carrying the given product by the physical scale, the weigh ticket comprising weighment data for the given product carried by the given truck, the given truck being associated with the entity;

generating an invoice based at least in part on the received weigh ticket and the obtained pricing data; and executing a payment of the invoice based at least in part on the obtained payment information corresponding to the entity and the obtained payment information corresponding to the scale-owner.

11. The method of claim 10, wherein the given truck is an autonomous or semi-autonomous truck associated with the entity.

12. The method of claim 11, wherein the weigh ticket is generated automatically by the virtual kiosk based on the weighment of the autonomous or semi-autonomous truck on the physical scale without further human input.

13. The method of claim 12, wherein the method further comprises generating the invoice and executing payment of the invoice automatically without further human input.

14. The method of claim 10, wherein:

the virtual kiosk is configured to obtain at least one of a signature, image and document as part of the weighment of the given truck; and the weighment ticket comprises the at least one of the signature, image and document.

15. The method of claim 10, wherein:

the pricing data for the plurality of products comprises first pricing data for the given product, the first pricing data for the given product comprising a first effective date;

the method further comprises:

obtaining second pricing data for the given product, the second pricing data comprising a second effective date;

determining that the second effective date is closer to a current date than the first effective date; and utilizing the second pricing data for generating future invoices corresponding to the given product instead of the first pricing data.

16. The method of claim 10, wherein:

the information obtained from the scale-owner computing device comprises an indication of a selection, by a user of the scale-owner computing device, of the given product for association with the virtual kiosk; and generating the virtual kiosk corresponding to the virtual scale based on the information obtained from the scale-owner computing device comprises associating the virtual kiosk with the given product based on the indication.

17. The method of claim 10, wherein:

the information obtained from the scale-owner computing device comprises an indication to allow a presentation of the pricing data to driver mobile devices accessing the virtual kiosk; and generating the virtual kiosk corresponding to the virtual scale based on the information obtained from the scale-owner computing device comprises configuring the virtual kiosk to allow the presentation of the pricing data to driver mobile devices accessing the virtual kiosk.

18. The method of claim 10, wherein:

the information obtained from the scale-owner computing device comprises contact information for at least one of the entity and the scale-owner; and the method further comprises:

associating the contact information with the virtual kiosk; and transmitting the invoice to the at least one of the entity and the scale-owner based on the contact information.

19. A non-transitory computer readable medium comprising instructions that, when executed by at least one processor, cause the at least one processor to:

obtain pricing data for a plurality of products;

obtain payment information corresponding to an entity;

obtain payment information corresponding to a scale-owner;

generate a virtual scale based on information obtained from a scale-owner computing device associated with the scale-owner, the virtual scale being configured to obtain scale data from a physical scale associated with the scale-owner and comprising a software representation of the physical scale, wherein hardware specifications and operation of the physical scale are defined via the virtual scale;

generate a virtual kiosk corresponding to the virtual scale based on information obtained from the scale-owner computing device, the virtual kiosk being configured for use during weighments of trucks on the physical scale and for associating one or more functionalities and customizable workflows with the truck scale payment system, the virtual kiosk being associated with at least a given product of the plurality of products;

receive a weigh ticket from the virtual kiosk corresponding to a weighment of a given truck carrying the given product by the physical scale, the weigh ticket comprising weighment data for the given product carried by the given truck, the given truck being associated with the entity;

generate an invoice based at least in part on the received weigh ticket and the obtained pricing data; and execute a payment of the invoice based at least in part on the obtained payment information corresponding to the entity and the obtained payment information corresponding to the scale-owner.

20. The non-transitory computer readable medium of claim 19, wherein:

the given truck is an autonomous or semi-autonomous truck associated with the entity;

the weigh ticket is generated automatically by the virtual kiosk based on the weighment of the autonomous or semi-autonomous truck on the physical scale without further human input; and the instructions further cause the processor to generate the invoice and execute payment of the invoice automatically without further human input.

* * * * *